United States Patent [19]

Miyazawa et al.

[11] Patent Number: 5,343,553
[45] Date of Patent: Aug. 30, 1994

[54] DIGITAL FUZZY INFERENCE SYSTEM USING LOGIC CIRCUITS

[75] Inventors: Azuma Miyazawa, Mitaka; Takashi Suzuki; Kozi Mizobuchi, both of Hachioji, all of Japan

[73] Assignee: Olympus Optical Co., Ltd., Tokyo, Japan

[21] Appl. No.: 18,465

[22] Filed: Feb. 16, 1993

Related U.S. Application Data

[63] Continuation of Ser. No. 426,576, Oct. 24, 1989, abandoned.

[30] Foreign Application Priority Data

Nov. 4, 1988 [JP] Japan ................. 63-278797
Dec. 28, 1988 [JP] Japan ................. 63-333502
Dec. 28, 1988 [JP] Japan ................. 63-333503
Aug. 9, 1989 [JP] Japan ................. 1-204761

[51] Int. Cl.$^5$ .............................. G06F 9/44
[52] U.S. Cl. ........................ 395/3; 395/900
[58] Field of Search ................ 395/3, 61, 900

[56] References Cited

U.S. PATENT DOCUMENTS

| | | | |
|---|---|---|---|
| 4,694,418 | 9/1987 | Ueno et al. | 364/807 |
| 4,716,540 | 12/1987 | Yamakawa | 364/807 |
| 4,837,725 | 6/1989 | Yamakawa | 395/3 |
| 4,839,823 | 6/1989 | Matsumoto | 395/61 |
| 4,860,214 | 8/1989 | Matsuda et al. | 395/61 |
| 4,860,243 | 8/1989 | Ueno et al. | 395/3 |
| 4,864,490 | 9/1989 | Nomoto et al. | 364/157 |
| 4,875,184 | 10/1989 | Yamakawa | 364/807 |
| 4,961,225 | 10/1990 | Hisano | 395/61 |
| 5,001,640 | 3/1991 | Matsumoto et al. | 395/905 |
| 5,012,430 | 4/1991 | Sakurai | 395/61 |
| 5,036,730 | 8/1991 | Sakai et al. | 395/905 |
| 5,073,863 | 12/1991 | Zhang | 395/3 |
| 5,077,677 | 12/1991 | Murphy et al. | 395/3 |

FOREIGN PATENT DOCUMENTS

0092832 11/1983 European Pat. Off. .
0256786 2/1988 European Pat. Off. .
58-192407 11/1983 Japan .
61-20428 1/1986 Japan .

OTHER PUBLICATIONS

Togai et al., "Expert System on a Chip: An Engine for Real-Time Approximate Reasoning", *IEEE Expert*, Fall 1986, pp. 55-62.

Mamdani et al., "Process Control Using Fuzzy Logic", *Fuzzy Sets-Theory and Applications to Policy Analysis and Information Systems*, 1980, pp. 249-265.

"In Trinsic Fuzzy Electronic Circuits for Sixth Generation Computer", Takeshi Yamakawa, 1988.

"Application of fuzzy algorithms for control of simple dynamic plant", *PROC. IEE*, vol. 121, No. 12, Dec. 1974, E. H. Mamdani.

International Workshop on Fuzzy System Applications, Aug. 20-24, 1988 pp. 33 and 34.

Nikkei Electronics Oct. 3, 1988 (No. 457).

IEEE Expert Fall 1986, pp. 55-62; Expert System on a Chip: An Engine for Real-Time Approximate Reasoning; Togai et al AT&T Bell Laboratories.

*Primary Examiner*—Allen R. MacDonald
*Assistant Examiner*—George Davis
*Attorney, Agent, or Firm*—Frishauf, Holtz, Goodman & Woodward

[57] ABSTRACT

A digital fuzzy inference system has fuzzy inference processors each of which is provided for each of fuzzy rules and comprises if-part membership function defining circuits, a minimum-value calculation circuit and a then-part membership function defining circuit. Each of if-part inputs is supplied to a corresponding if-part membership function defining circuit in which the if-part membership function is defined in accordance with definition parameters and the membership value is calculated by referring to the defined membership function and the input value. For each of the rules, membership values are entered into the minimum-value calculation circuit to select their minimum value. The minimum value is applied to the then-part membership function defining circuit which defines a then-part membership function in accordance with definition parameters and a then-part input. Then-part membership functions for all the rules are synthesized through maximum-value calculation by a membership function synthesizing circuit. The result of synthesis serves as a fuzzy inferential result. For a fuzzy controller for controlling a controlled object in accordance with the inferential result, the center-of-gravity calculation circuit calculates a value of the center of gravity from the synthesized membership function because the inferential result needs one definite value.

18 Claims, 71 Drawing Sheets

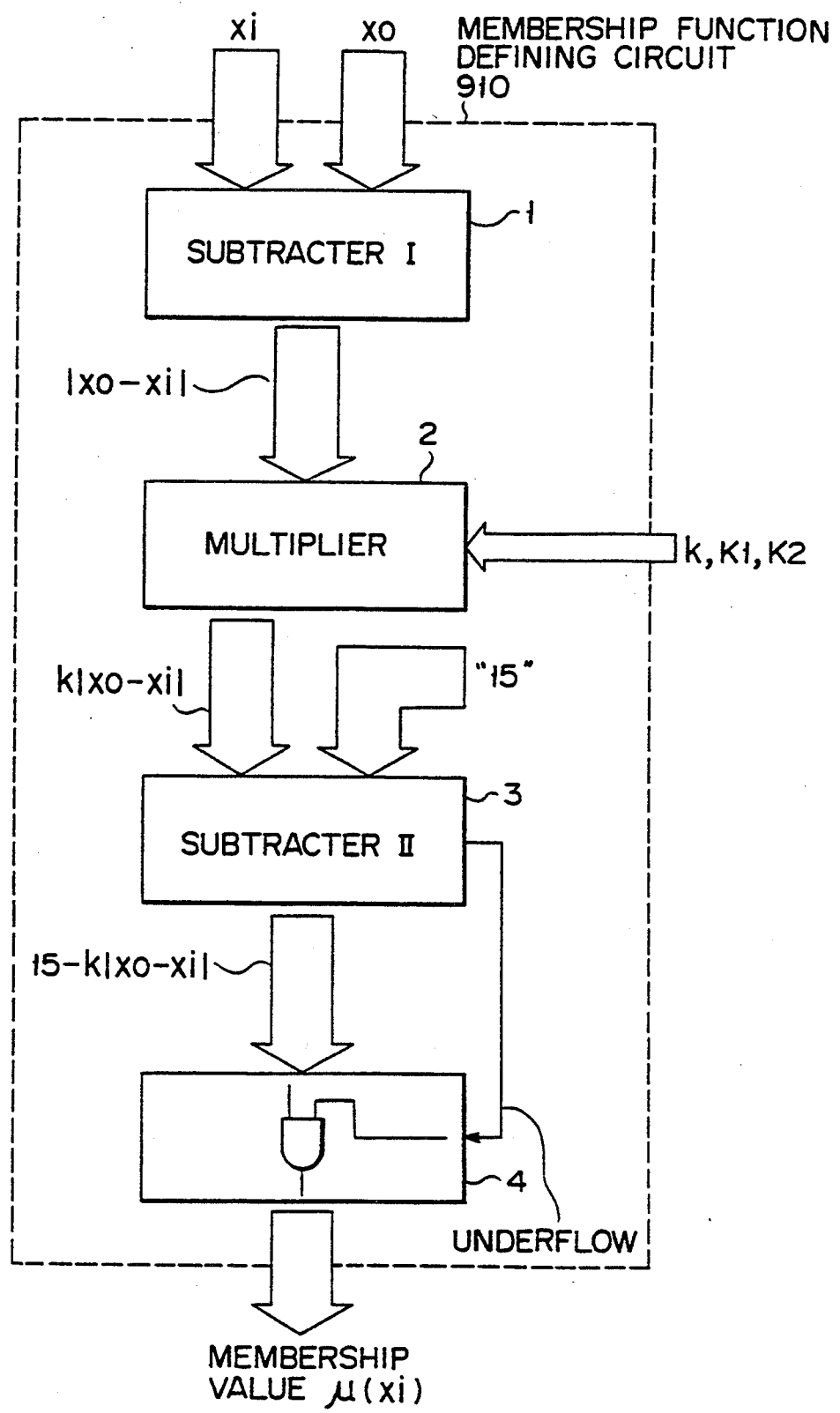
F I G. 6

| PARAMETER | | TYDE OF FUNCTION |
|---|---|---|
| K1 | K2 | |
| 0 | 0 | A-FUNCTION |
| 0 | 1 | N-FUNCTION |
| 1 | 0 | S-FUNCTION |
| 1 | 1 | V-FUNCTION |
F I G. 7
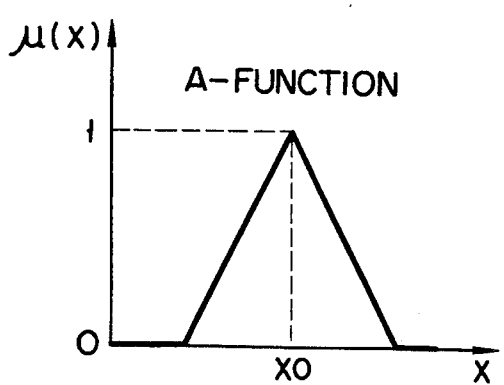
F I G. 8A
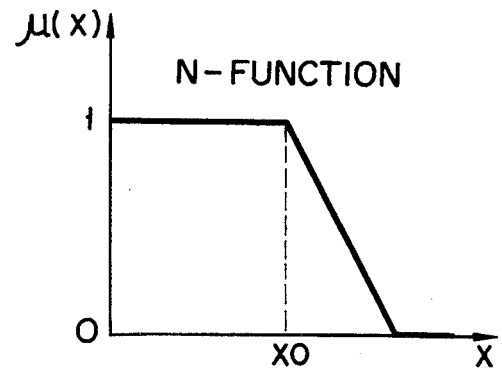
F I G. 8B
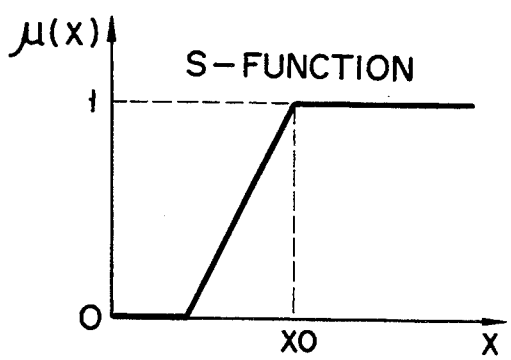
F I G. 8C
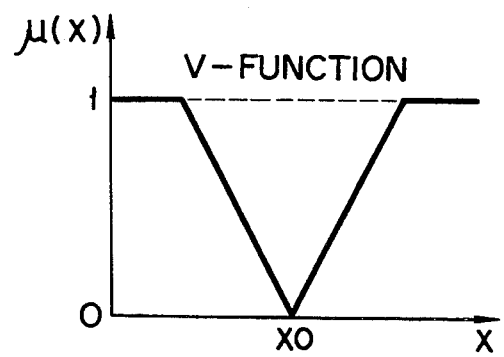
F I G. 8D

| INPUT | | | OUTPUT | |
|---|---|---|---|---|
| Ci | B | A | Co | S |
| 0 | 0 | 0 | 0 | 0 |
| 0 | 0 | 1 | 0 | 1 |
| 0 | 1 | 0 | 0 | 1 |
| 0 | 1 | 1 | 1 | 0 |
| 1 | 0 | 0 | 0 | 1 |
| 1 | 0 | 1 | 1 | 0 |
| 1 | 1 | 0 | 1 | 0 |
| 1 | 1 | 1 | 1 | 1 |

F I G. 13

$x_0$ | 0 | 0 | 0 | 0 | 0 | 1 | 0 | 1 |
positions: D15 D14 D13 D12 D11

$x_i$ | 0 | 0 | 0 | 1 | 0 | 0 | 1 | 1 |
positions: D25 D24 D23 D22 D21

⇓ CONVERT INTO COMPLEMENT

| 1 | 1 | 1 | 0 | 1 | 1 | 0 | 0 |

F I G. 14

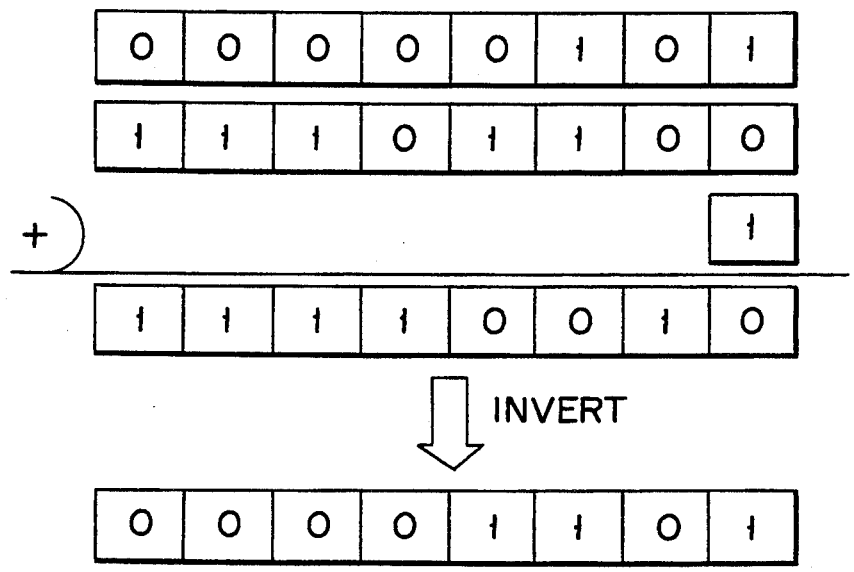
F I G. 15
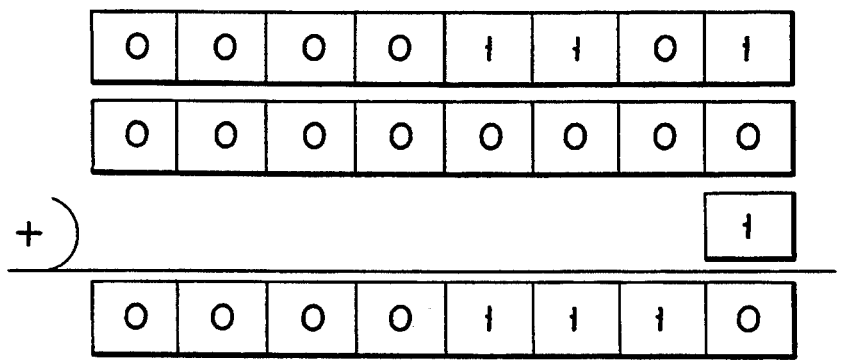
F I G. 16

| INPUT | | OUTPUT | |
|---|---|---|---|
| B | A | Co | S |
| 0 | 0 | 0 | 0 |
| 0 | 1 | 0 | 1 |
| 1 | 0 | 0 | 1 |
| 1 | 1 | 1 | 0 |

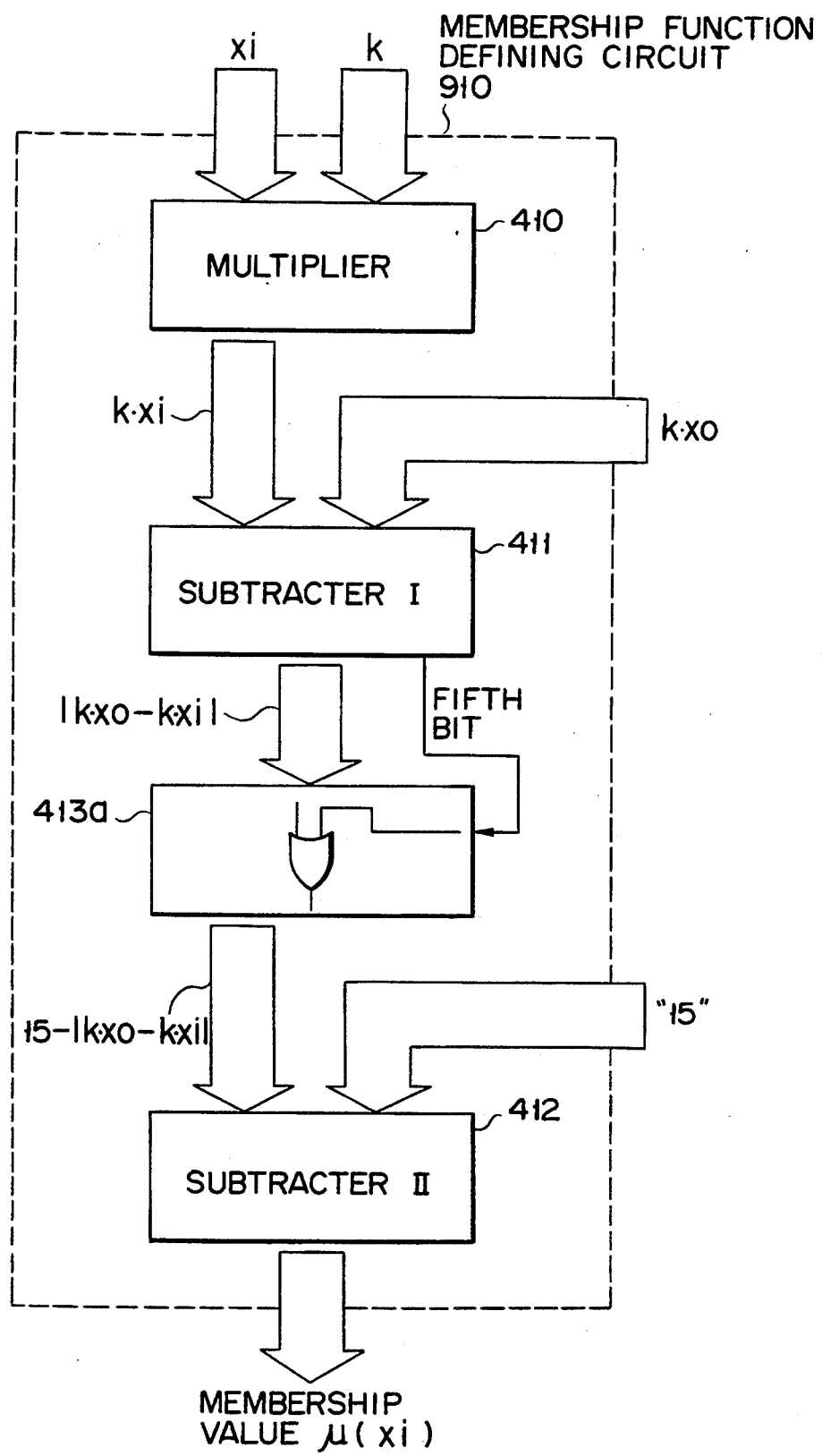
F I G. 22

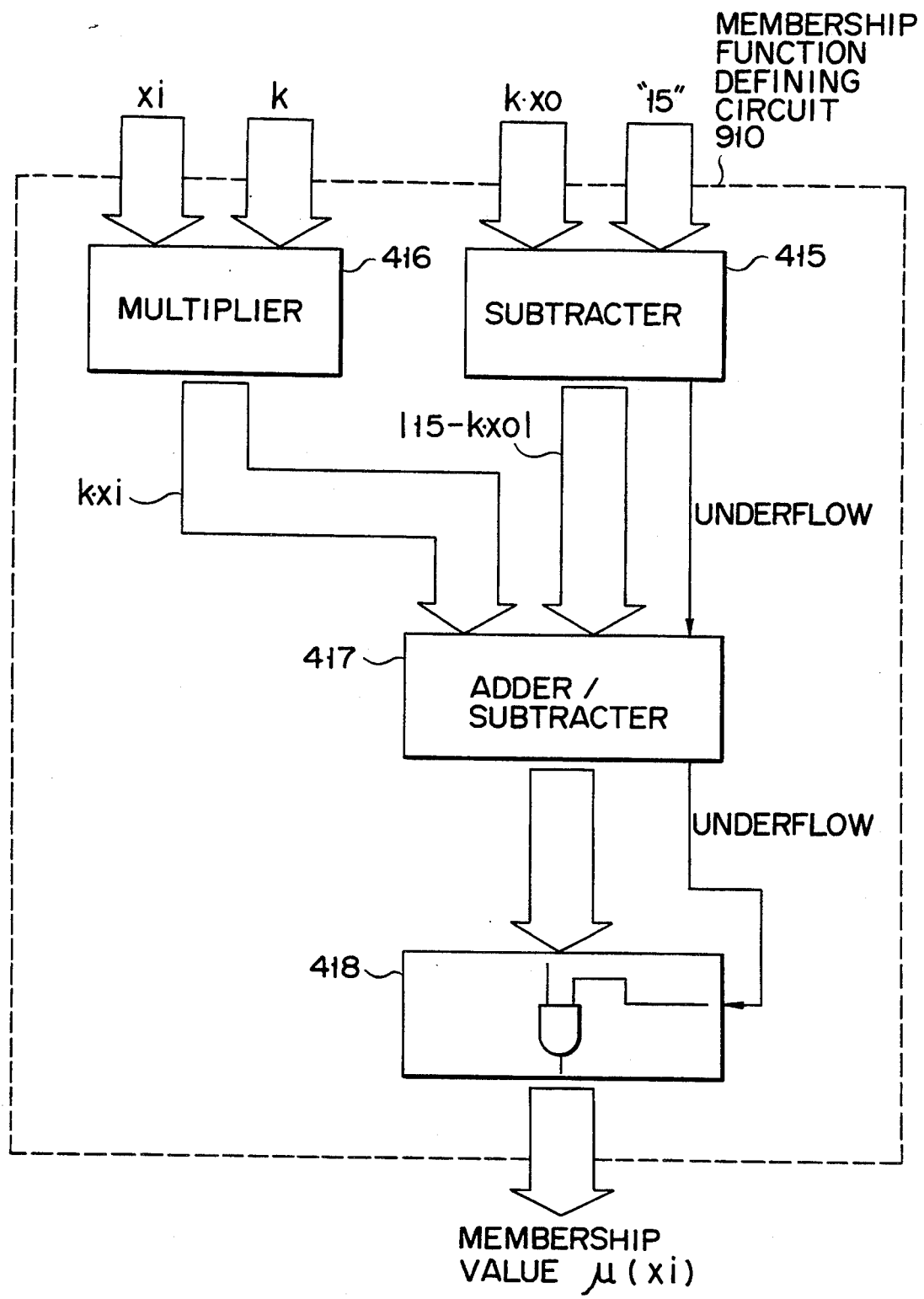
F I G. 23

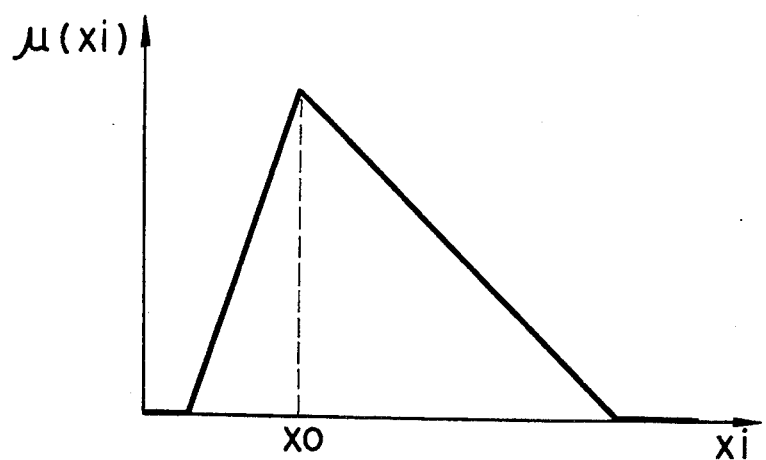
F I G. 25A
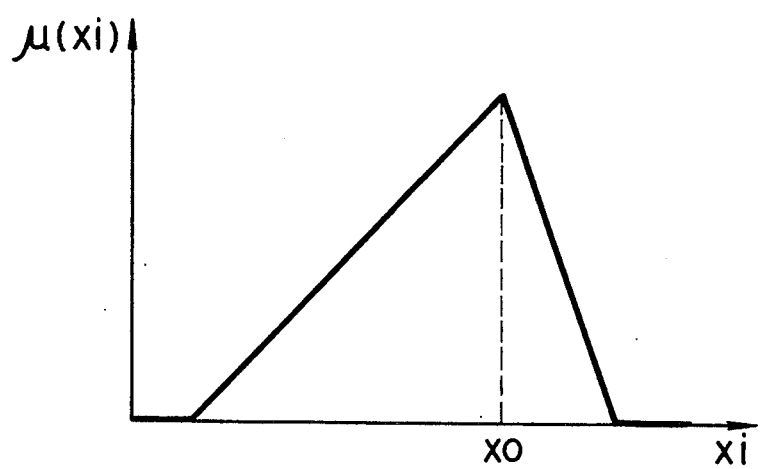
F I G. 25B

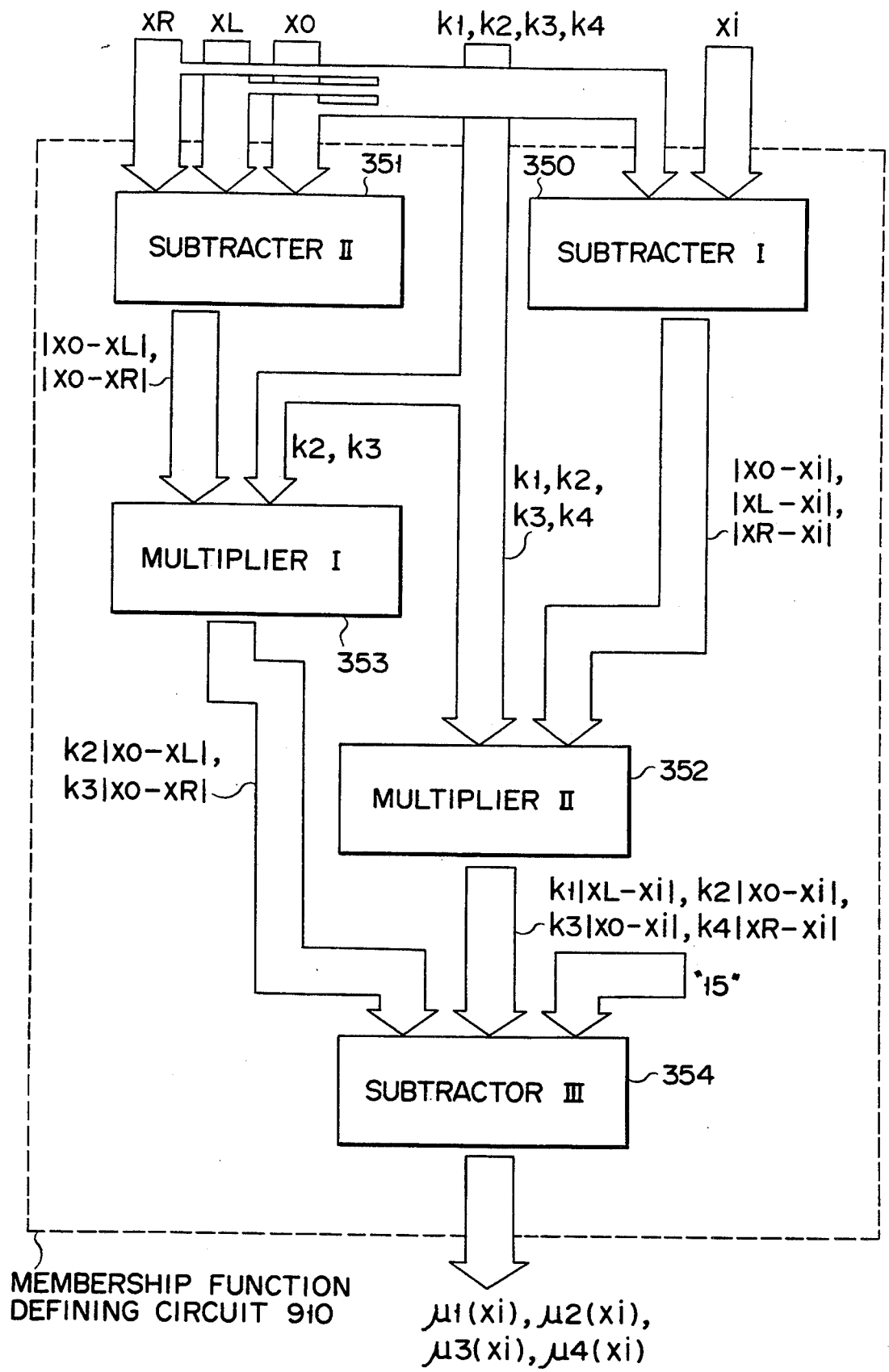
F I G. 26

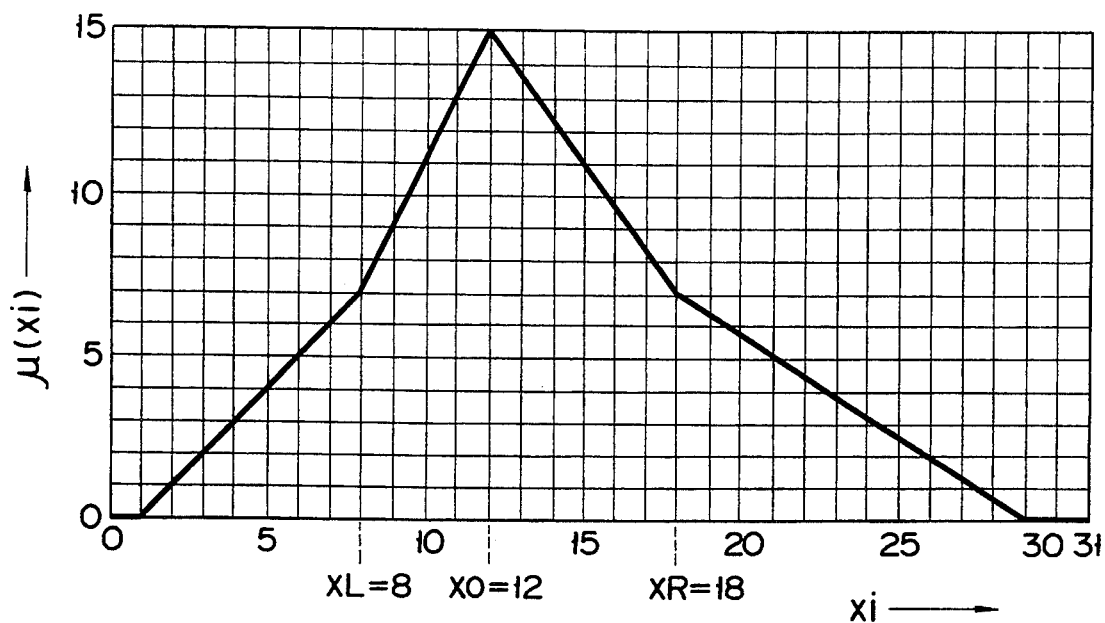
F I G. 27
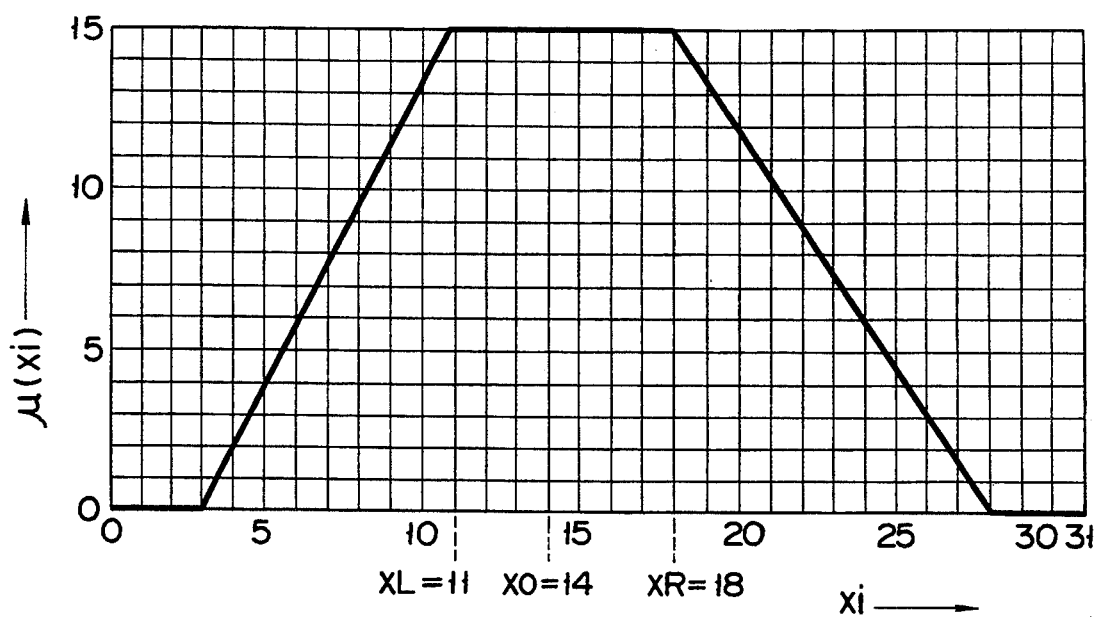
F I G. 28

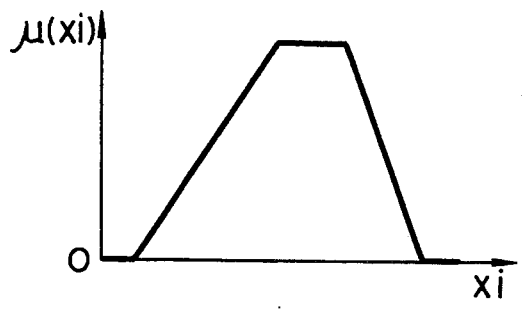
F I G. 30C
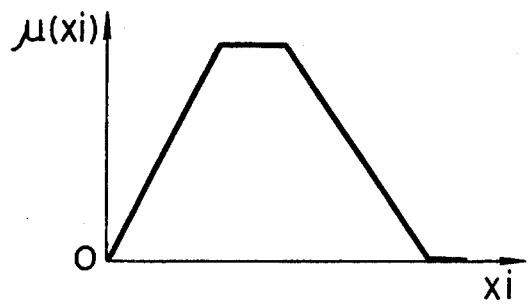
F I G. 30D
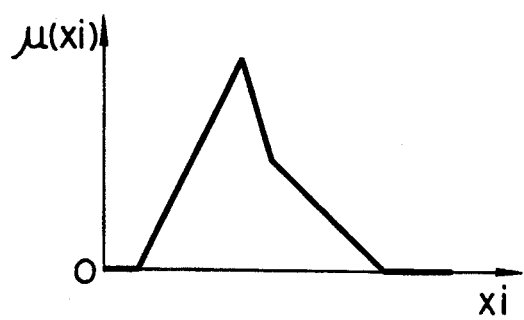
F I G. 30E
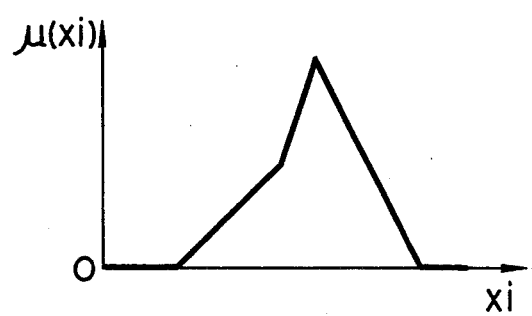
F I G. 30F
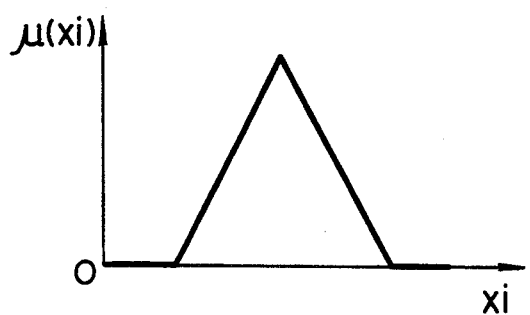
F I G. 30G
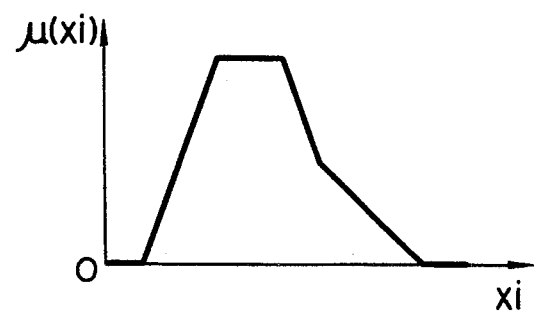
F I G. 30H

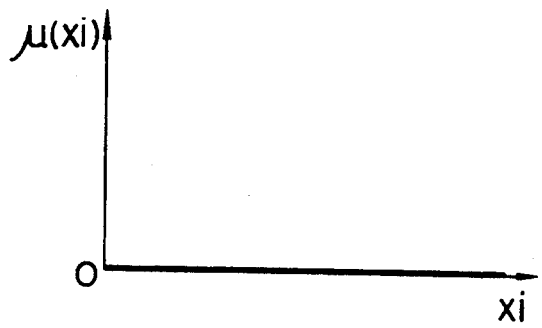
F I G. 30I
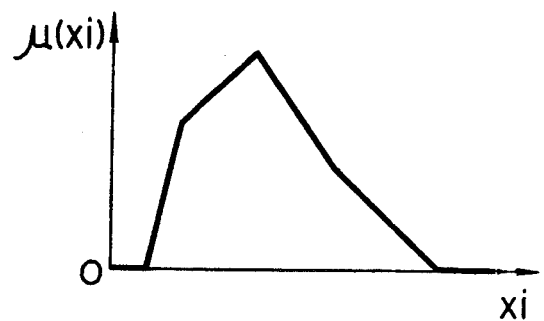
F I G. 30J
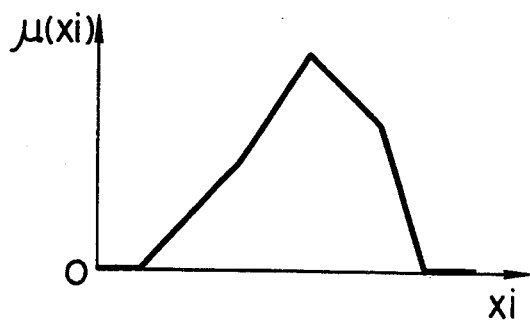
F I G. 30K
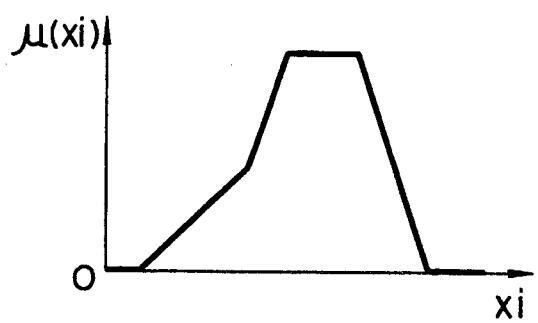
F I G. 30L
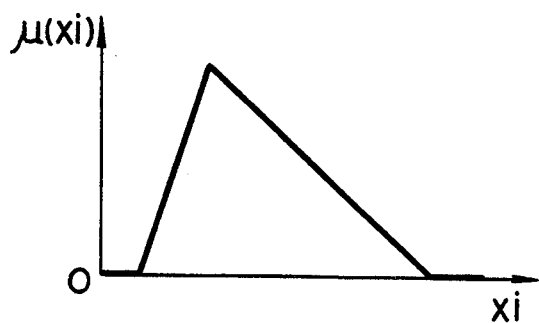
F I G. 30M
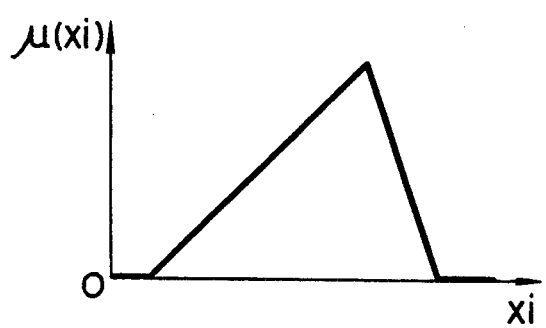
F I G. 30N

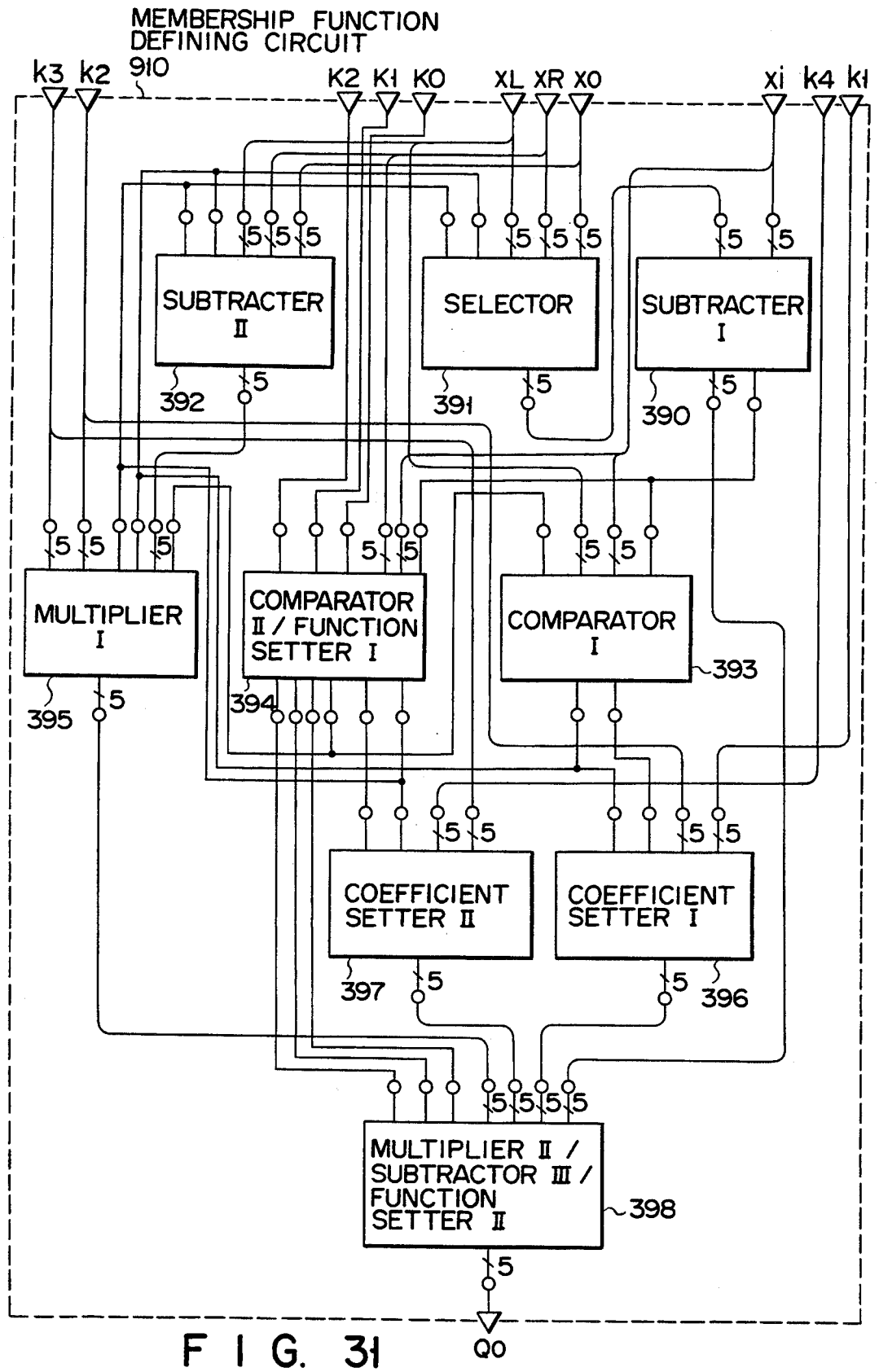
F I G. 31

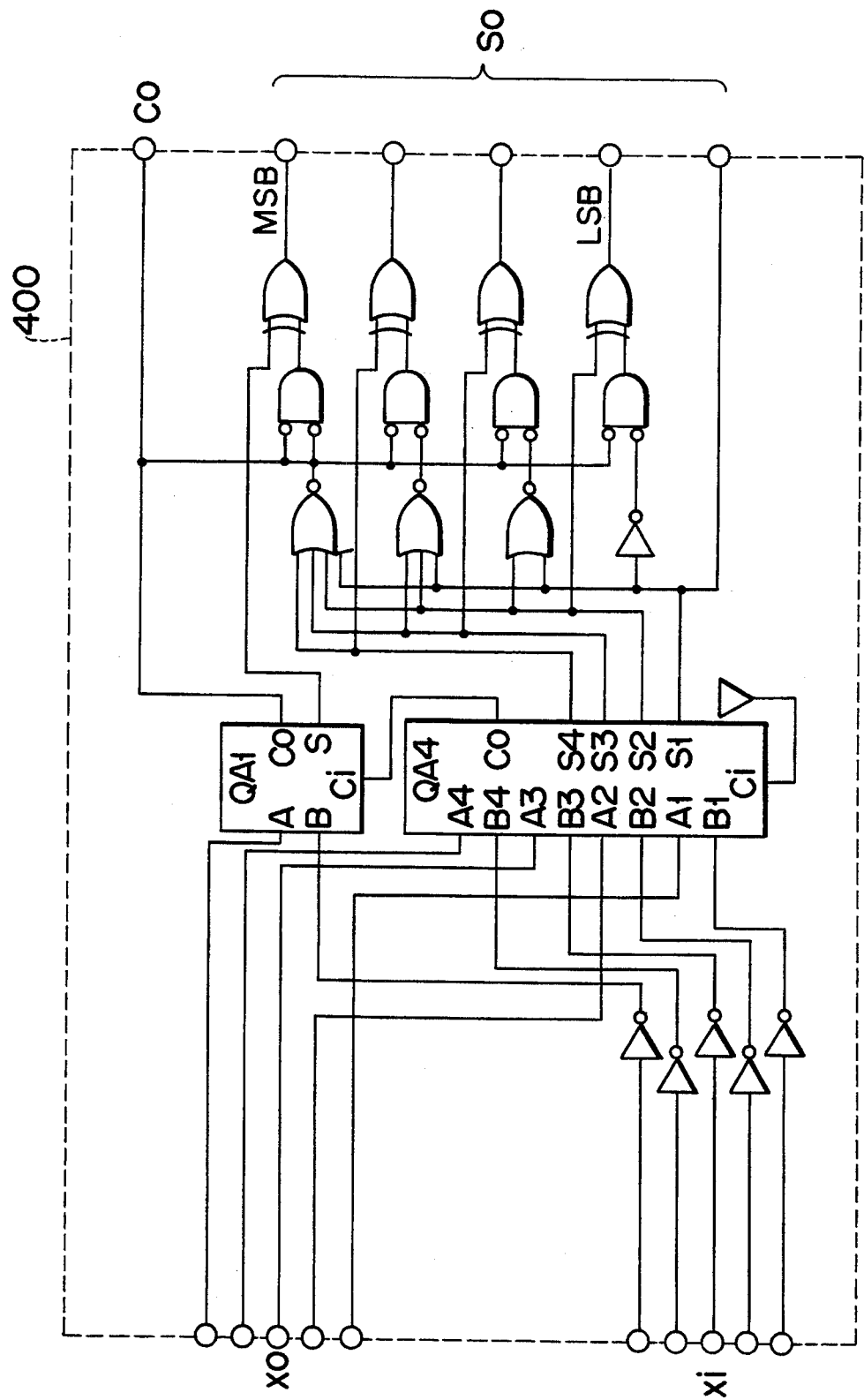
F I G. 33

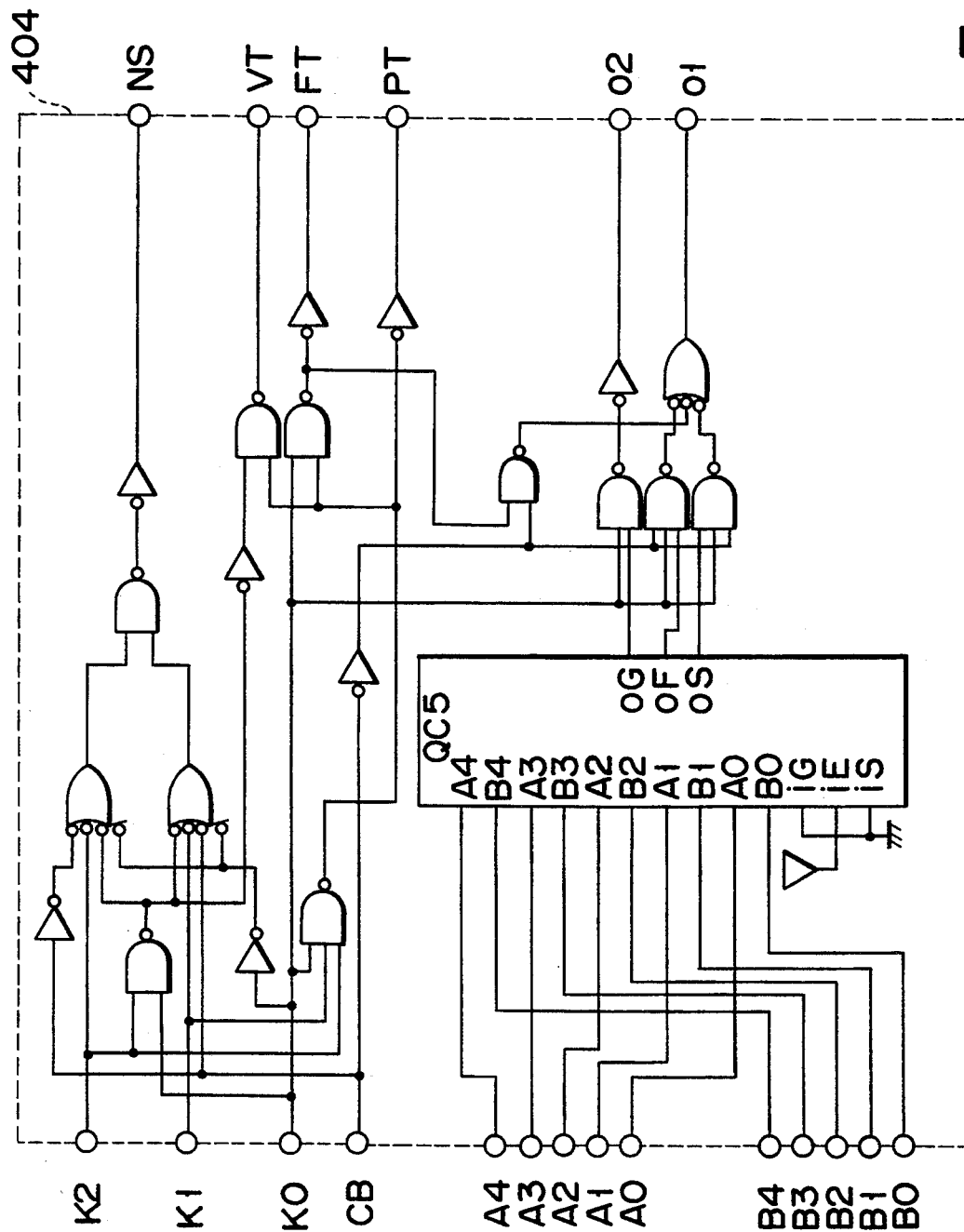
F I G. 37

| TYPE OF MEMBERSHIP FUNCTION | PARAMETER | | |
|---|---|---|---|
| | K0 | K1 | K2 |
| A-FUNCTION | L | L | L |
| N-FUNCTION | L | H | L |
| S-FUNCTION | L | L | H |
| F-FUNCTION | H | L | L |
| V-FUNCTION | H | L | H |
| P-FUNCTION | H | H | H |

F I G. 41

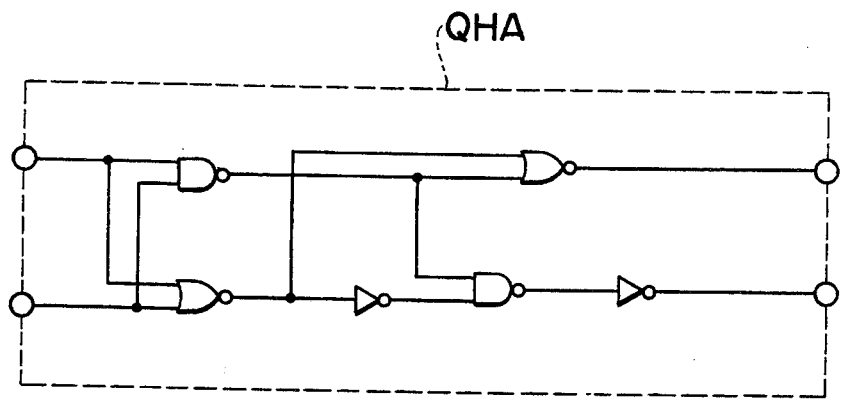
F I G. 42
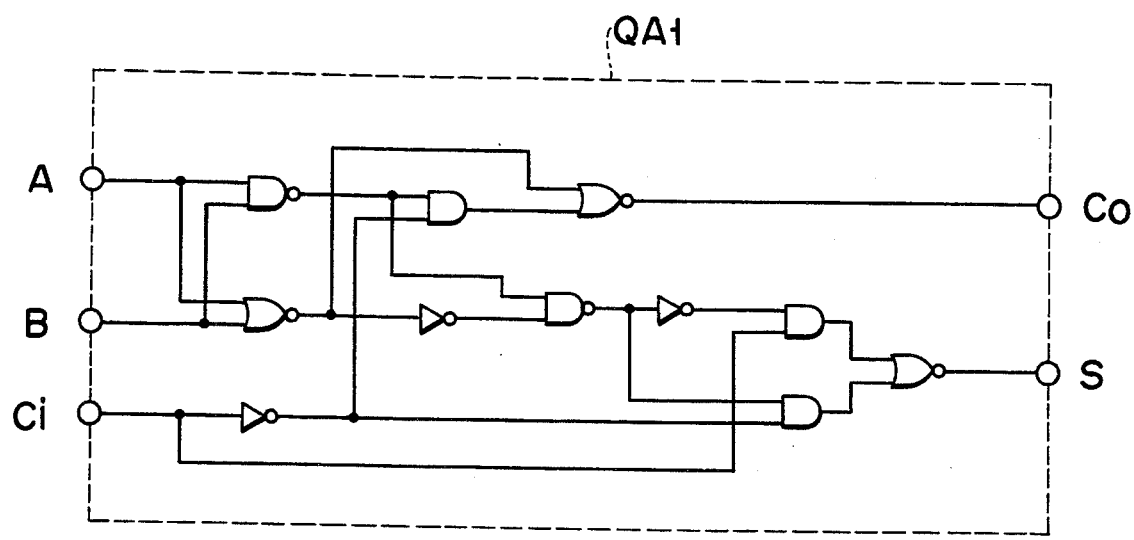
F I G. 43

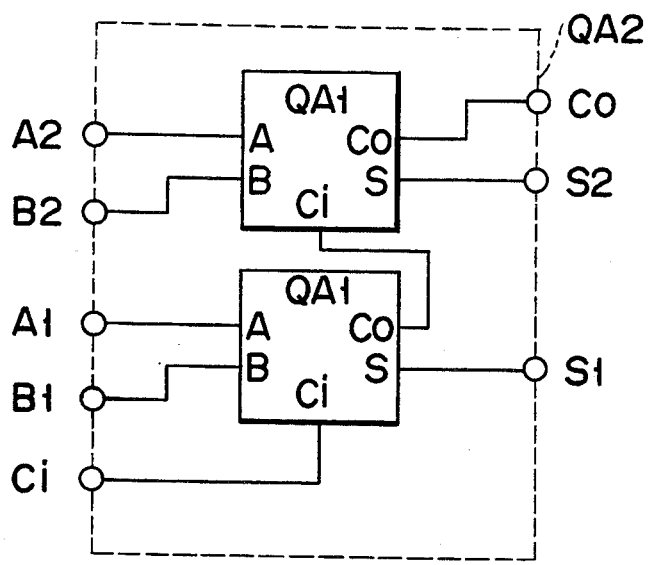
F I G. 45
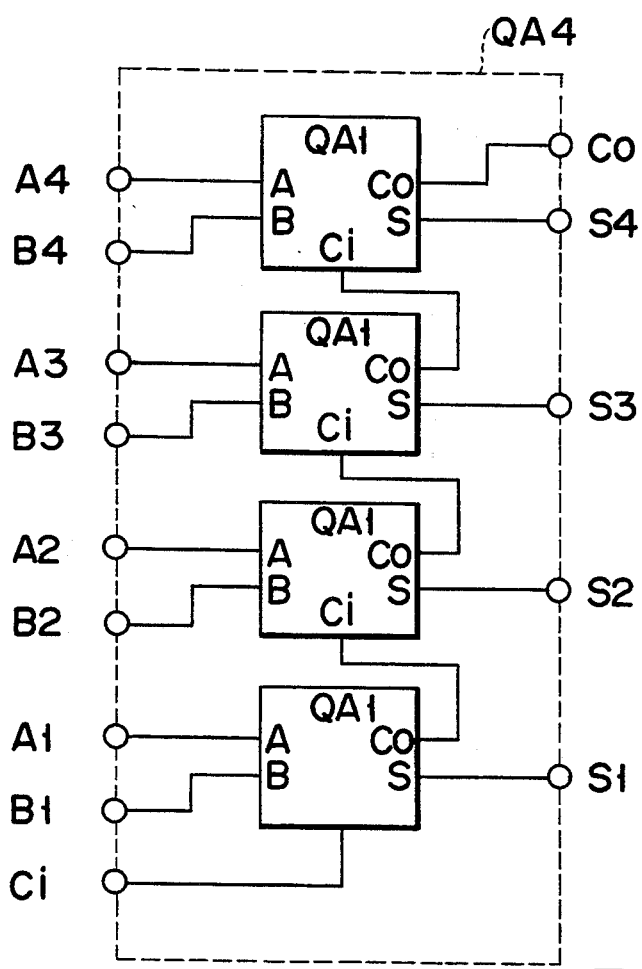
F I G. 46

FIG. 50

| INPUT | | | | CASCADE INPUT | | | OUTPUT | | |
|---|---|---|---|---|---|---|---|---|---|
| A4,B4 | A3,B3 | A2,B2 | A1,B1 | (A>B)in | (A<B)in | (A=B)in | (A>B)out | (A<B)out | (A=B)out |
| A4>B4 | X | X | X | X | X | X | 1 | 0 | 0 |
| A4=B4 | A3>B3 | X | X | X | X | X | 1 | 0 | 0 |
| A4=B4 | A3=B3 | A2>B2 | X | X | X | X | 1 | 0 | 0 |
| A4=B4 | A3=B3 | A2=B2 | A1>B1 | X | X | X | 1 | 0 | 0 |
| A4=B4 | A3=B3 | A2=B2 | A1=B1 | 0 | 0 | 0 | 1 | 1 | 0 |
| A4=B4 | A3=B3 | A2=B2 | A1=B1 | X | X | 1 | 0 | 0 | 1 |
| A4=B4 | A3=B3 | A2=B2 | A1=B1 | 0 | 1 | 0 | 0 | 1 | 0 |
| A4=B4 | A3=B3 | A2=B2 | A1=B1 | 1 | 0 | 0 | 1 | 0 | 0 |
| A4=B4 | A3=B3 | A2=B2 | A1<B1 | X | X | X | 0 | 1 | 0 |
| A4=B4 | A3=B3 | A2<B2 | X | X | X | X | 0 | 1 | 0 |
| A4=B4 | A3<B3 | X | X | X | X | X | 0 | 1 | 0 |
| A4<B4 | X | X | X | X | X | X | 0 | 1 | 0 |

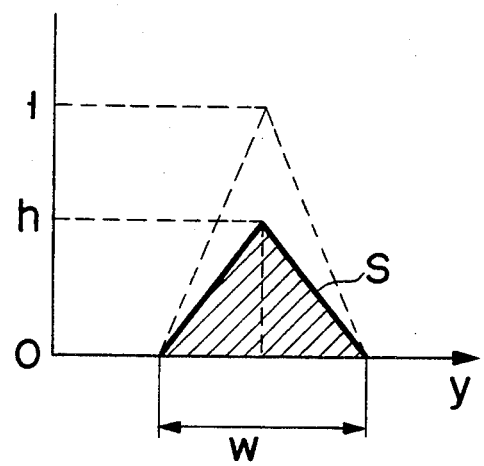
F I G. 55
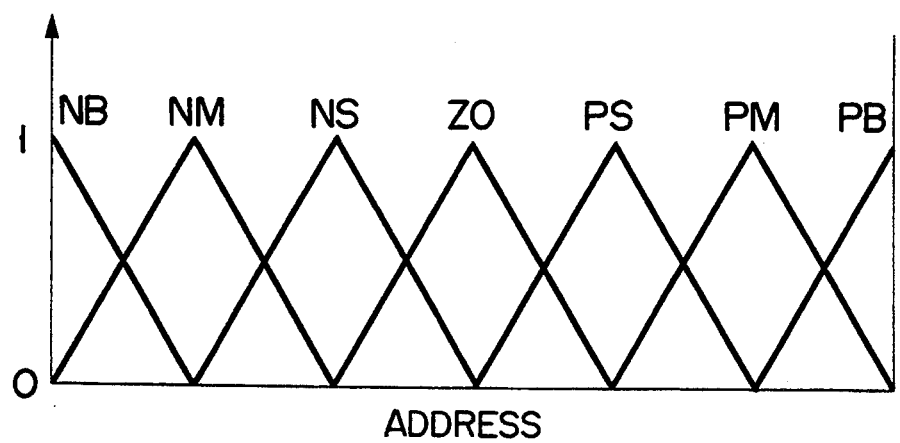
F I G. 56

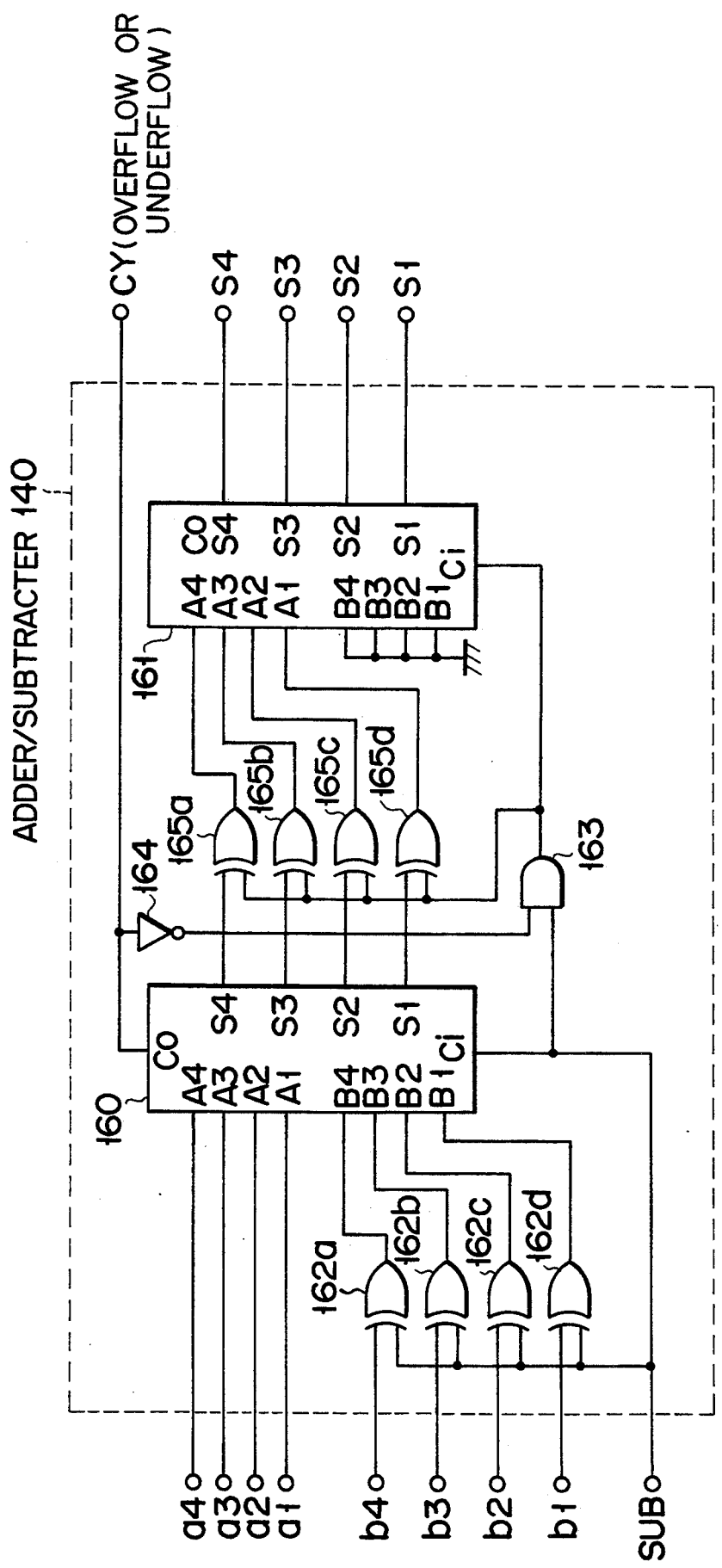
F I G. 58

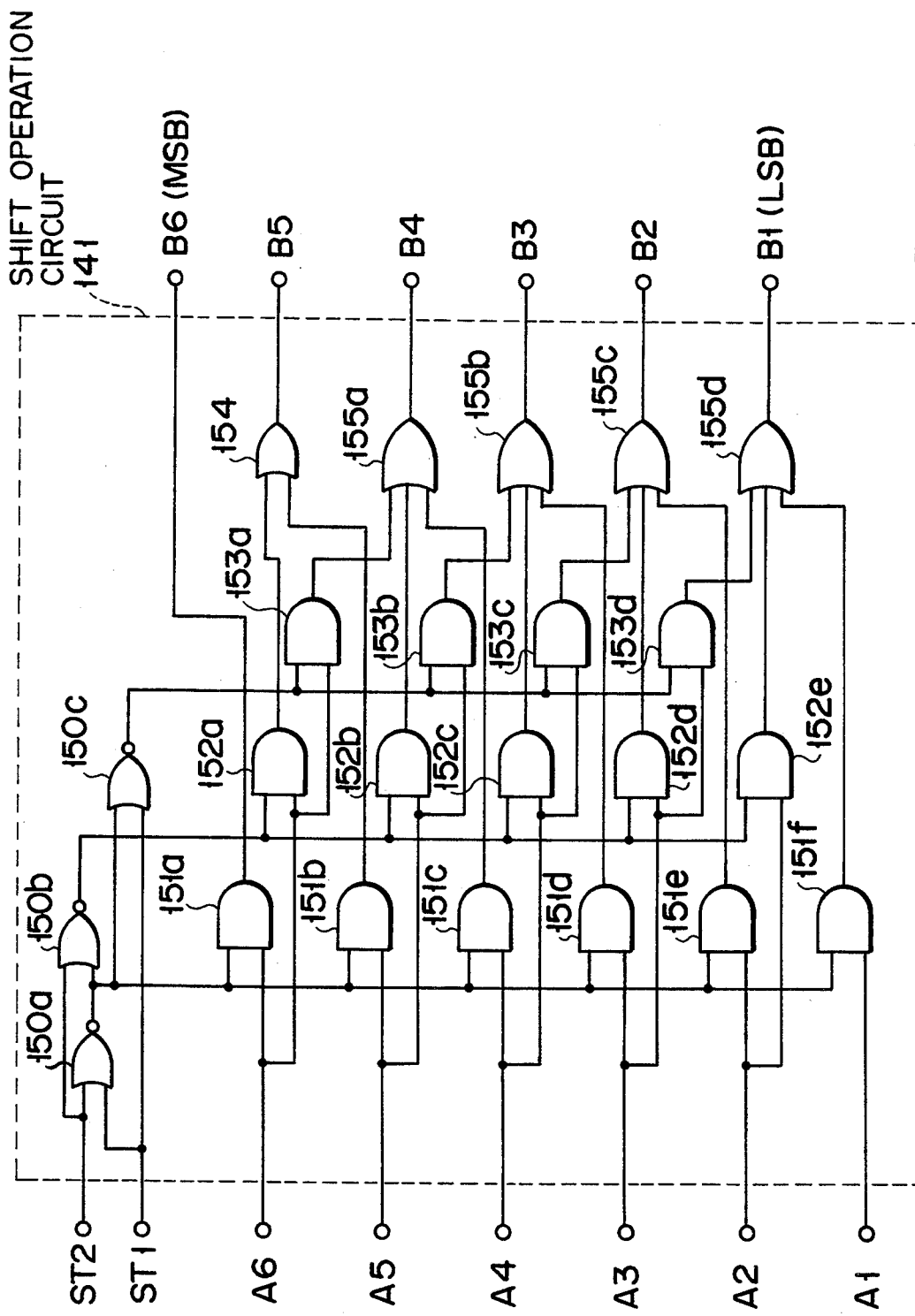
F I G. 59

| CONTROL INPUT | | DATA INPUT | DATA OUTPUT |
|---|---|---|---|
| ST2 | ST1 | A6 A5 A4 A3 A2 A1 | B6 B5 B4 B3 B2 B1 |
| 0 | 0 | Q6 Q5 Q4 Q3 Q2 Q1  | Q6 Q5 Q4 Q3 Q2 Q1 |
| 0 | 1 | | 0 Q6 Q5 Q4 Q3 Q2 |
| 1 | 0 | | 0 0 Q6 Q5 Q4 Q3 |
| 1 | 1 | | 0 0 0 0 0 0 |
F I G. 60
| WB | | W |
|---|---|---|
| WB2 | WB1 | |
| 0 | 0 | 1.0 |
| 0 | 1 | 1.5 |
| 1 | 0 | 1.25 |
| 1 | 1 | 0.75 |
F I G. 61

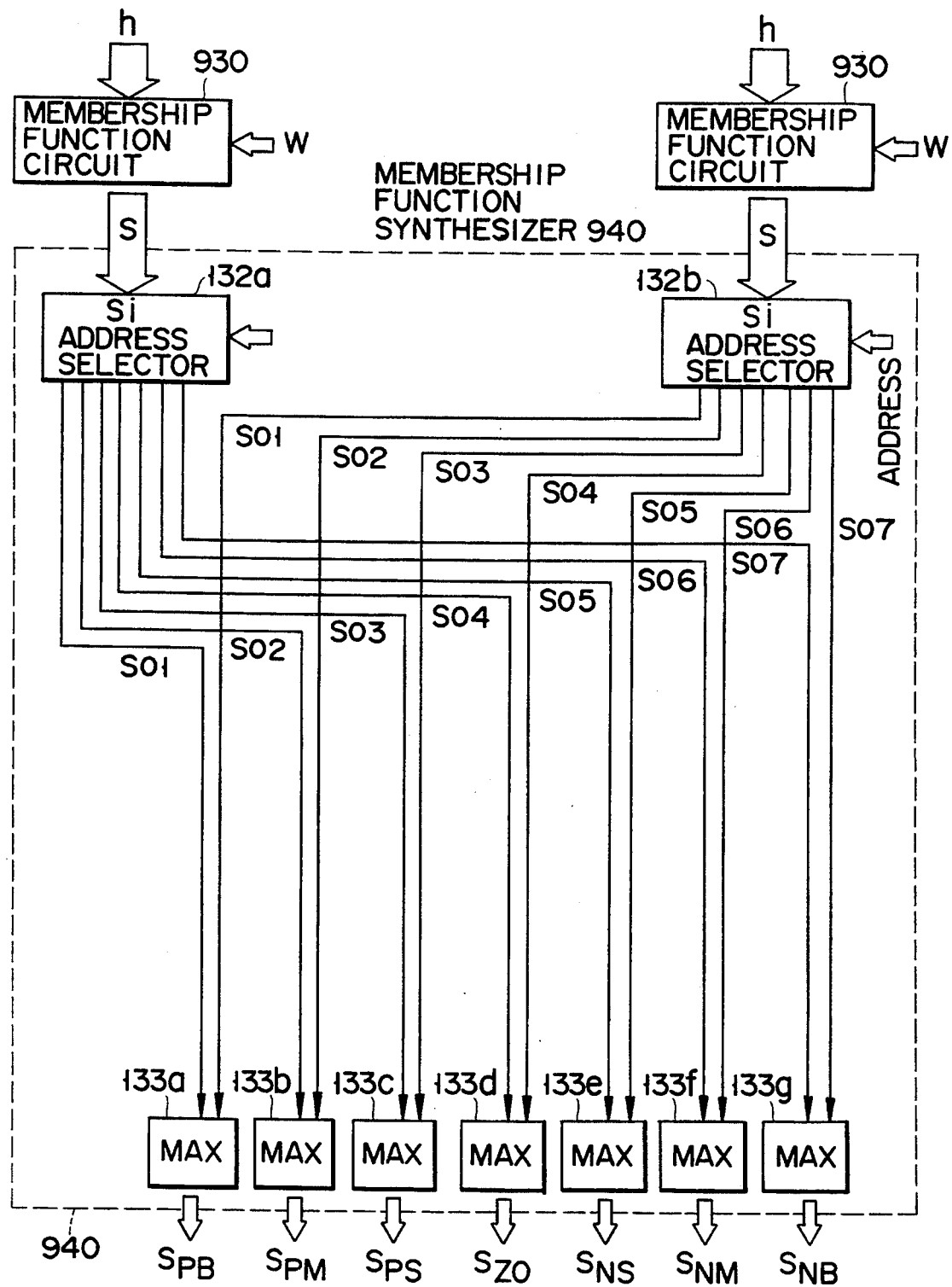
F I G. 62

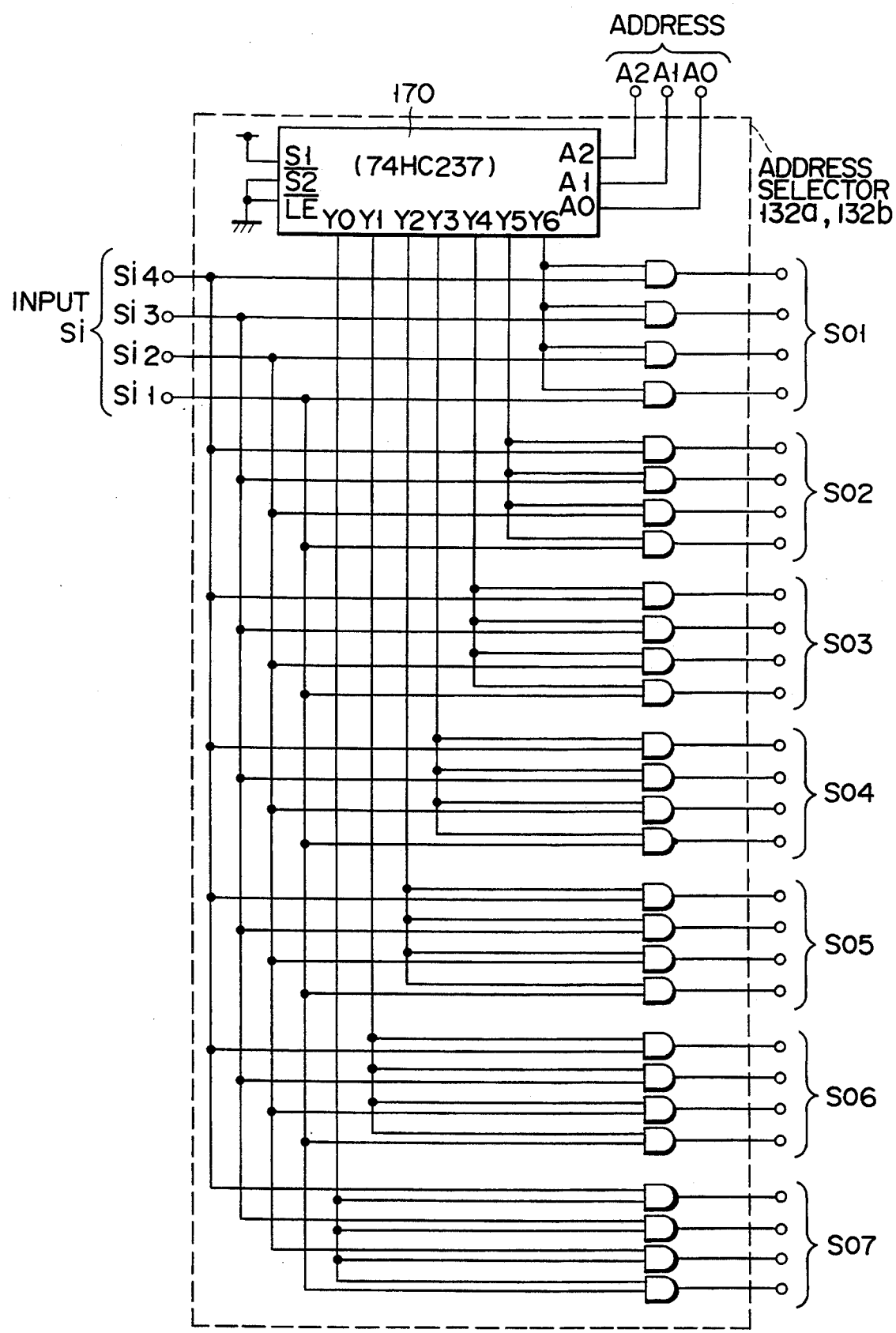
F I G. 63

| INPUT | | | | | | OUTPUT | | | | | | | |
|---|---|---|---|---|---|---|---|---|---|---|---|---|---|
| $\overline{LE}$ | CONTROL | | ADDRESS | | | Y0 | Y1 | Y2 | Y3 | Y4 | Y5 | Y6 | Y7 |
| | S1 | $\overline{S2}$ | A2 | A1 | A0 | | | | | | | | |
| X | X | 1 | X | X | X | 0 | 0 | 0 | 0 | 0 | 0 | 0 | 0 |
| X | 0 | X | X | X | X | 0 | 0 | 0 | 0 | 0 | 0 | 0 | 0 |
| 0 | 1 | 0 | 0 | 0 | 0 | 1 | 0 | 0 | 0 | 0 | 0 | 0 | 0 |
| 0 | 1 | 0 | 0 | 0 | 1 | 0 | 1 | 0 | 0 | 0 | 0 | 0 | 0 |
| 0 | 1 | 0 | 0 | 1 | 0 | 0 | 0 | 1 | 0 | 0 | 0 | 0 | 0 |
| 0 | 1 | 0 | 0 | 1 | 1 | 0 | 0 | 0 | 1 | 0 | 0 | 0 | 0 |
| 0 | 1 | 0 | 1 | 0 | 0 | 0 | 0 | 0 | 0 | 1 | 0 | 0 | 0 |
| 0 | 1 | 0 | 1 | 0 | 1 | 0 | 0 | 0 | 0 | 0 | 1 | 0 | 0 |
| 0 | 1 | 0 | 1 | 1 | 0 | 0 | 0 | 0 | 0 | 0 | 0 | 1 | 0 |
| 0 | 1 | 0 | 1 | 1 | 1 | 0 | 0 | 0 | 0 | 0 | 0 | 0 | 1 |
| 1 | 1 | 0 | X | X | X | ※ HOLD | | | | | | | |

FIG. 64

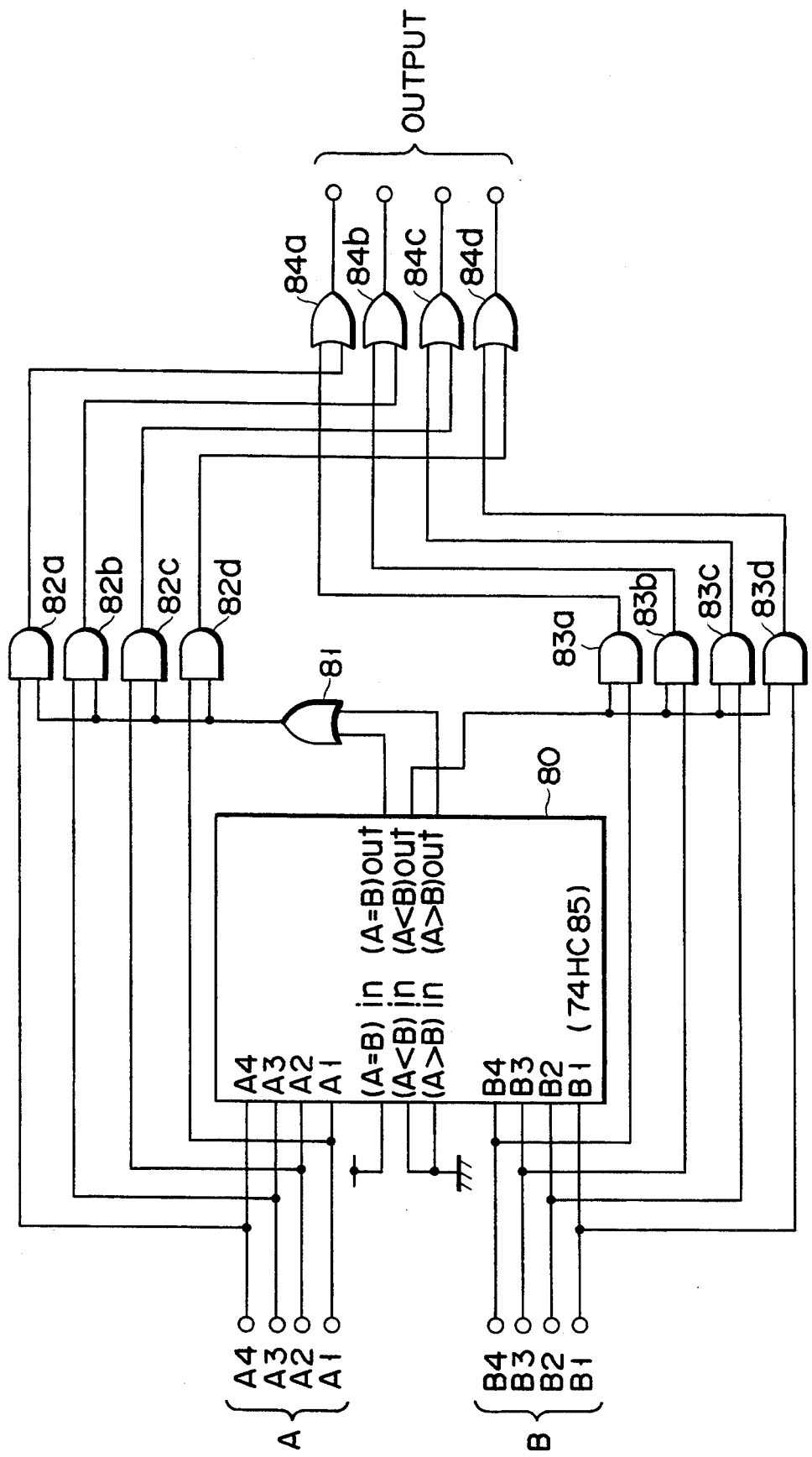
F I G. 65

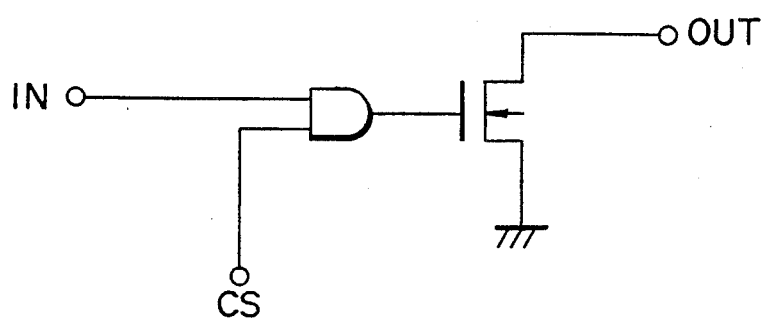
F I G. 67
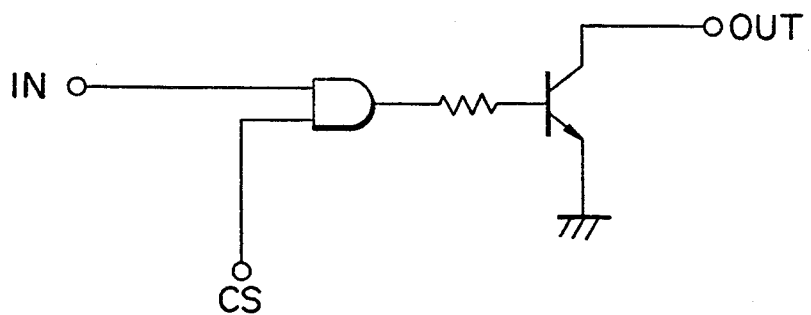
F I G. 68

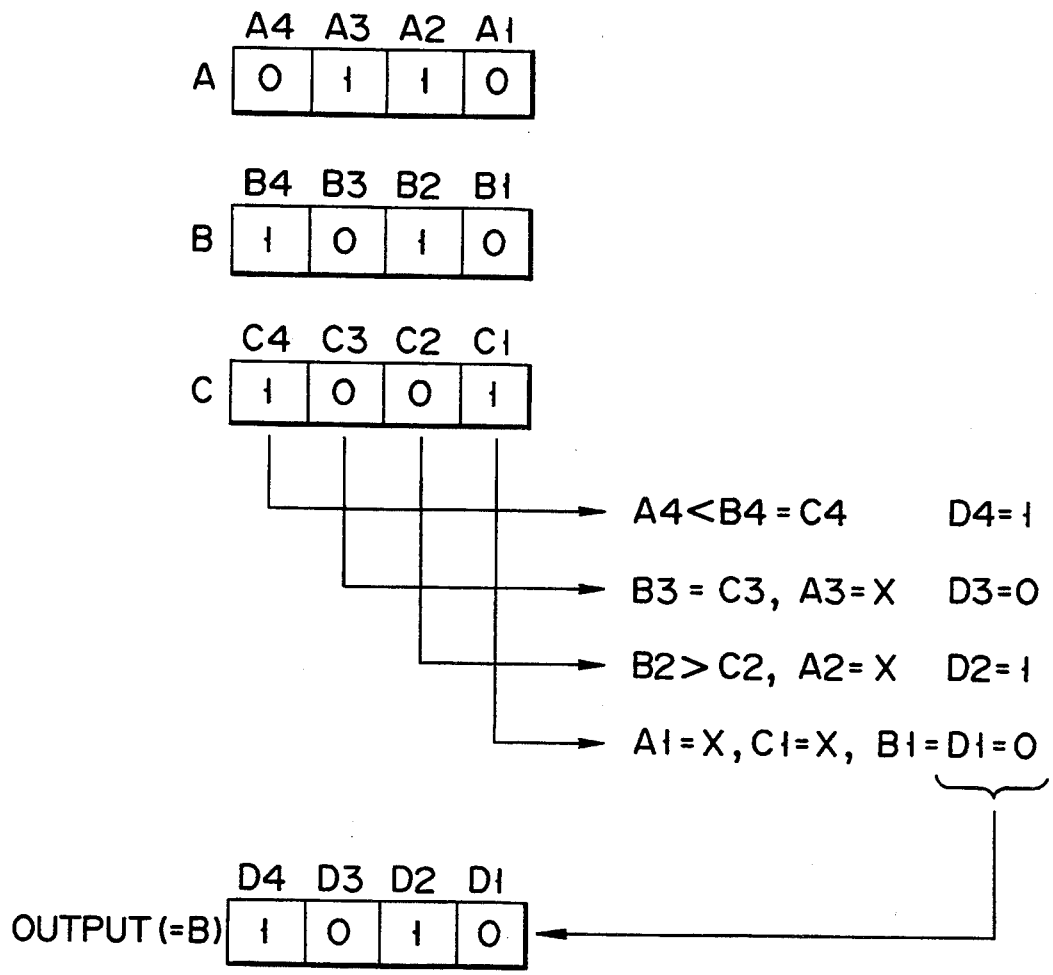
F I G. 69

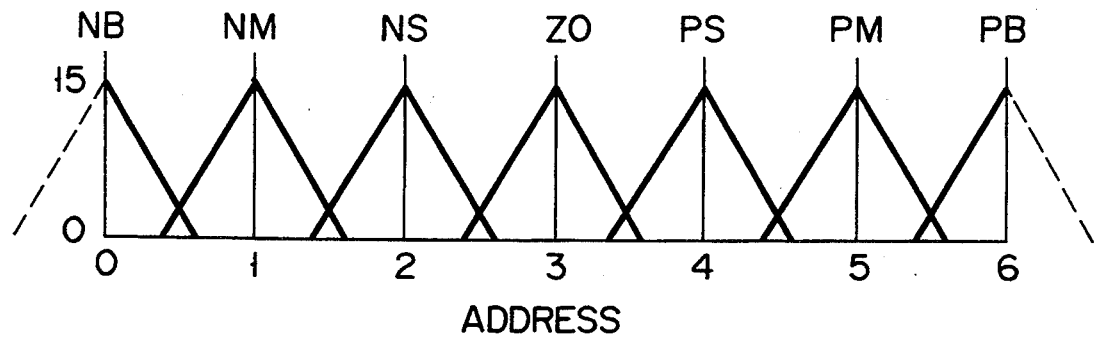
F I G. 70
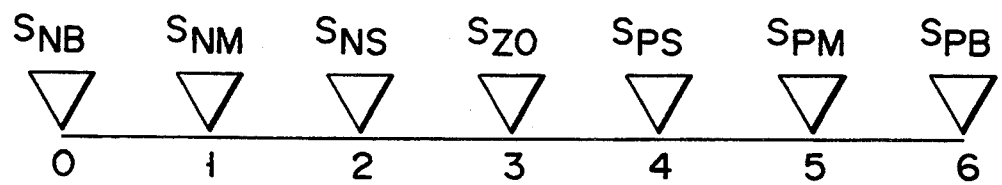
F I G. 71

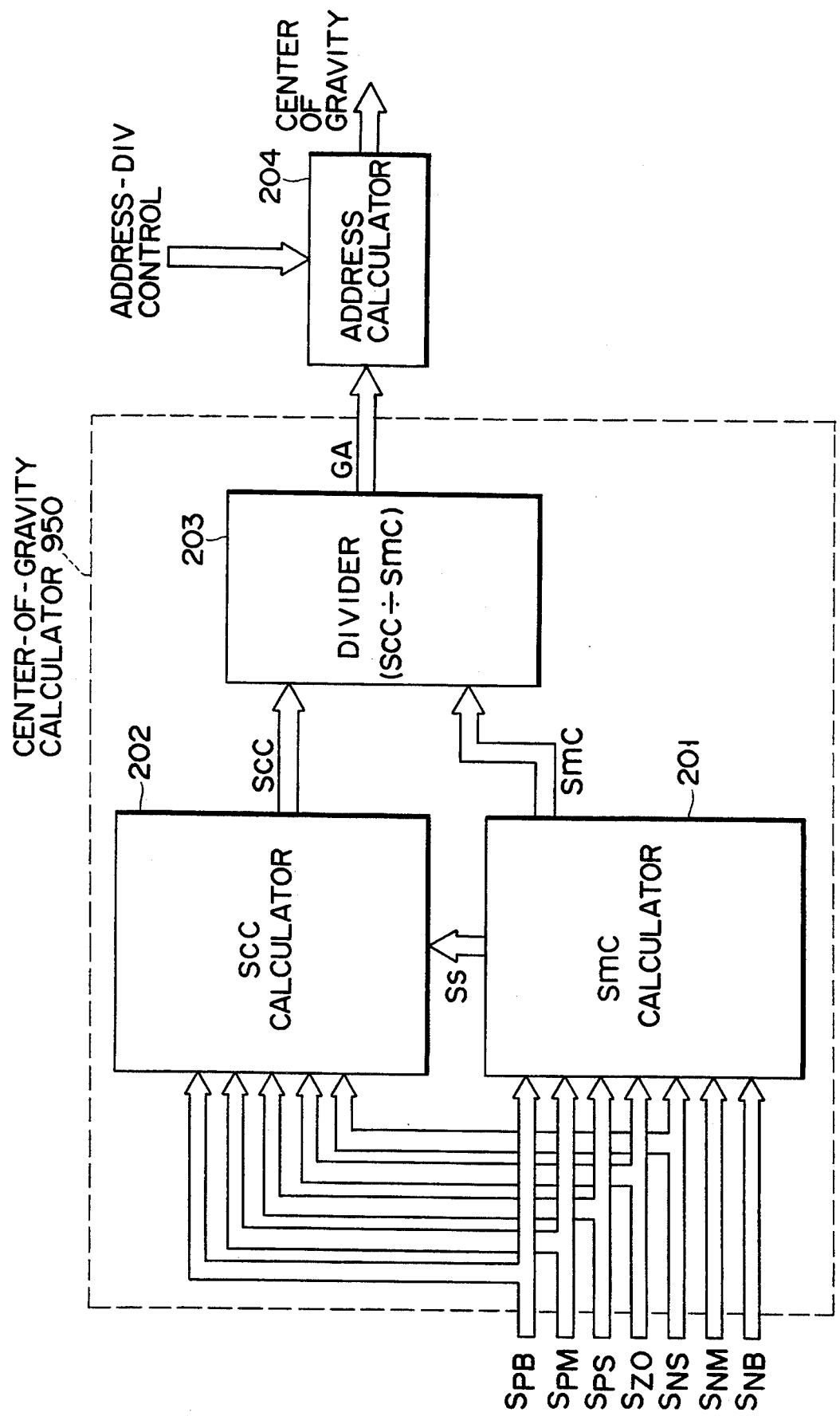
F I G. 72

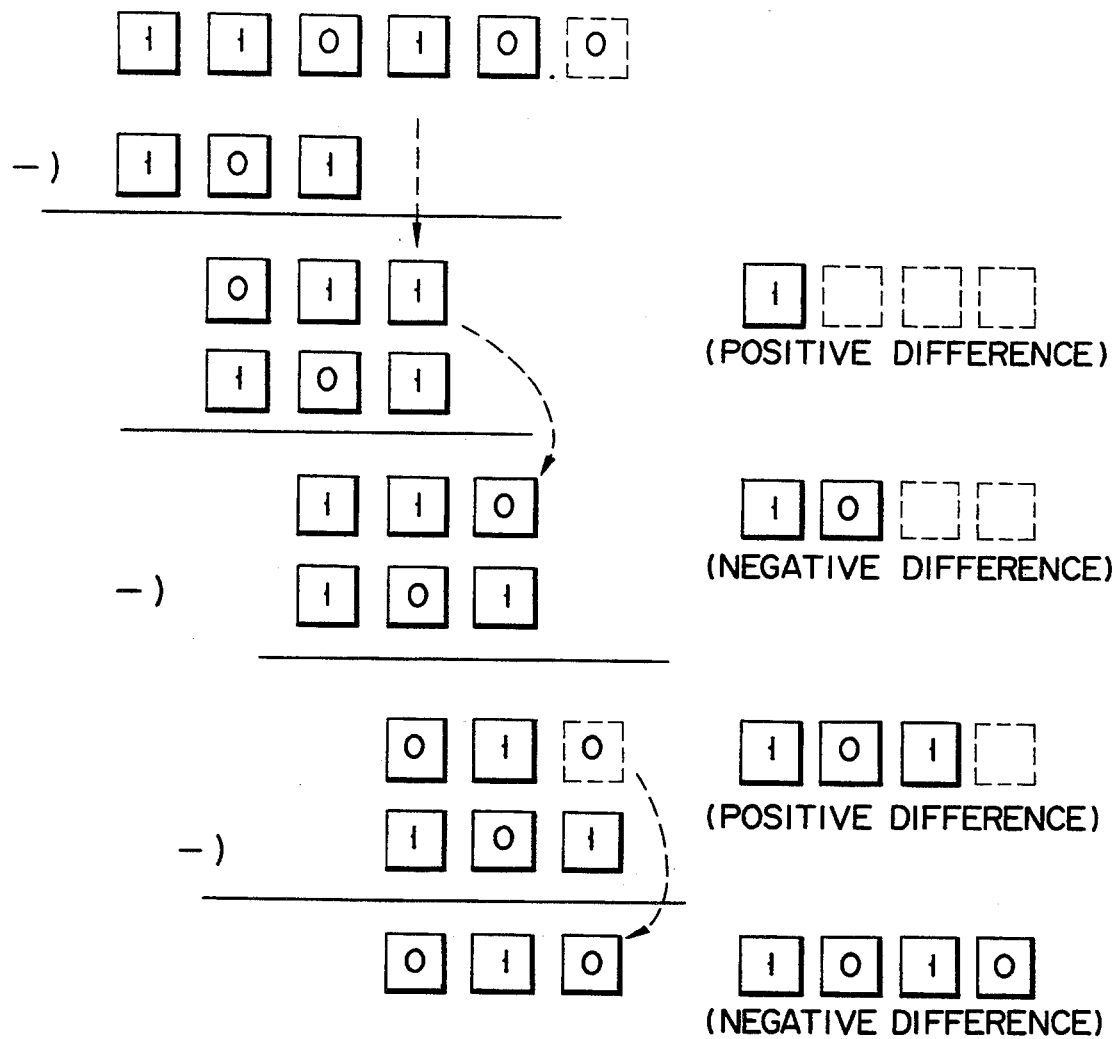
F I G. 75

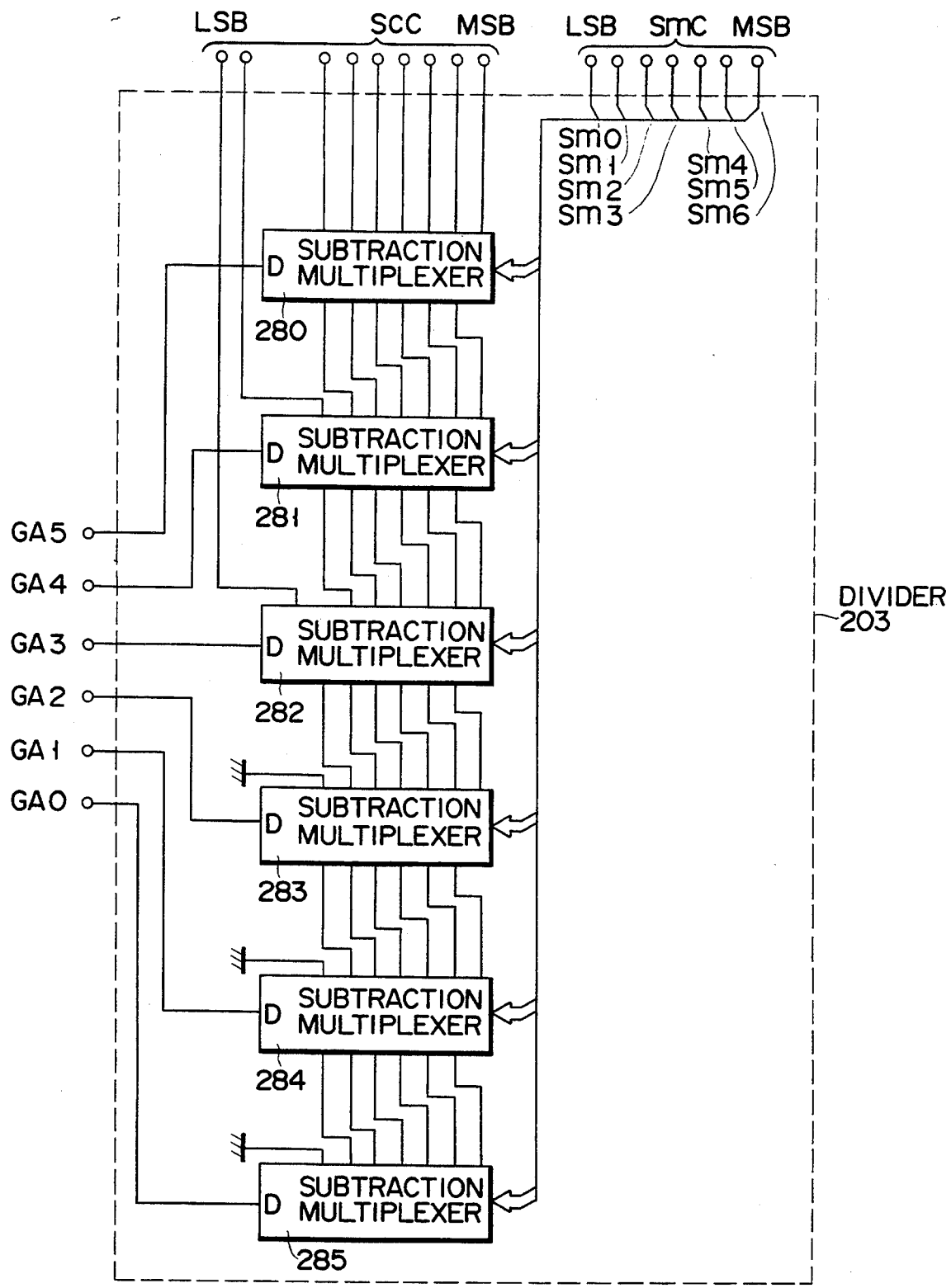
F I G. 76

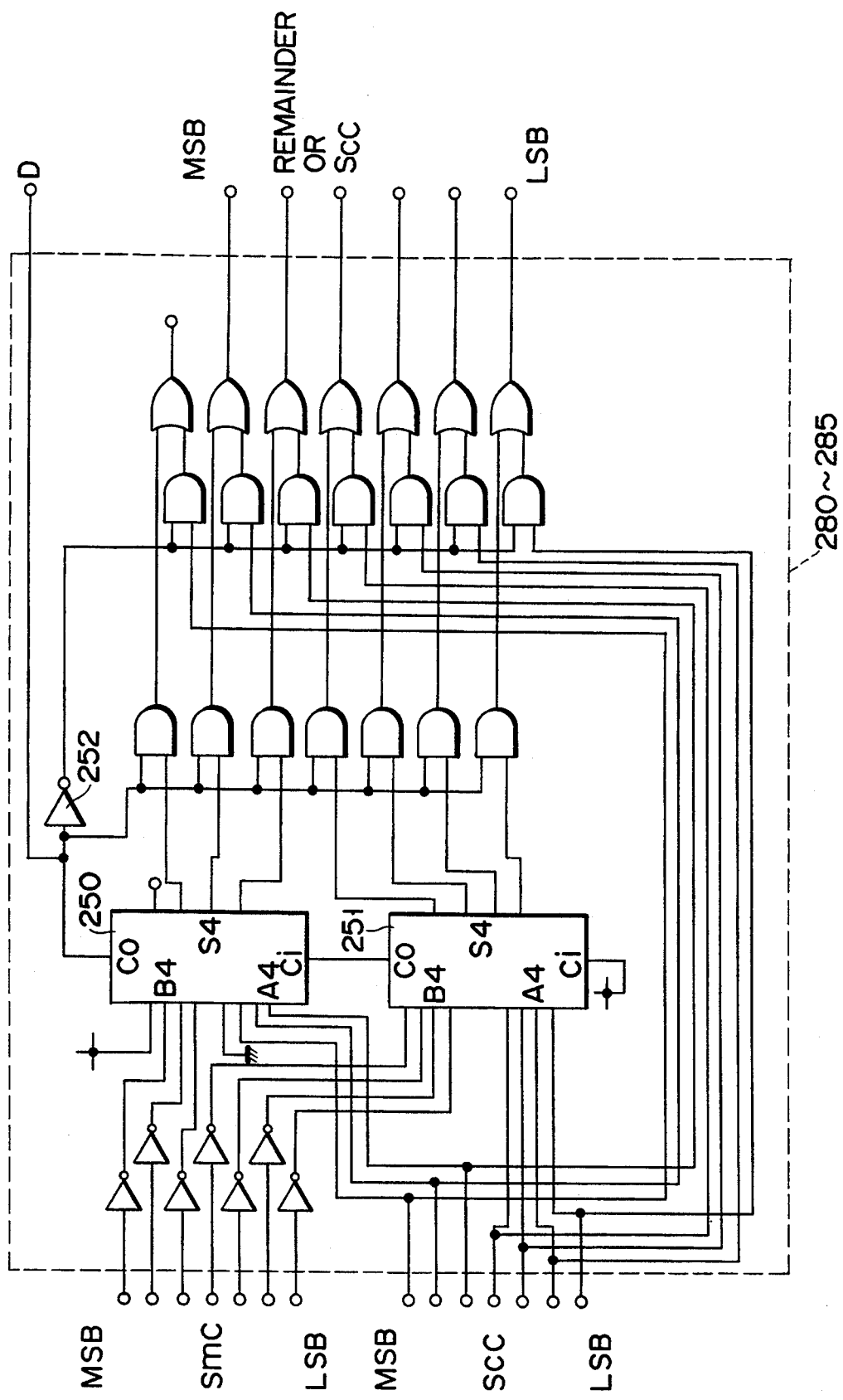
F I G. 77

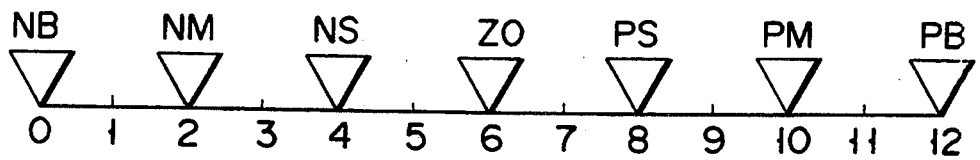
F I G. 78A
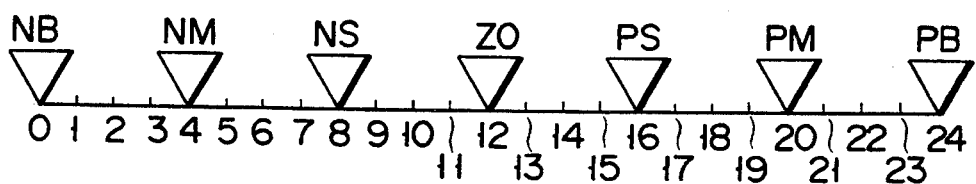
F I G. 78B
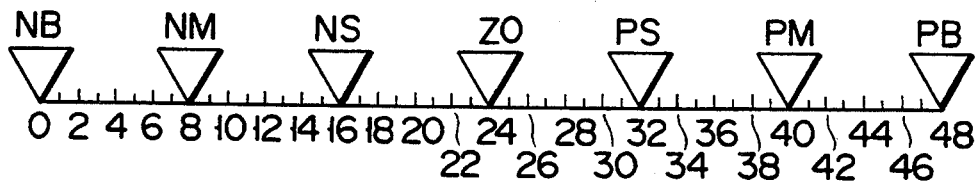
F I G. 78C

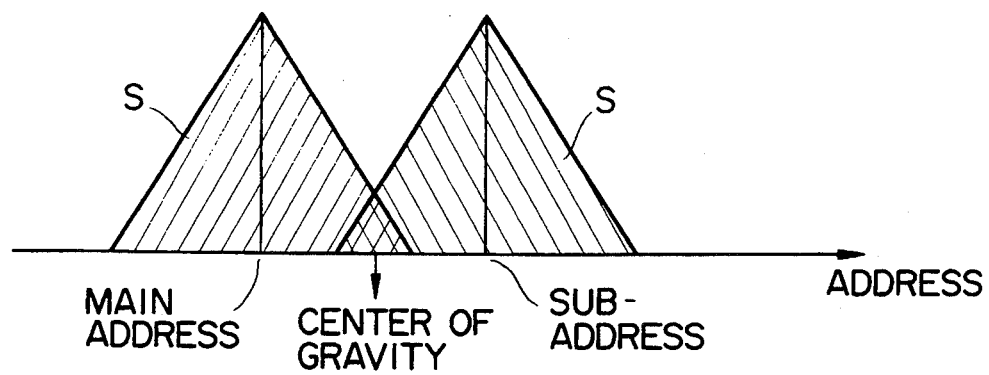
F I G. 79
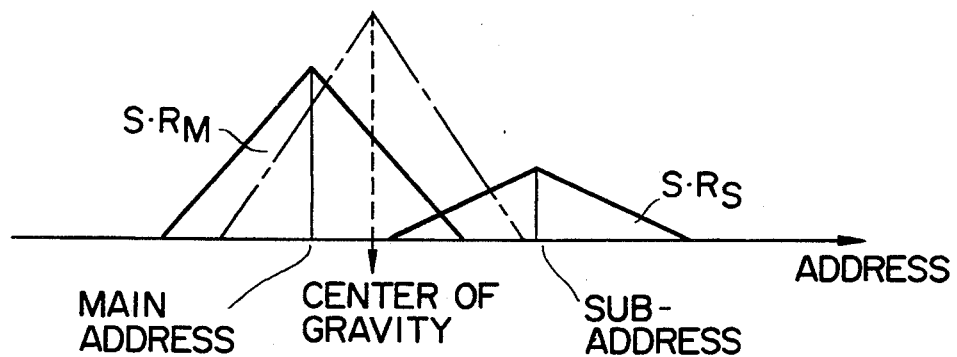
F I G. 80
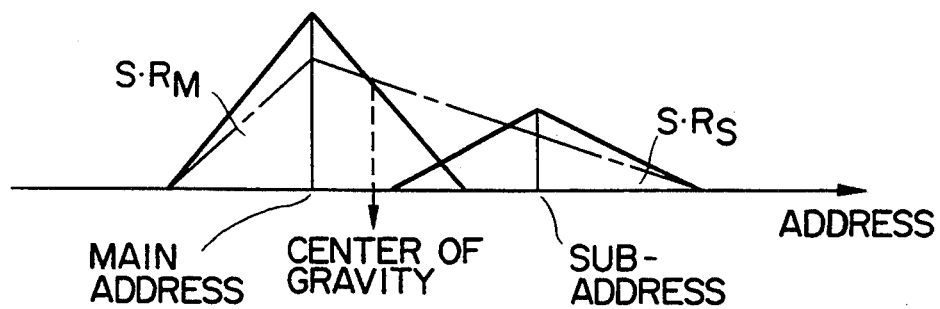
F I G. 81

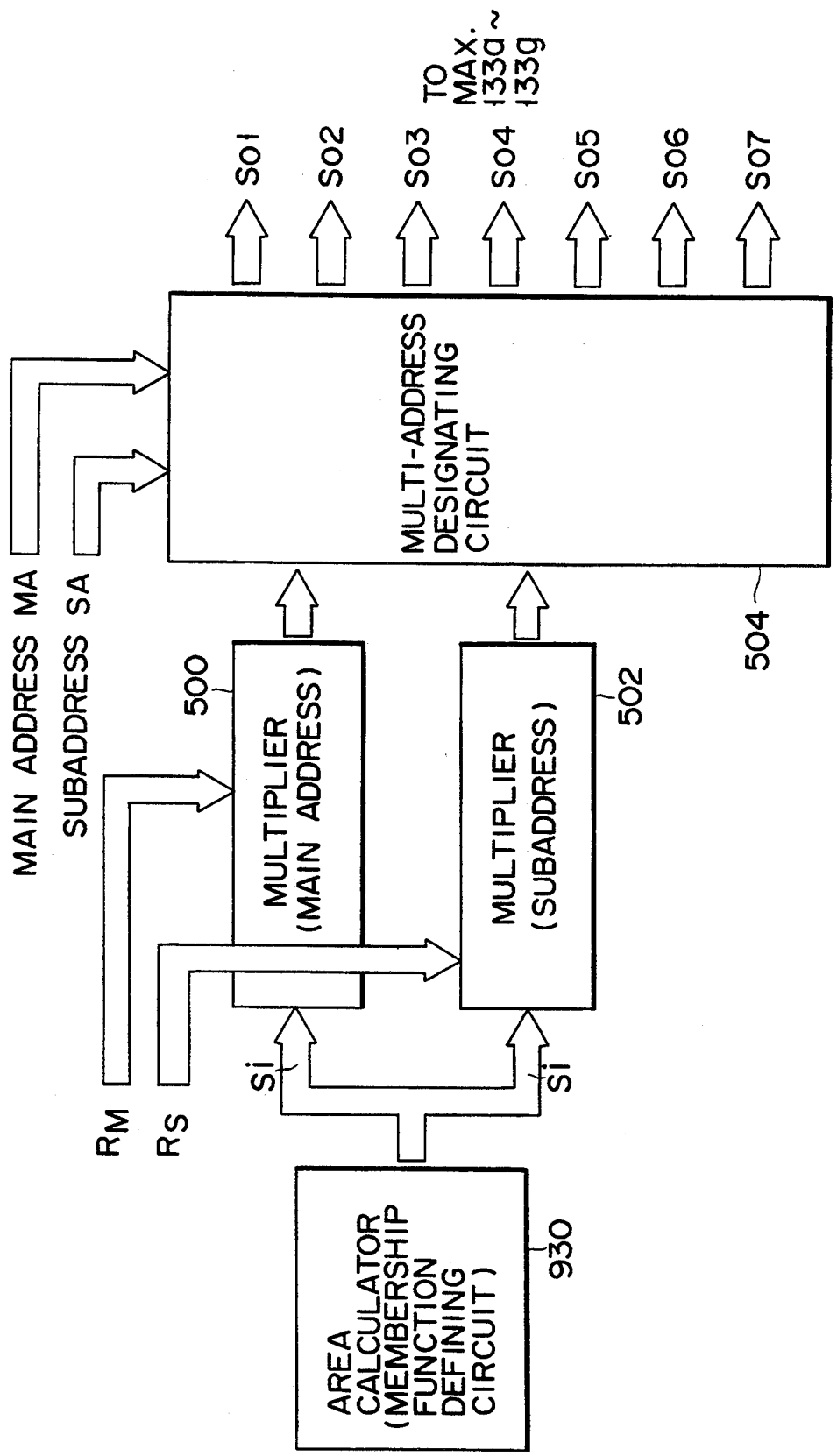
F I G. 82

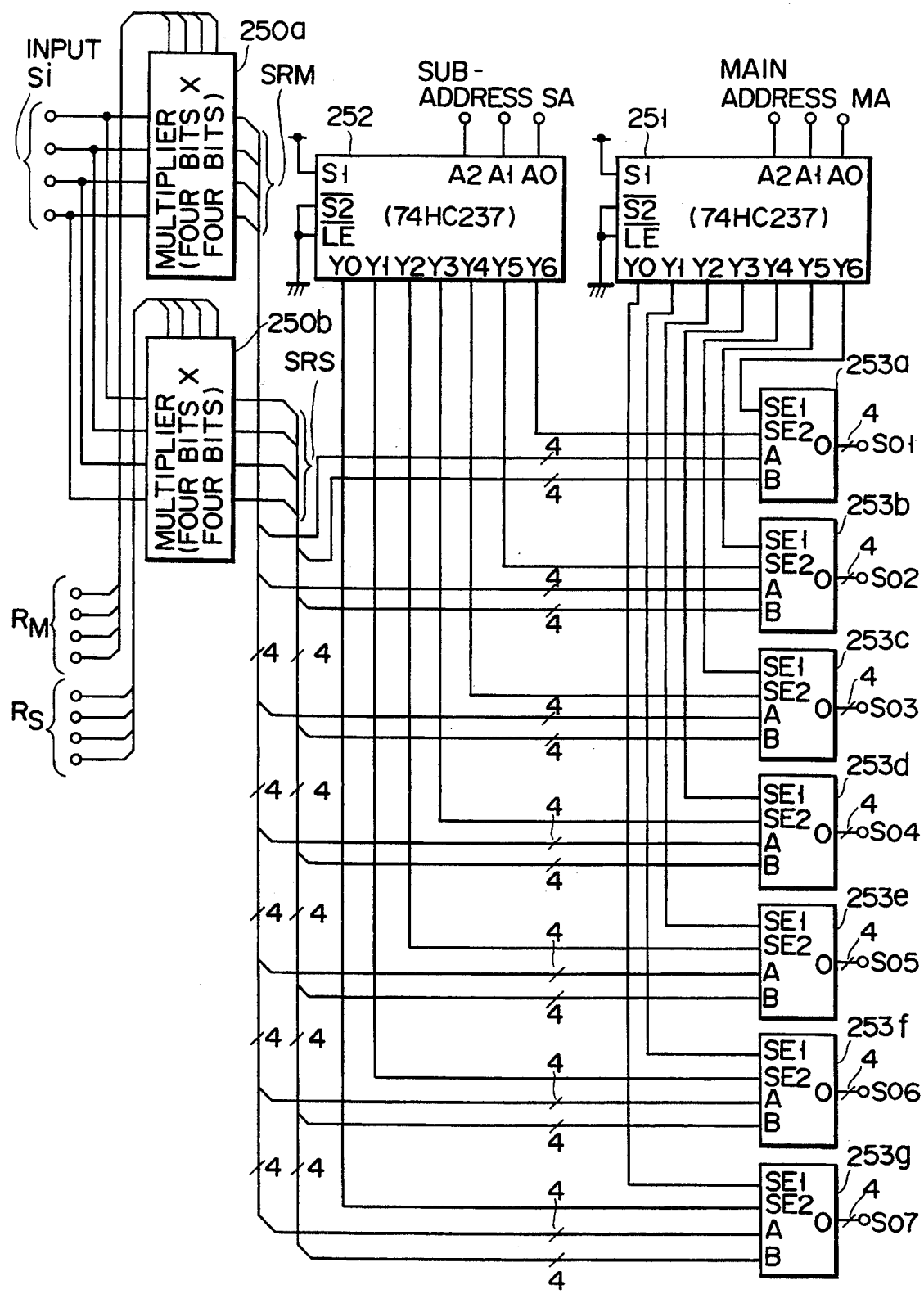
F I G. 83

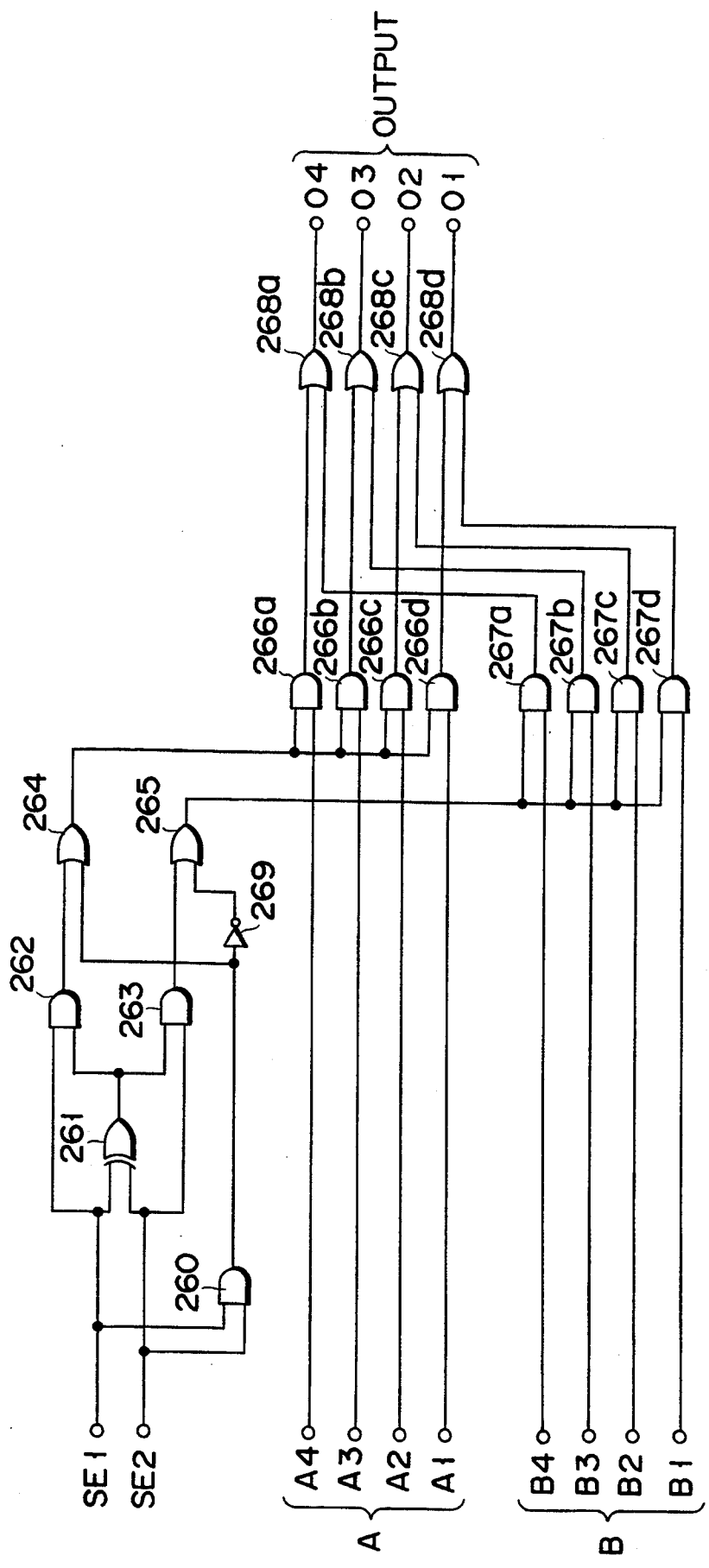
F I G. 84

| CONTROL | | INPUT A | INPUT B | OUTPUT O |
|---|---|---|---|---|
| SE2 | SE1 | A4 A3 A2 A1 | B4 B3 B2 B1 | O4 O3 O2 O1 |
| 0 | 0 | X | X | 0 0 0 0 |
| 0 | 1 | QA4 QA3 QA2 QA1 | X | QA4 QA3 QA2 QA1 |
| 1 | 0 | X | QB4 QB3 QB2 QB1 | QB4 QB3 QB2 QB1 |
| 1 | 1 | QA4 QA3 QA2 QA1 | X | QA4 QA3 QA2 QA1 |

F I G. 85

DIGITAL FUZZY INFERENCE SYSTEM USING LOGIC CIRCUITS

This application is a continuation of application Ser. No. 07/426,576, filed Oct. 24, 1989, now abandoned.

BACKGROUND OF THE INVENTION

1. Field of the Invention

The present invention relates to a digital fuzzy inference system.

The fuzzy theory was suggested by L. A. Zadeh, Professor at California State University, in 1965, and the possibility of practical use of the theory was proven by E. H. Mamdani, Professor at the University of London, in 1974. Various means of implementing the theory have been proposed afterward. There are the following typical examples of such means. In European Patent Application No. 0 092 832 (Japanese Patent Disclosure No. 58-192407), there is described an operation control system for vehicles which lessens the frequency of notch-changes to obtain comfortable ride by inference using software. U.S. Pat. No. 4,716,540 (Japanese Patent Disclosure No. 61-20428) discloses analog fuzzy logic circuits implemented by current circuits. Furthermore, in Nikkei Electronics, No. 457, Oct. 3, 1988, there are described processors using memories developed at Hosei University, North Carolina State University and so on, and processors dedicated to fuzzy controllers for writing data for inference into instruction memories, which are developed at Togai Infralogic Company (Masaki Togai and Hiroyuki Watanabe of AT&T Bell Laboratories, "Expert System on a Chip: An Engine for Real-Time Approximate Reasoning", IEEE EXPERT, FALL 1986) and so on.

The conventional fuzzy inference systems have the following drawbacks. The system based on software can be implemented for the time being by means of a personal computer, microcomputer or the like, but it is very slow in inference speed and thus not practical. The analog system using current circuits requires an interface for use in cooperation with a digital computer. The system using memories and a dedicated processor system require large-scale development tools and system clocks because of the use of memories. In order to increase the inference speed it requires faster clocks. The system clocks may generate noise where the system is used in neighboring analog circuits.

Furthermore, the result of inference depends on how to define an if-part (or condition part) membership function and, more particularly, its form or type. With the conventional systems, it is difficult to freely define the form or type of the if-part membership function. Similarly, it is impossible to freely define then-part (or conclusion part) membership functions because their output positions or addresses are fixed to predetermined discrete values and they are also defined uniquely.

SUMMARY OF THE INVENTION

It is accordingly an object of the present invention to provide a digital fuzzy inference system which needs no system clocks.

It is another object of the present invention to provide a digital fuzzy inference system which is fast in inference speed.

It is still another object of the present invention to provide a digital fuzzy inference system which may readily be controlled by a digital computer without the intervention of an interface.

It is a further object of the present invention to provide a digital fuzzy inference system which may be designed without the necessity of development tools.

It is a still further object of the present invention to provide a general-purpose digital fuzzy inference system which is simple in construction and adaptable to various definitions.

It is another object of the present invention to provide a calculation circuit for obtaining a minimum value and a calculation circuit for obtaining a maximum value for use in a digital fuzzy inference system, which are simple in construction.

A further object of the present invention is to provide a digital fuzzy inference system which prevents the overall circuit scale from increasing even if the number of if-part inputs increases by the use of an if-part membership function definition circuit simple in construction.

A still further object of the present invention is to provide a digital fuzzy inference system simple in construction which allows the forms or types of if-part membership functions to be defined freely.

Another object of the present invention is to provide a digital fuzzy inference system of a simple construction which allows then-part membership functions to be defined freely.

A digital fuzzy inference system according to the present invention has a fuzzy inference processor constructed with digital logic circuits. Hence, the fuzzy inference is performed on the basis of input binary data without the need for system clocks and an inferential result is output as binary data. Therefore, a general-purpose digital fuzzy inference processor can be provided which is simple in construction, obviates the need for system clock, can increase the inference speed, can easily be controlled by a digital computer without intervention of an interface and can be designed without development tools.

A digital fuzzy inference system according to the present invention comprises an input device for setting a inflection point of a membership function as binary data, a calculation circuit for obtaining a difference between binary data of the inflection point and input binary data and multiplier or divider for multiplying or dividing the difference by a one of values which is in accordance with a plus or minus sign of the difference. Hence, the slope of the function may be varied at the inflection point, whereby the form of the if-part membership function can be defined freely with a simple construction.

A digital fuzzy inference system according to the present invention comprises a plurality of calculation circuits each of which multiplies or divides each of the the areas of the results of inference by a specified parameter and a circuit for outputting the result of multiplication or division to predetermined plural addresses. Hence, the positions or addresses of then-part membership functions can be set freely and the then-part membership functions can also be defined freely.

BRIEF DESCRIPTION OF THE DRAWINGS

FIG. 6 is a block diagram of a first example of the if-part membership function defining circuit of FIG. 2;

FIG. 7 illustrates relationships between if-part membership function defining parameters and types of functions;

FIGS. 8A, 8B, 8C and 8D illustrate various types of if-part membership functions;

FIG. 13 illustrates the operation of the 1-bit full adder of FIG. 12;

FIGS. 14, 15 and 16 are diagrams for illustrating the operation of the subtracter of FIG. 10;

FIG. 22 is a block diagram of a fourth example of the if-part membership function defining circuit;

FIG. 23 is a block diagram of a fifth example of the if-part membership function defining circuit;

FIGS. 25A and 25B show examples of if-part membership functions defined by the sixth example of the if-part membership function defining circuit shown in FIG. 24;

FIG. 26 is a block diagram of a seventh example of the if-part membership function defining circuit;

FIGS. 27, 28 and 29 illustrate typical examples of the F-type membership function;

FIGS. 30A, 30B, 30C, 30D, 30E, 30F, 30G, 30H, 30I, 30J, 30K, 30L, 30M and 30N illustrate variations of membership functions contained in the F-type membership function;

FIG. 31 is a detailed connection diagram of the seventh example of the if-part membership function defining circuit shown in FIG. 26;

FIGS. 33, 34, 35, 36, 37, 38, 39 and 40 illustrate circuit arrangements of functional blocks of FIG. 32, in which FIG. 33 illustrates the first subtracter, FIG. 34 illustrates the selector, FIG. 35 illustrates the second subtracter, FIG. 36 illustrates the first comparator, FIG. 37 illustrates the second comparator/first function specifying circuit FIG. 38 illustrates the first multiplier, FIG. 39 illustrates the first and second coefficient specifying circuits, and FIG. 40 illustrates the second multiplier/third subtracter/second function specifying circuit;

FIG. 41 illustrates input/output relationships of the function specifying circuit;

FIGS. 42, 43, 44, 45, 46, 47 and 48 are circuit diagrams of the macro-cells of FIGS. 33 through 40, in which FIG. 42 illustrates the half adder, FIG. 43 illustrates the 1-bit full adder, FIG. 44 illustrates the magnitude comparator, FIG. 45 illustrates the 2-bit full adder, FIG. 46 illustrates the 4-bit full adder, FIG. 47 illustrates the multiplier, and FIG. 48 illustrates the multiplier provided with an output inverting circuit;

FIG. 50 is a diagram for illustrating the operation of the digital comparator of FIG. 49;

FIG. 55 shows the form of a then-part membership function;

FIG. 56 illustrates the relationship between then-part membership functions and their addresses;

FIG. 58 is a circuit diagram of the adder/subtracter of FIG. 57;

FIG. 59 is a circuit diagram of the shift operation circuit of FIG. 57;

FIG. 60 is a diagram for illustrating the operation of the shift operation circuit of FIG. 59;

FIG. 61 is a diagram for illustrating the operation of the then-part membership function defining circuit of FIG. 57;

FIG. 62 is a block diagram of the membership function synthesizing circuit of FIG. 2;

FIG. 63 is a circuit diagram of the address selector of FIG. 62.

FIG. 64 is a diagram for illustrating the operation of the address selector of FIG. 63;

FIG. 65 is a circuit diagram of a first example of the maximum-value calculation circuit;

FIG. 67 is a circuit diagram of the inverting buffer circuit of the open drain output type of FIG. 66;

FIG. 68 is a circuit diagram of the inverting buffer circuit of the open collector output type;

FIG. 69 is a diagram for illustrating the operation of the maximum-value calculation circuit shown in FIG. 66;

FIG. 70 illustrates the results of the fuzzy inference obtained by the membership function synthesizing circuit;

FIG. 71 illustrates the principle of the calculation of the center of gravity;

FIG. 72 illustrates a circuit arrangement of the center-of-gravity calculation circuit;

FIG. 75 is a diagram for illustrating the operation of the divider of FIG. 72;

FIG. 76 shows a circuit arrangement of the divider of FIG. 72;

FIG. 77 shows a circuit arrangement of the subtraction multiplexer of FIG. 76;

FIGS. 78A, 78B and 78C illustrate the address division;

FIGS. 79, 80 and 81 are diagrams for illustrating the multi-address designating of the then-part membership functions;

FIG. 82 is a block diagram of the multi-address designating circuit included in the then-part membership functions;

FIG. 83 shows a detailed digital circuit of the multi-address designating circuit of FIG. 82;

FIG. 84 is a circuit diagram of the data selector;

FIG. 85 is a diagram for illustrating the input/output relationship of the data selector of FIG. 85;

DETAILED DESCRIPTION OF THE PREFERRED EMBODIMENTS

Figure 1:
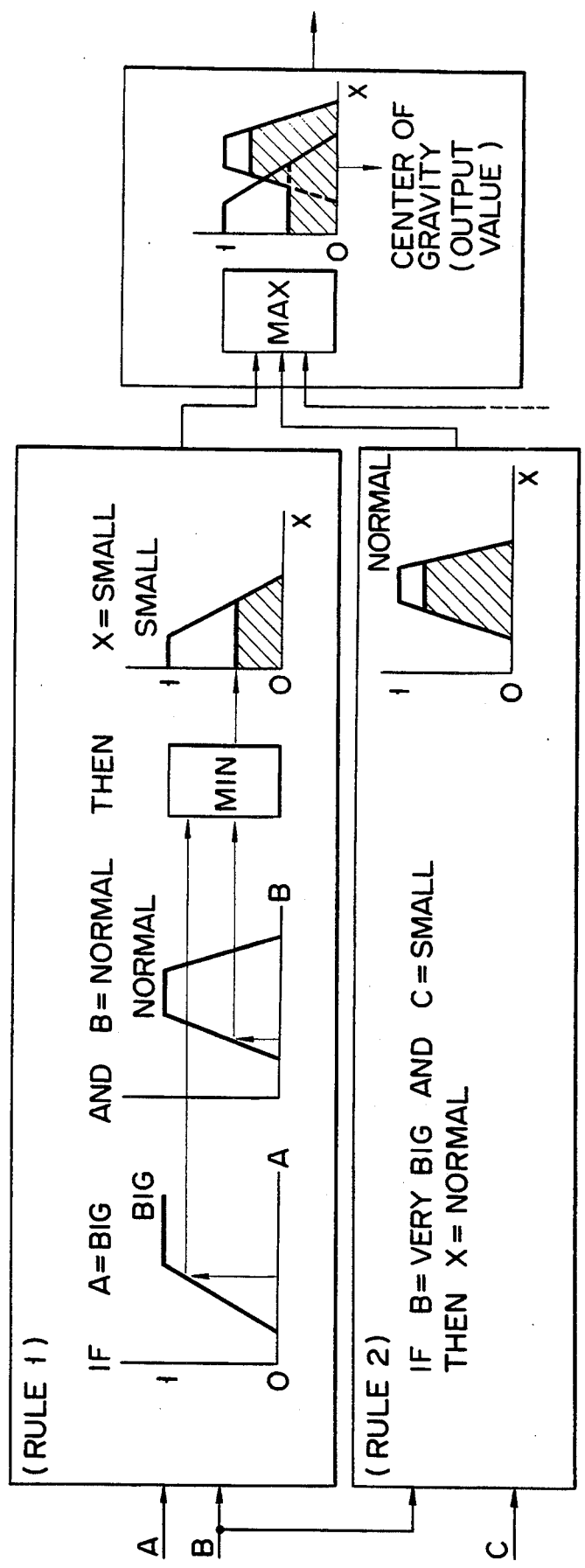
FIG. 1 is a diagram for illustrating the concept of the fuzzy theory.

Prior to description of the embodiments of a digital fuzzy inference system according to the present invention, an outline of the fuzzy inference will be given first with reference to FIG. 1. The fuzzy inference is a type of inference which uses fuzzy-rules (fuzzy inference rules) expressed by ambiguous words that human beings employ in their every day life. The fuzzy-rules can be described such that "if A=BIG and B=NORMAL then X=SMALL". In FIG. 1, A, B and C represent input variables, while X represents an output variable. The part "if A=BIG and B=NORMAL" that describes conditions under which the fuzzy-rules are established is referred to as the if-part or condition part, while the part "then X=SMALL" describing its conclusion is referred to as the then-part or conclusion part.

With the fuzzy inference, each of the input variables is converted to a value ranging from 0 to 1 for computation. It is a membership function (if-part membership function) that defines the conversion of an input variable to the value. The membership function is defined for each of propositions (BIG, NORMAL, SMALL) which are described in the fuzzy-rules. By referring to the membership function, a degree (membership value) to which the input variable meets the corresponding proposition is calculated. When there are a plurality of prepositions in the if-part, the minimum value of the membership values is found. This process is called the minimum-value calculation.

Next, the membership values for respective rules are synthesized. This is performed by making a comparison among the then-parts of the rules to obtain the maximum value of the then-parts membership values and producing a new membership function. This process is called the maximum-value calculation. A value of the center of gravity of the synthesized membership function is used as the result of the inference (output value). The succeeding stage is controlled by the output value.

The inference system illustrated in FIG. 1 is a typical example though there are some other inference systems. The embodiments of the present invention will be described below in accordance with the inference system of FIG. 1. It is to be noted that other inference system can be used in the present invention.

Figure 2:
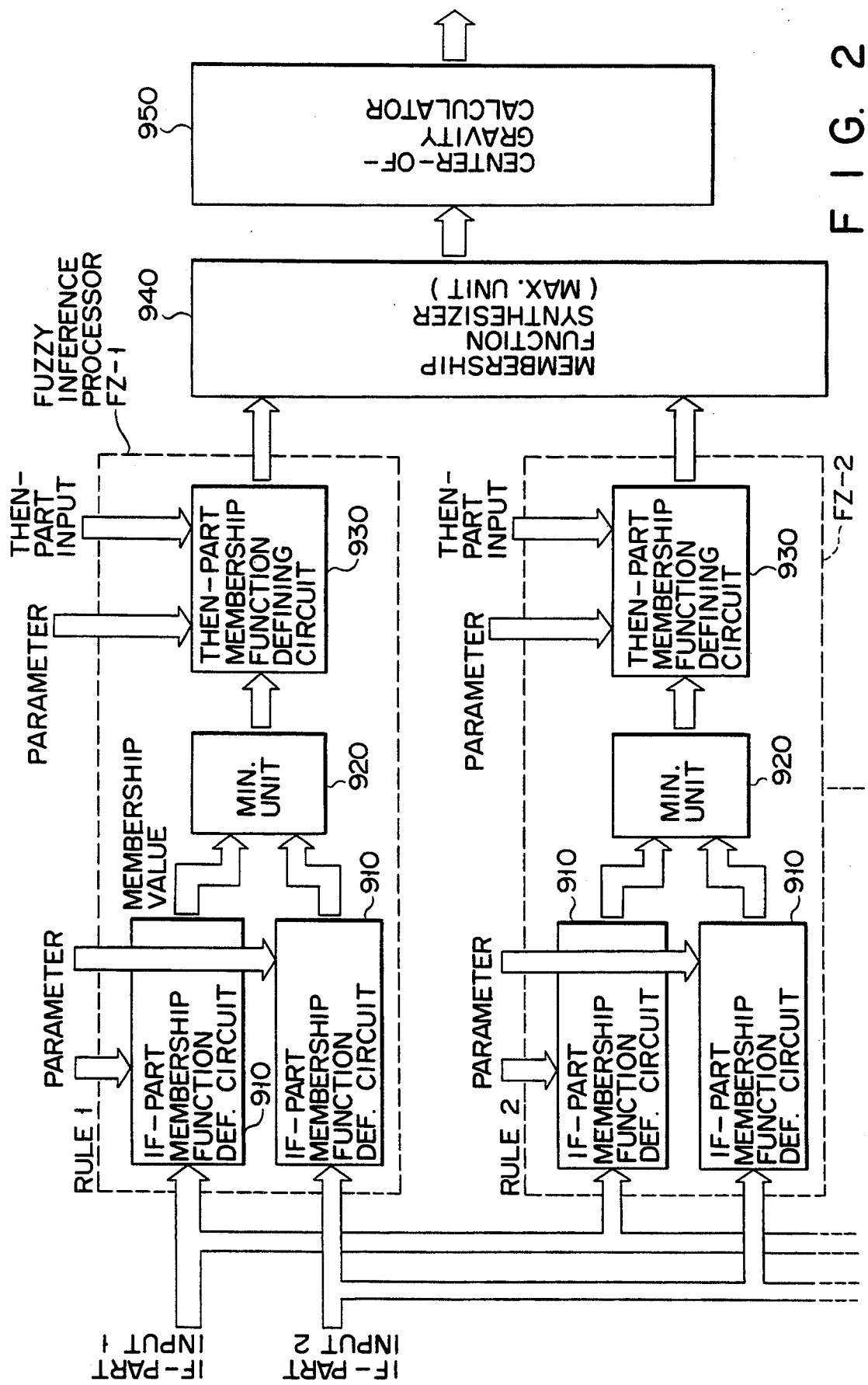
FIG. 2 is a block diagram of a first embodiment of a digital fuzzy inference system according to the present invention.

Referring to FIG. 2, there is illustrated a block diagram of a first embodiment of the present invention. Fuzzy inference processors FZ-1, FZ-2 . . . are provided for each of fuzzy rules. Outputs of the fuzzy inference processors FZ-1, FZ-2 . . . are applied via a membership function synthesizer (maximum-value calculator) 940 to a center-of-gravity calculator 950 from which an inferential result (output value) is derived.

Each of the fuzzy inference processors FZ-1, FZ-2, . . . comprises an if-part membership function defining circuits 910, a minimum-value calculator (min. unit) 920 and a then-part membership function defining circuit 930. IF-part membership function defining circuits 910 are equal in number to if-part inputs. Thus the if-part inputs are respectively applied to the if-part membership function defining circuits 910. Each of the membership function defining circuits 910 defines a membership function in accordance with membership function defining parameters and refers to the defined membership function and an if-part input value to calculate and output a degree (membership value) to which the if-part input meets the fuzzy rule. Although, in this embodiment, two membership function defining circuits 910 are provided for each fuzzy rule, the number of the membership function defining circuits increases as the number of the if-part inputs increases.

In each fuzzy rule, membership values output from membership function defining circuits 910 are applied to minimum-value calculator 920, which selects the minimum value from the membership values and applies the minimum value to then-part membership function defining circuit 930. Then-part membership function defining circuit 930 defines a then-part membership function in accordance with then-part membership function defining parameters and a then-part input which is similar to the address parameters to produce a then-part membership function adapted to the rule from the output of the minimum-value calculator 920.

The then-part membership functions for all the rules are synthesized in membership function synthesizer (max. unit) 940 by maximum-value calculation. The result of this synthesis is the fuzzy inferential result. To implement a fuzzy controller which controls an object by an inferential result not to implement an inference device, a definite value is needed as the inferential result. For this reason, the center of gravity of the synthesized membership function is calculated. Center-of-gravity calculator 950 calculates the value of the center of gravity of the synthesized membership function. The calculated value of the center of gravity serves as an output for a fuzzy control.

Figure 3:
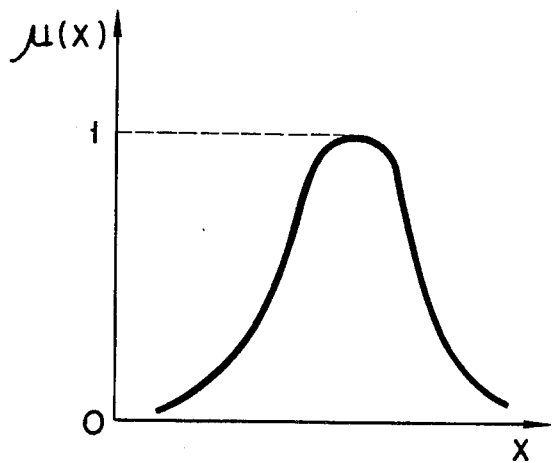
FIG. 3 illustrates a general waveform of an if-part membership function.
Figure 4:
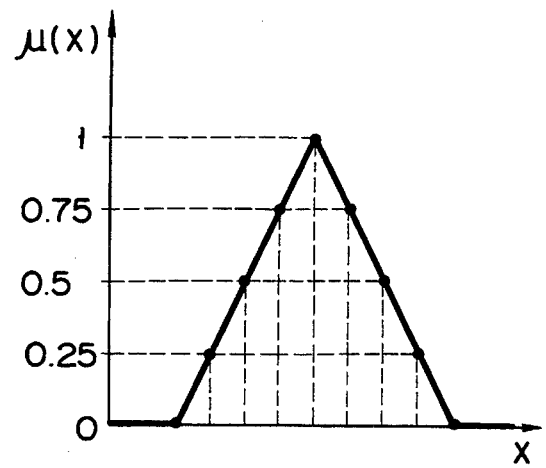
FIG. 4 illustrates a linear-approximated waveform of the if-part membership function.

Hereinafter each of the blocks in the embodiment of FIG. 1 will be described in detail. First, if-part membership function defining circuit 910 will be described. In general, a membership function $\mu(x)$ is represented by such a curve as shown in FIG. 3. However, if it is represented by straight lines as shown in FIG. 4, no problem will arise in practical use. Furthermore, the membership value usually takes a value which may continuously vary within the range [0, 1]. However, the membership value may be represented to take a discrete value as shown in FIG. 4, providing advantages in design of digital circuits.

Figure 5:
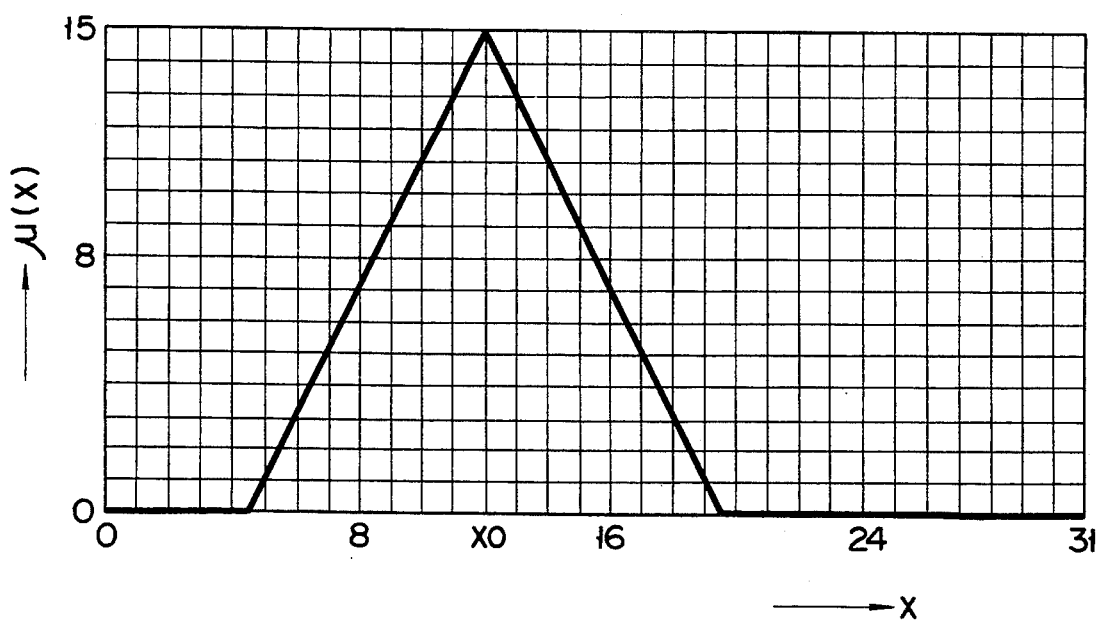
FIG. 5 illustrates the definition of the if-part membership function in the first embodiment.

For this reason, to define a membership function in this embodiment, such a matrix of 16 rows×32 columns as shown in FIG. 5 is supposed. A membership value is represented by a 4-bit binary code by dividing [0, 1] into 16. In this way, the membership value can take a discrete value ranging from 0 to 15 and be represented on the 16×32 matrix. Similarly, an input variable x is also represented by a 5-bit binary code ranging from 0 to 31. Assuming that the membership function is triangular in shape as shown in FIG. 4, the membership function $\mu$ (x) can be defined by a value xo of the input variable × at which the membership value takes the maximum value of 15 and a slope (gradient) k of the membership value with respect to the input variable x. In this example, the input variable x is represented by five bits and the membership function $\mu$ (x) is represented by four bits. However, the number of bits may be freely set according to uses.

Not all the values of membership function are required for subsequent calculation. The membership values $\mu$ (xi) corresponding to the if-part inputs xi have only to be obtained. If a membership function is defined in the matrix of 16×32 as shown in FIG. 5, then the membership function $\mu$ (xi) will be expressed by $$\mu(xi) = 15 - k \times |xo - xi| \quad (1)$$
When
$$15 - k \times |xo - xi| < 0,$$
$$\mu(xi) = 0$$

where xo is the value (point of inflection) of x at which the membership function $\mu$ (x) takes the maximum value of 15, xi an if-part input, and k is a slope of the membership function. In the example of FIG. 5, xo=12 and k=2.

One example of membership function defining circuit 910 arranged on the basis of equation (1) is illustrated in FIG. 6. Inputs to this circuit are definition parameters xo and k, an if-part input xi and form parameters K1 and K2 (to be described later). The absolute value |xo−xi| of the difference between parameter xo and input xi is first obtained in a subtracter 1.

Next, the product of the slope k of the membership function and the output |xo−xi| of subtracter 1 is obtained in a multiplier 2, and then the difference 15−k×|xo−xi| between the maximum value of 15 of the membership values and the output k×|xo−xi| of multiplier 2 is obtained in a second subtracter 3, thereby to obtain a membership function value $\mu$ (xi) for the if-part input xi. At this point, if underflow occurs as a result of subtraction in second subtracter 2, that is, if $\mu$ (xi)<0, the membership value $\mu$ (xi) is fixed to the minimum value of 0. To this end, an AND circuit 4 is provided to follow subtracter 3, which receives the result of subtraction and an underflow signal from subtracter 3.

Multiplier 2 includes also a circuit (to be described later) for converting the form of a membership function from such a triangular form (referred to as an A-function) as shown in FIGS. 4 and 5 to other forms (an N-function, an S-function and a V-function). The form of a membership function depends upon parameters k1 and k2 as shown in FIG. 7. The forms of A-function, N-function, S-function and V-function are illustrated in FIGS. 8A, 8B, 8C and 8D, respectively.

Figure 9:
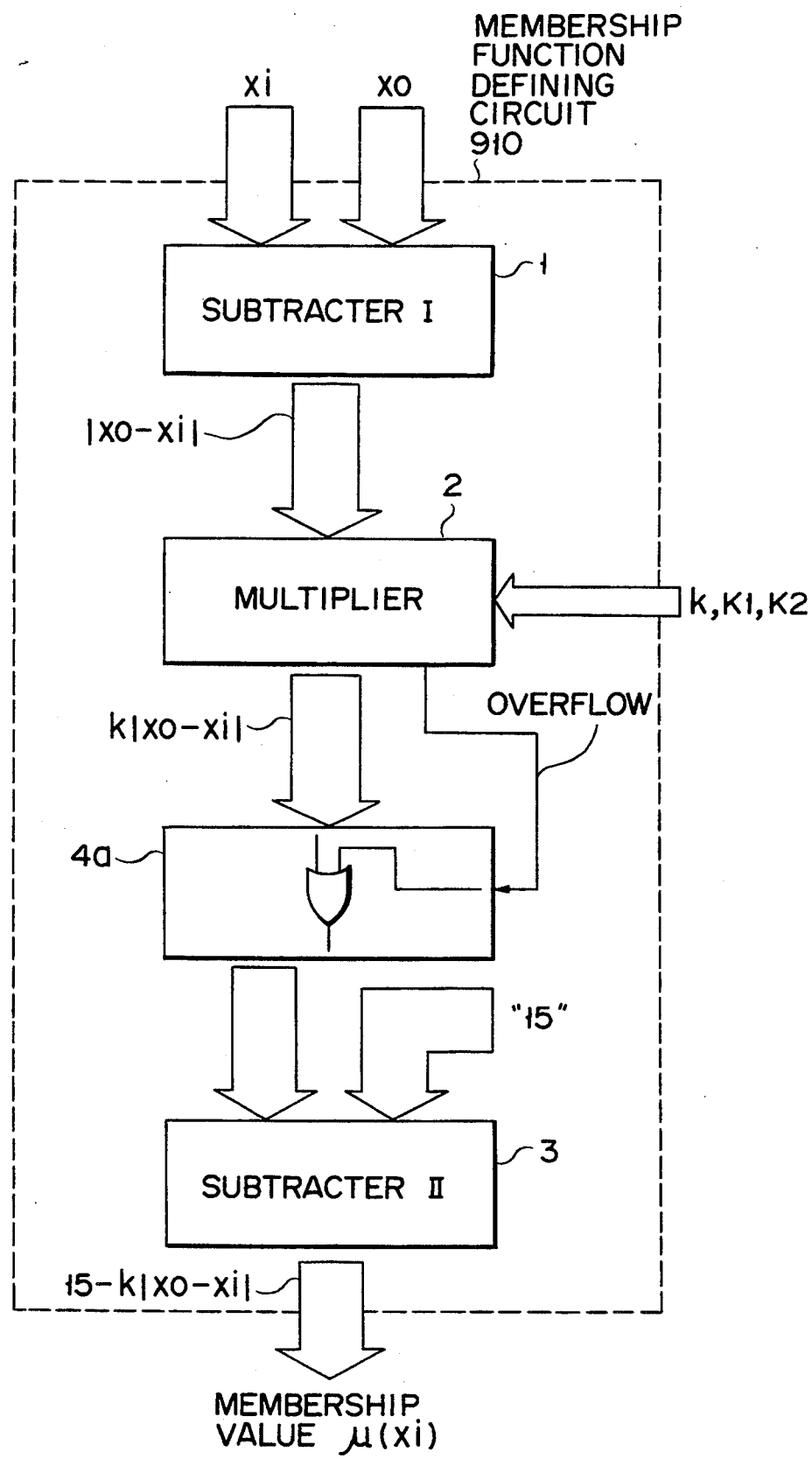
FIG. 9 is a block diagram of a second example of the if-part membership function defining circuit.

FIG. 9 illustrates a second example of membership function defining circuit 910 that implements equation (1). In order to simplify the circuit arrangement as compared with the first example, in the second example, the order of connection of subtracter 3 and AND circuit 4 of FIG. 6 is reversed and moreover an OR circuit 4a is used in place of AND circuit 4.

Figure 10A:
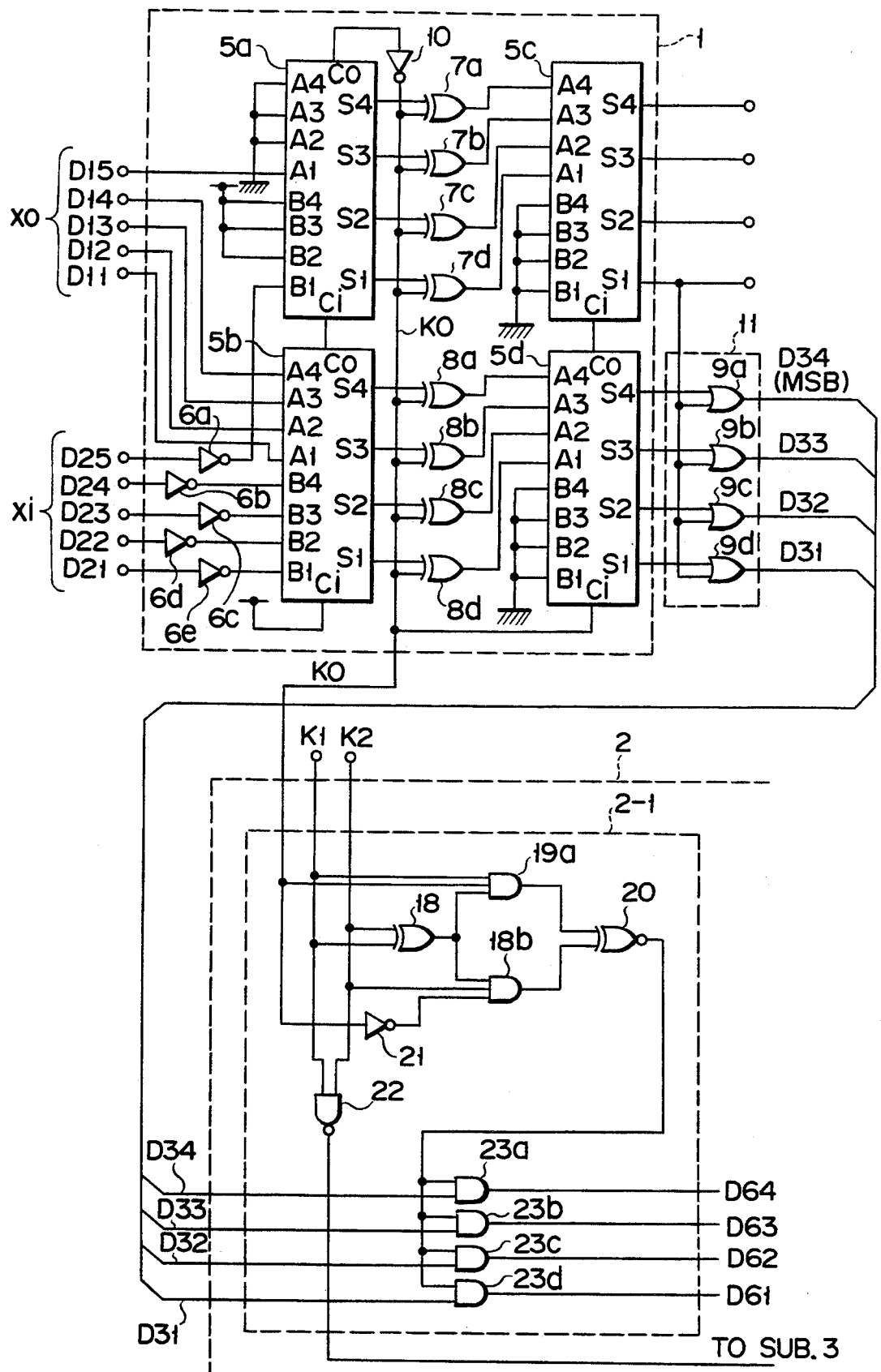
FIGS. 10A and 10B illustrate a detailed circuit arrangement of the if-part membership function defining circuit of FIG. 9.
Figure 10B:
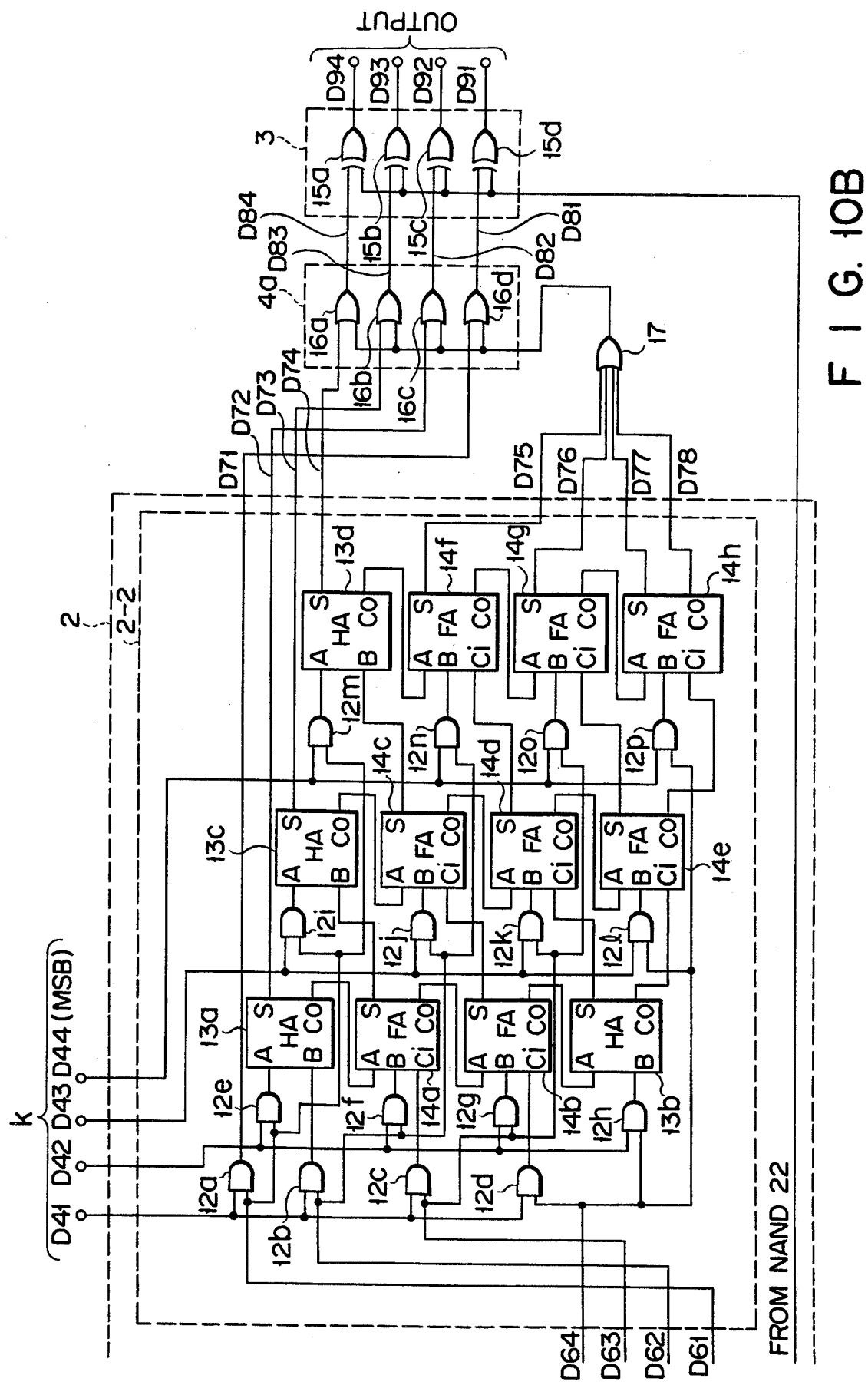

In FIG. 10A and 10B, there is illustrated a specific example in which the circuit of FIG. 9 is implemented by digital logic circuits. The circuits 1, 2, 3 and 4a of FIGS. 10A and 10B correspond to the first subtracter 1, multiplier 2 and second subtracter 3 and OR circuit 4 of FIG. 9, respectively.

Figure 11:
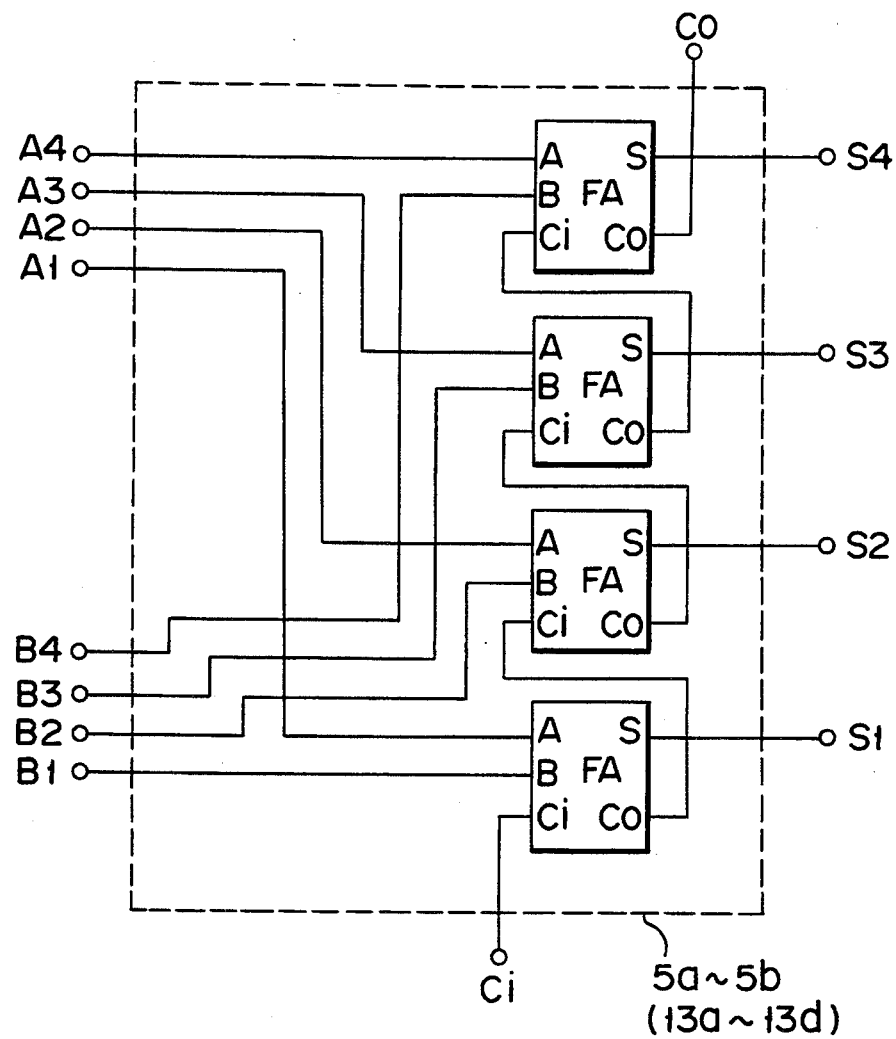
FIG. 11 illustrates a circuit arrangement of the 4-bit full adder of FIG. 10.
Figure 12:
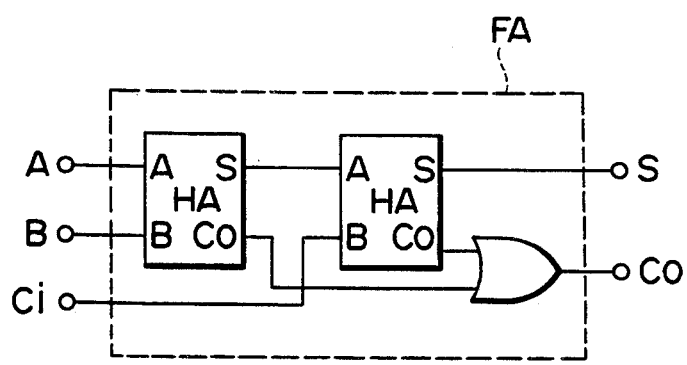
FIG. 12 shows a circuit arrangement of the 1-bit full adder of FIG. 10.
Figures 17, 18:
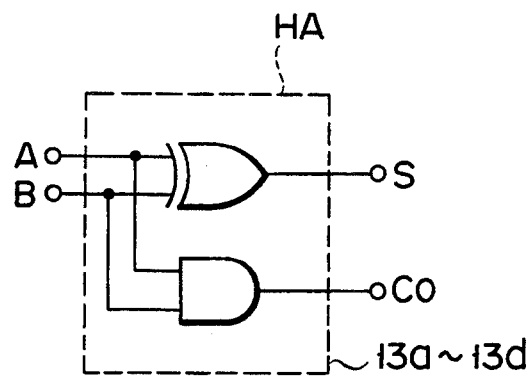
FIG. 17 a circuit arrangement of the 1-bit half adder of FIG. 10.
FIG. 18 illustrates the operation of the 1-bit half adder of FIG. 10.

First subtracter 1 has four 4-bit full adders 5a, 5b, 5c and 5d, each of which comprises a cascade connection of four 1-bit full adders FA as shown in FIG. 11. Full adder FA is illustrated in detail in FIG. 12 and the input and output relationships thereof are shown in FIG. 13. Full adder FA comprises two half adders HA. Half adder HA of FIG. 12 is illustrated in detail in FIG. 17 and the input and output relationships thereof are shown in FIG. 18. Although subtracter 1 can inherently be used as an 8-bit subtracter, it is used here as a 5-bit subtracter because the membership function is defined on the matrix of 16 rows and 32 columns as shown in FIG. 5 in the present embodiment.

Let us take, as a concrete example, |5−19|=14 in order to explain the operation of subtracter 1 with reference to FIGS. 14 to 16. 19 and 5 will be represented respectively by "10011" and "00101" in binary code. To subtract 19 from 5, "00101" (=5) is applied to inputs xo (D11, D12, D13, D14, D15) of FIG. 10A, while "10011" (=19) is applied to inputs xi (D21, D22, D23, D24, D25). In view of the fact that subtracter 1 is inherently an 8-bit subtracter, xo and xi may be expressed respectively as "00000101" and "00010011" for convenience as shown in FIG. 14. xi (D21 to D25) is subjected to inversion by inverters 6a, 6b, 6c, 6d and 6e for each of bits for conversion to a complement form ("11101100") and then applied to full adders 5a and 5b. Full adders 5a and 5b also are inherently 8-bit adders and thus the unnecessary three bits counted from the MSB are held at "1" beforehand. Similarly, when xo (D11 to D15) is applied to full adders 5a and 5b in which three bits counted from the MSB are held at "0".

As shown in FIG. 15, in full adders 5a and 5b, xo and the complement of xi and "1" (carry input Ci of full adder 5b) are added together. The result of addition in this case is "11110010" so that no overflow occurs. Thus the carry output Co of full adder 5a is "0". 255−x is an 8-bit complement representation of xi. Hence the addition shown in FIG. 15 is represented as follows:

$$xo + (255 - xi) + 1 = 256 + (xo - Xi) \quad (2)$$

Therefore the fact that full adders 5a and 5b produce no overflow as a result of the above operation means xo−xi<0. In this case the result of addition by full adders 5a and 5b is not |xo−xi|. Accordingly, the carry output Co (="0") of full adder 5a is inverted by an inverter 10 to produce "1" with the result that all the bits of the result of addition (8 bits) by full adders 5a and 5b are inverted by EXCLUSIVE OR circuits 7a to 7d and 8a to 8d thereby to produce the complement "00001101" and then "1" is further added to the complement "00001101" in full adders 5c and 5d as shown in FIG. 16. That is, full adders 5c and 5d perform the following operation.

$$255 - \{256 + (xo - xi)\} + 1 = 256 - \{256 + (xo - xi)\} \quad (3)$$
$$= xi - xo$$

As a result, |xo−xi| is obtained as the output of full adders 5c and 5d. As shown in FIG. 16, the answer of |5−19| is "00001110" (=14).

When overflow occurs in the operation by full adders 5a and 5b, xo−xi≧0. In this case, the result of operation may be output intact. When overflow occurs in full adder 5a and thus whose carry output Co goes to "1", "0" is applied to one of two input terminals of EXCLUSIVE-OR circuits 7a to 7d and 8a to 8d through inverter 10 with the result that all the output bits of full adders 5a and 5b are not inverted by EXCLUSIVE-OR circuits 7a to 7d and 8a to 8d. Also, since carry input Ci to full adder 5d is "0", "0" is added to the result of addition by full adders 5a and 5b in full adders 5c and 5d. Hence the result of addition by full adders 5a and 5b is output intact as the result of addition by full adders 5a and 5b.

If k≧1 is obtained in multiplier 2, it is sufficient for the subtracter 1 to limit the maximum output to 15. when the outputs exceeds 16, it is converted to 0. To this end, by means of the LSB output S1 of full adder 5c and a circuit 11 comprised of OR circuits 9a, 9b, 9c and 9d, all the output bits of circuit 11 go to "1" where the result of addition by subtracter 1 is 16 or more. The outputs S2, S3 and S4 of full adder 5c need not be used because the membership function μ (x) is set to have four bits.

Multiplier 2 comprises a form conversion circuit 2-1 for converting the form of a membership function from such a triangle as shown in FIGS. 4 and 5 to another form in accordance with form parameters K1 and K2 and a multiplier 2-2 for multiplying 4-bit binary codes.

Form conversion circuit 2-1 is used to perform arithmetic operations on a triangular membership function (A-function) to obtain a membership function such as the N-function (FIG. 8B), S-function (FIG. 8C) or V-function (FIG. 8D). The form of a membership function depends upon parameters K1 and K2. As shown in FIG. 7, when K1="0", and K2="0", the outputs of AND circuits 19a and 19b of form conversion circuit 2-1 are both at "0" with the result that the output of EXCLUSIVE-NOR circuit 20 is at "1". AND circuits 23a to 23d thus output inputs D34 to D31 intact as D64 to D61. Therefore, the form of the membership function remains the A-function (FIG. 8A).

As can be seen from FIG. 8B, the N function takes the maximum value when an if-part input xi is equal to or smaller than the input value xo at which the A-function takes the maximum value, or when xo≧xi. Since xo≧xi means xo−xi≧0, the outputs D64 to D61 of form conversion circuit 2-1 all have only to be "0" when a signal (the output of inverter 10) representing a plus or minus sign of the result of subtraction in subtracter 1 is at "0". This is because that subtracter 3 in the succeeding stage converts the input to the complement then the input to subtracter 3 becomes 15 (decimal representation), i.e., the maximum membership value when all the outputs of form conversion circuit 2-1 are "0".

When K1="0" and K2="1", the output of AND circuit 19a goes to "0". Because of the output of EXCLUSIVE-OR circuit 18="1" and K2="1", AND circuit 19b outputs the output of inverter 21 intact. Since the output of AND circuit 19a is at "0" as described previously, EXCLUSIVE-NOR circuit 20 outputs the output of AND circuit 19b inverted. In other words, the output of EXCLUSIVE-NOR circuit 20 in this case equals K0, the output of inverter 10. Since K0="0", as described previously, when xo−xi≧0, i.e., xo≧xi, AND circuits 23a to 23d all output "0" when K1="0" and K2="1". Contrary to this when K0="1" (xo<xi) AND circuits 23a to 23d output inputs D34 to D31 intact. When K1="0" and K2="1", therefore, the A-function is converted to the N-function.

As can be seen from FIG. 8C, it may be said that, in contrast to the N-function, the S-function takes the maximum membership value when xo<xi, i.e., xo−xi<0 in the A-function. When K1="1", and K2="0", the output of AND circuit 19b is at "0". Also, the output of the EXCLUSIVE-OR circuit 18 is at "1" and K1="1" with the result that AND circuit 19a outputs the value of K0 intact. Since the output of AND circuit 19b is at "0" as described previously, EXCLUSIVE-NOR circuit 20 outputs the output of AND circuit 19a inverted.

When K1="1" and K2="0", if xo≧xi, then K0="0". Therefore, EXCLUSIVE-NOR circuit 20 outputs "1" and in response to these outputs AND circuits 23a to 23d output inputs D34 to D31 intact. On the other hand, if xo<xi, then K0="1" so that EXCLUSIVE-OR circuit 20 produces "0" and thus AND circuits 23a to 23d all produce "0". When K1="1" and K2="0" , therefore, the A-function is converted to the S-function.

The V-function will be described later because its conversion circuit can be simplified if combined with a subtraction circuit 3 to be described later because of its character in conversion operation.

The multiplier 2-2 for two 4-bit numbers of FIG. 10B includes full adders 14a to 14h and half adders 13a to 13d. Each of half adders (HA) 13a to 13d is illustrated in detail in FIG. 17 and its input and output relationships are shown in FIG. 18. Multiplier 2-2 carries out multiplication of two 4-bit binary codes by repeating addition with one of the binary codes shifted left (toward the MSB) one bit position while referring to each bit of the other of the binary codes.

Figure 19:
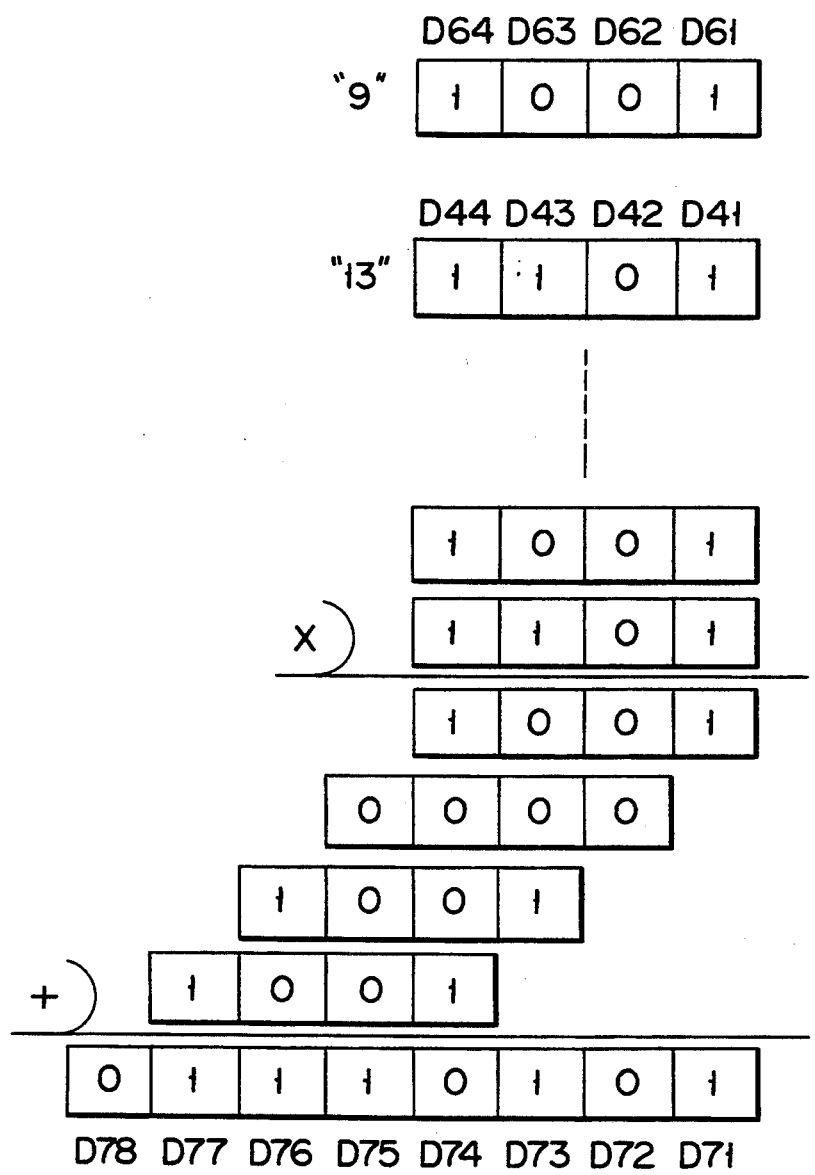
FIG. 19 is a diagram for illustrating the operation of the multiplier of FIG. 10.

Taking, as an example, 13×9=117, the operation of multiplier 2-2 will be described with reference to FIG. 19. 13 and 9 are represented respectively by "1101" and "1001" in 4-bit binary code. Suppose that "1101" is applied to D41, D42, D43 and D44, while "1001" is applied to D61, D62, D63 and D64. First, since D41="1", AND circuits 12a to 12d output D61 to D64 intact. Since D42="0", the outputs of AND circuits 12e to 12h are all "0" s. Half adder 13a adds the output of AND circuit 12b and the output of AND circuit 12e together. Full adder 14a adds the output of AND circuit 12c, the output of AND circuit 12f and the overflow (carry) output Co of half adder 13a together. Full adder 14b adds the output of AND circuit 12d, the output of AND circuit 12g and the overflow output Co of full adder 14a together. Half adder 13b adds the overflow output Co of full adder 14b and the output of AND circuit 12h together. The output of AND circuit 12a serves as the output D71 of multiplier 2-2 intact. The addition is further stepped by AND circuits and adders in the similar way.

As a result, an 8-bit binary code of "01110101" (D71 to D78) is obtained. This binary code corresponds to a decimal number of 117. This means that the multiplication of two 4-bit binary numbers (13 and 5 in decimal number) has been carried out by multiplier 2-2.

In the first example of the membership function defining circuit shown in FIG. 6, when the result of subtraction in second subtracter 3 is negative, the output of the membership function defining circuit is rendered 0 by means of succeeding AND circuit 4. In the second example of the membership function defining circuit shown in FIG. 9, OR circuit 4a, which corresponds to AND circuit 4 of FIG. 6, is followed by subtracter 3 as described above and moreover subtracter 3 is formed of only EXCLUSIVE-OR circuits 15a to 15d. Thus the plus or minus sign of the result of subtraction by this subtracter 3 cannot be determined. Thus, by applying four higher bits D75 to D78 of the output of multiplier 2-2 to OR circuit 17, the output of OR circuit 4a (16a to 16d) are always held at 15 when the output of multiplier 2-2 exceeds 15 because the output of the membership function defining circuit has only to be 0 when the output of multiplier 2-2 exceeds 15.

Figure 20:
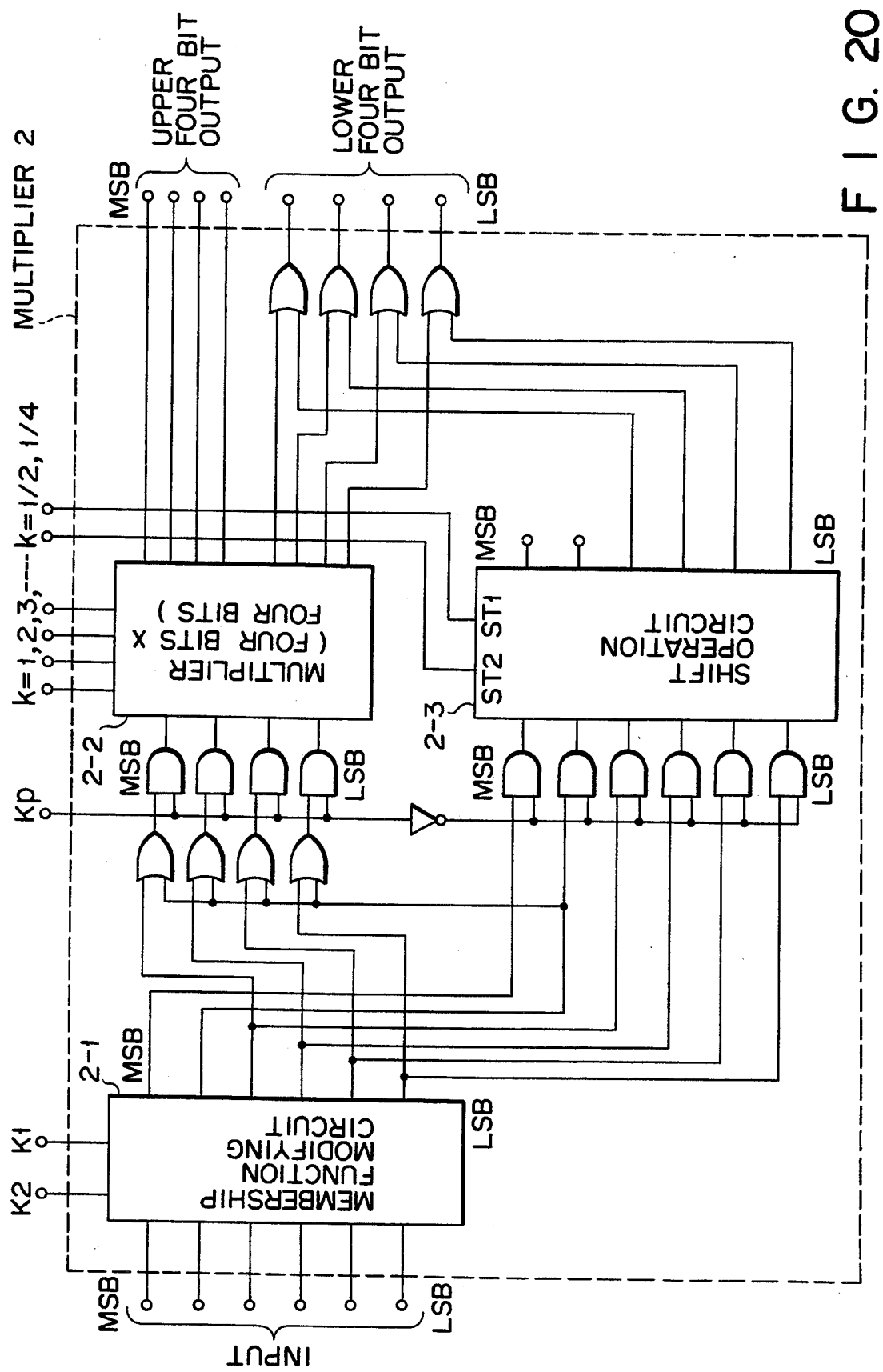
FIG. 20 shows a modification of the multiplier of FIG. 10 in block form.

FIG. 20 shows a modification of multiplier 2 in membership function defining circuit 910 shown in FIG. 9. This circuit is responsive to a control input Kp to render either multiplier 2-2 of FIG. 10B or shift operation circuit 2-3 operable. When Kp="1", multiplier 2-2 performs multiplication of two 4-bit binary numbers, while, when Kp="0", shift operation circuit 2-3 performs a shift operation. The detail of shift operation circuit 2-3 will be described later (FIG. 59). It is necessary here that OR circuit 11 of FIG. 10 be removed and form conversion circuit 2-1 be modified to accommodate 6 bits. If this is done, the slope k can be set within a wide range. Furthermore, the replacement of shift operation circuit 2-3 with a division circuit would enable the value of k to be set more finely. Even decimal fractions, such as $\frac{1}{2}$ and $\frac{1}{4}$, could be set.

Returning to FIG. 10B, subtracter 3 is a circuit for obtaining a difference between the maximum value 15 and the output of multiplier 2. The output of this circuit 3 is a membership value. In this embodiment, as described previously, the membership value is up to 15. Thus, data D81 to D84 from OR circuit 4a which receives the four lower bits D71 to D74 of the 8-bit output of multiplier 2 are inverted to obtain the complement by subtracter 3 for each bit so as to perform the operation of $15 - k \times |xo - xi|$ of equation (1). $k \times |xo - xi|$ represents the result of multiplication by multiplier 2.

Next, a description will be given of the fact that subtracter 3 has a function of converting the A-type membership function to the V-function (FIG. 8D) as described above. As can be seen from FIG. 8D, the V-function may be said to be a complemented form of the A-function. On the other hand, since subtracter 3 inverts all the input bits so as to perform the operation of $15 - k \times |xo - xi|$, if all the input bits to subtracter 3 were output intact without being inverted, the A-function would be converted to the V-function. For this reason, subtracter 3 is formed of EXCLUSIVE-OR circuits 15a to 15d. That is, if the membership function is the A-function, the N-function or the V-function, then K1 and K2 are "0, 0", "0, 1" or "1, 0" as shown in FIG. 7. Thus, NAND circuit 22 of form conversion circuit 2-1 produces "1" in each case. Then EXCLUSIVE-OR circuits 15a to 15d of subtracter 3 invert inputs D84 to D81 to perform the operation of $15 - k \times |xo - xi|$. When K1="1" and K2="1", on the other hand, NAND circuit 22 produces "0" so that EXCLUSIVE-OR circuits 15a to 15d output inputs D84 to D81 intact. Accordingly, when K1="1" and K2="1", the A-function is converted to the V-function.

Next, a third example of membership function defining circuit 910 will be described. Equation (1) can be rewritten as follows:

$$\mu(xi) = 15 - k \cdot xo - k \cdot xi| \qquad (4)$$
When
$$15 - |k \cdot xo - k \cdot xi| < 0,$$
$$\mu(xi) = 0$$

Figure 21:
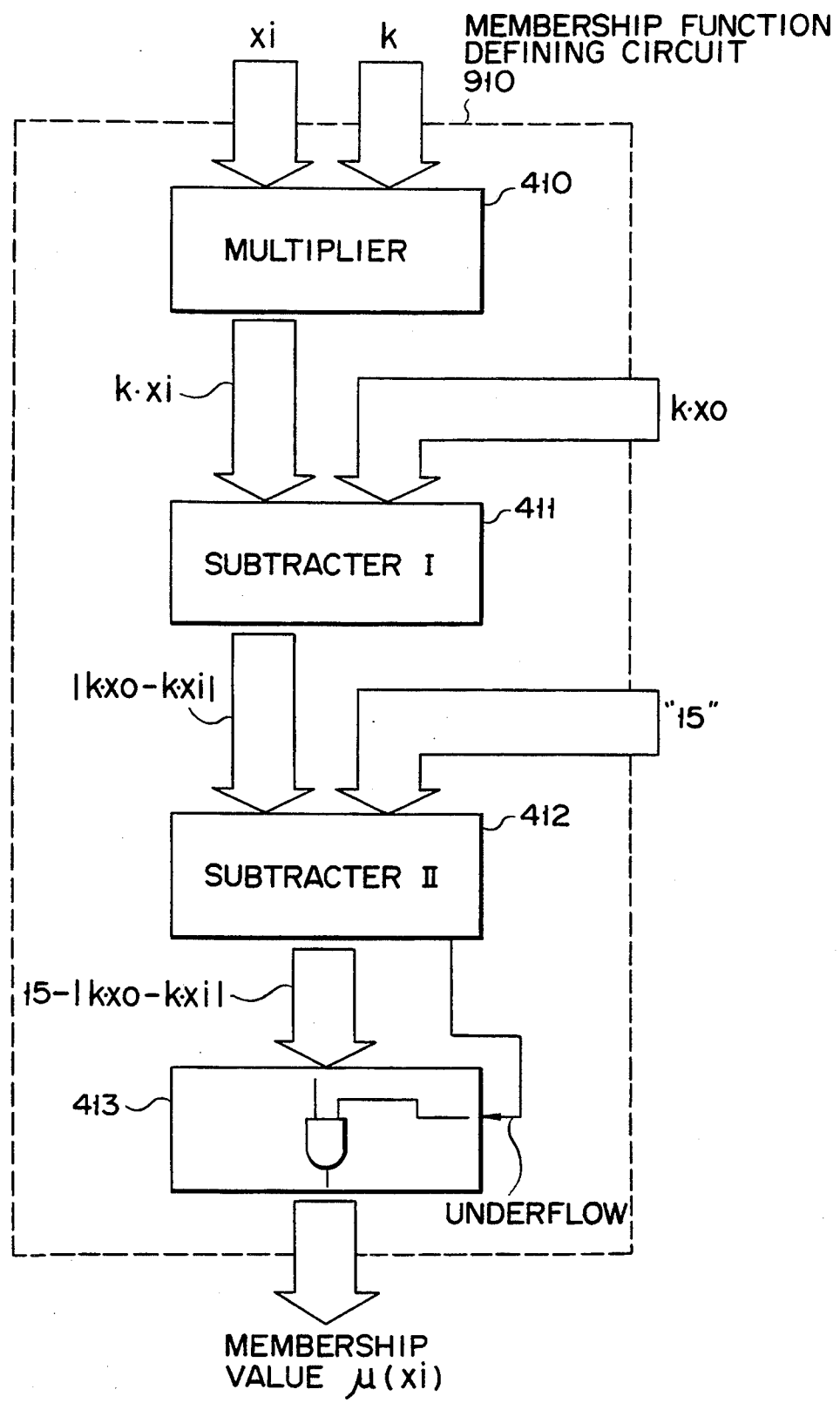
FIG. 21 is a block diagram of a third example of the if-part membership function defining circuit.

Since k and xo are each definition parameters, k·xo may be treated as a definition parameter. Equation (4) may be implemented by membership function defining circuit 910 shown in FIG. 21. In FIG. 21, a multiplier 410 performs multiplication of k×xi and a first subtracter 411 obtains the absolute value $|k \cdot xo - k \cdot xi|$ of the difference between the product k·xi obtained by multiplier 410 and k·xo entered as a parameter. Next, a second subtracter 412 subtracts the output of first subtracter 411 from the maximum membership value 15 to obtain $15|k \cdot xo - k \cdot xi|$. At this point, if a borrow occurs as a result of the subtraction, that is, $15 - |k \cdot xo - k \cdot xi| < 0$, an underflow output of second subtracter 412 is utilized to cause AND circuit 413 to nonconductive, thereby rendering all the outputs of AND circuit 413 as 0. Consequently a membership value of 0 is obtained.

If first subtracter 411 is similar to subtracter 1 of FIGS. 6 and 9, the fifth bit output of subtracter 1 may be used as an alternative to the underflow output. Illustrated in FIG. 22 is a fourth example of membership function defining circuit 910 utilizing the fifth bit output of the first subtracter, in which AND circuit 413 of FIG. 21 is replaced with an OR circuit 413a connected between a first subtracter 411 and a second subtracter 412.

Equation (4) may be further rewritten as follows:
When $15 - k \cdot xo < 0$, $$\mu(xi) = k \cdot xi - |15 - k \cdot xo| \qquad (5)$$

When $15 - k \cdot xo \geq 0$, $$\mu(xi) = k \cdot xi + |15 - k \cdot xo| \qquad (6)$$

A fifth example of membership function defining circuit 910 that implements equations (5) and (6) is illustrated in FIG. 23. In this example, k·xi is first obtained by multiplier 416. Subtracter 415 obtains the absolute value $|15 - k \cdot xo|$ of the difference between the maximum membership value 15 and the parameter k·xo. As a result of subtraction, if $15 - k \cdot xo < 0$, then subtracter 415 produces an underflow output and adder/subtracter 417 then performs subtraction between the output of subtracter 415 and the output of multiplier 416. Conversely, when subtracter 415 produces no underflow, adder/subtracter 417 performs addition. Namely, adder/subtracter 417 carries out the arithmetic operations of equations (5) and (6).

When adder/subtracter 417 performs the arithmetic operations of equation (5) on condition that $15 - k - xo < 0$ and consequently underflow occurs, AND circuit 418 is used to make all the bits "0" s so that the membership value may be rendered 0.

In the above description, the types of membership functions are the A-function, the N-function, the S-function and the V-function. In the case of the A-function or the v-function, the slopes of two oblique lines of a triangle having a vertex at xo and representing an if-part membership function are determined uniformly by the definition parameter k. That is, the triangle is axially symmetric with respect to the vertical line including the midpoint xo. Therefore, in determination of "if A" in "if A then B", ambiguous contours unique to the fuzzy theory will be set insufficiently because the slopes are always bilateral symmetric. Consequently inconvenience may be caused depending upon types of controlled objects. This exerts not a little influence upon variations of overlapping of neighboring labels (inferential results) such as PB (positive big) and PM (positive medium) in the final inference process after the "then B", thus needing special attention. For this reason, a circuit will be explained which can define a membership function of A-function or V-function in which slopes can be varied on both sides of the point of inflection.

Figure 24:
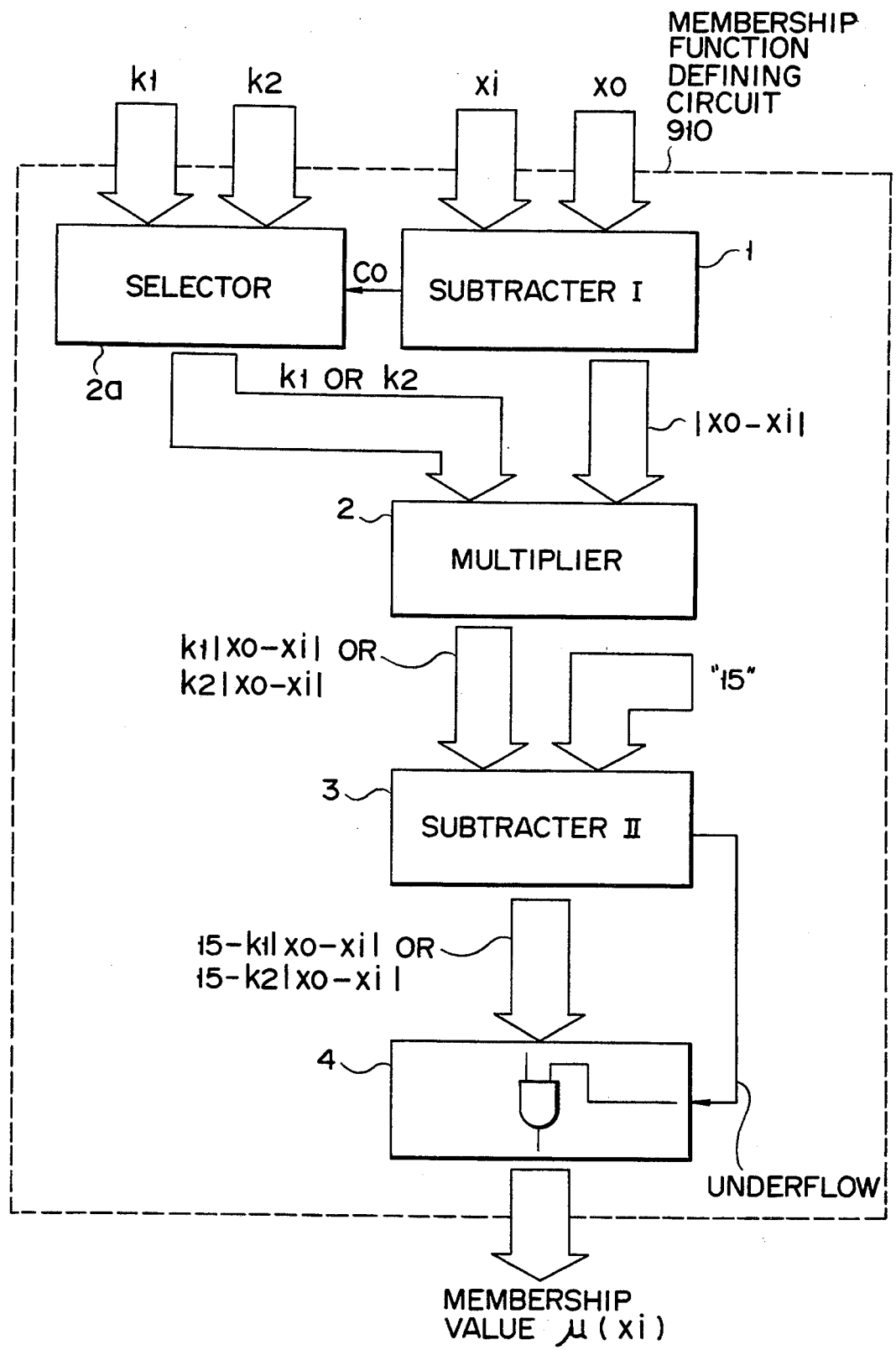
FIG. 24 is a block diagram of a sixth example of the if-part membership function defining circuit.

FIG. 24 is a block diagram of a sixth example of membership function defining circuit 910. The sixth example is characterized by provision of a selector circuit 2a adapted to select a slope. As an example, the circuit of FIG. 24 is a circuit obtained by simply adding selector circuit 2a to membership function defining circuit 910 shown in FIG. 6. Although illustration is omitted, other membership function defining circuits shown in FIGS. 9 and 21 to 23 may be modified likewise.

In FIG. 24, first subtracter 1 applies the absolute value $|xo-xi|$ of the difference between the point xo of inflection of the membership function $\mu(x)$ and the input data xi to multiplier 2 and moreover a control signal Co according to the plus or minus sign of the difference $xo-xi$ to selector 2a. Selector 2a is supplied with two different slope parameters k1 and k2 and applies either k1 or k2 to multiplier 2 according to control signal Co. When $xo-xi>0$, i.e., $xi<xo$, k1 is selected, while, when $xo-xi\leq0$, i.e., $xi\geq xo$, k2 is selected. Multiplier 2 calculates $k1\times|xo-xi|$ or $k2\times|xo-xi|$ for application to second subtracter 3. Multiplier 2 may be replaced with a division circuit. In that case, the division circuit calculates $|xo-xi|\div k1$ or $|xo-xi|\div k2$.

With different values set to k1 and k2, an if-part membership function (A-function) can be defined which has different slopes on both sides of the point xo of inflection as shown in FIGS. 25A and 25B. It is to be noted that the v-function can be also defined by inverting the A-function, in which slopes differ on both sides of the point of inflection.

Illustrated in FIG. 26 is a seventh example of membership function defining circuit 910 in which a maximum of three points of inflection and a maximum of four slopes may be set arbitrarily. Here, such a function is defined as an F-function. Also, a function in which its membership value is fixed to 0 (minimum value) is defined as a P-function.

FIG. 27 illustrates a typical example of the F-function. It is the greatest distinction of the F-function that one of four kinds of linear functions which are different from one another in slope can be selected arbitrarily in accordance with the input xi. A point at which the linear functions are switched from one to another is a point of inflection. In this example, the main point xo of inflection corresponding to the vertex of the triangle and sub-points xL and xR of inflection on the left and right sides of xo are set to $xo=12$, $xL=8$ and $xR=18$, respectively. The slopes k1 to k4 of regions partitioned by the points of inflection are $k1=1$, $k2=2$, $k3=4/3$ and $k4=7/11$, respectively.

Figure 29:
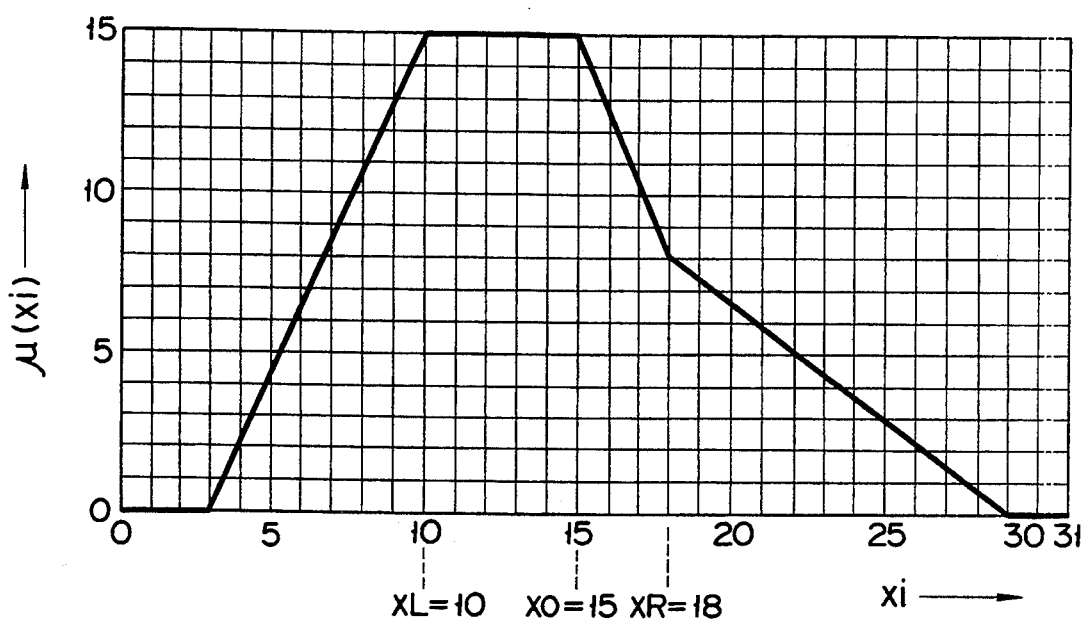

FIGS. 28 and 29 illustrate other examples of the F-function. These represent trapezoidal membership functions. By setting the slope k2 of a linear function between inflection points xL and xo and the slope k3 of the linear function between inflection points xo and xR to 0, the maximum membership value becomes 15, thus implementing the trapezoidal membership function as shown in FIG. 28.

Figure 30A:
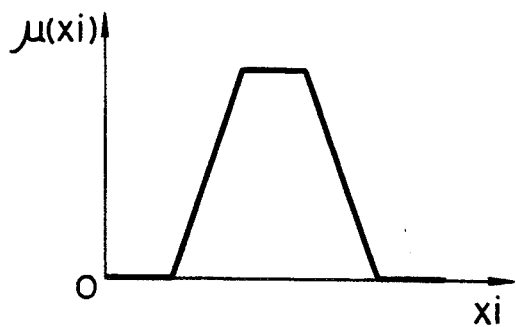
Figure 30B:
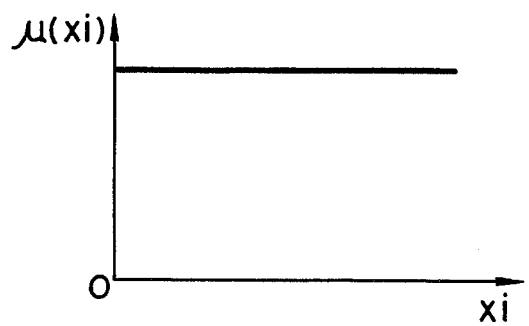

FIGS. 30A to 30N illustrate a part of variations of the F-function. In order to fix the membership value to 0 independently of variations in input variable xi, the coefficients of slope k1 to k4 are set such that $k1=k2=K3=k4=0$. This function is called as P-function and is shown in FIG. 30I.

The general expression for the F-function will be described next. In this case as well, the definition and conception of the membership function are based on the membership function $\mu(xi)$ of equation (1).

When $xi<xL$, $$\mu 1(xi) = \mu 2(xL) - k1 \times |xL - xi| \qquad (7)$$
$$= 15 - k2 \times |xo - xL| - k1 \times |xL - xi|$$

When $xL\leq xi\leq xo$, $$\mu2(xi) = 15 - k2\times|xo-xi| \qquad (8)$$

When $xo<xi\leq xR$, $$\mu3(xi) = 15 - k3\times|xo-xi| \qquad (9)$$

When $xR<xi$, $$\mu 4(xi) = \mu 3(xR) - k4 \times |xR - xi| \qquad (10)$$
$$= 15 - k3 \times |xo - xR| - k4 \times |xR - xi|$$

FIG. 26 is a block diagram of a membership function defining circuit for carrying out the arithmetic operations according to equations (7) to (10), and its detailed connection diagram is shown in FIG. 31.

In FIG. 31, a first subtracter 390 is an arithmetic operational block which performs subtraction between a value of input variable xi and the value of each of points of inflection xo, xL and xR to output absolute values of the results of subtraction $|xo-xi|$, $|xL-xi|$ and $|xR-xi|$ and sign signals representing a plus or minus sign of the results of subtraction. A selector circuit 391 is a block for selecting one of the points of inflection xo, xL and xR according to the value of input variable xi. A second subtracter 392 carries out subtractions between xo and xL and between xo and xR, i.e., $|xo-xL|$, $|xo-xR|$ in order to obtain constants $\mu2(xL)=15k2\times|xo-xL|$ and $\mu3(xR)=15-k3\times|xo-xR|$ included in equations (7) and (10). A first comparator 393 and a second comparator/first function specifying circuit 394 forms together a comparator circuit which alone performs sequential control within membership function defining circuit 910. Input variable xi is compared in level with points of inflection xL and xR through this comparator circuit. At this time, a combination of a sign signal from subtracter 390 and form parameters K0, K1 and K2 specifies the form of the function and determines slope coefficients k1 to k4. In order to obtain constants $\mu 2(xL)=15-k2\times |xo-xL|$ and $\mu 3(xR)=15-k3\times |xo-xR|$ in equations (7) and (10), a first multiplier 395 carries out multiplication $k2\times |xo-xL|$ and $k3\times |xo-xR|$. First and second coefficient specifying circuits 396 and 397 each are selectors. The slope coefficients k1 to k4, which have been set arbitrarily, are selected properly by switching signals from first comparator 393 and second comparator/first function specifying circuit 394. A second multiplier/third subtracter/second function specifying circuit 398 multiplies the arithmetic operational output of block 390 and slope coefficients k1 to k4 selected by blocks 396 and 397, thereby to obtain $k1\times |xL-xi|$, $k2\times |xo-xi|$, $k3\times |xo-xi|$ and $k4\times |xR-xi|$ in equations (7) to (10). The combination of the arithmetic operational output of block 390 and slope coefficients k1 to k4 is determined by the switching signals from blocks 393 and 394. Also, block 398 performs arithmetic operations of $15-k2\times xo-xi|$ and $15-k3\times |xo-xi|$ to obtain equations (8) and (9) and moreover arithmetic operations of $15-k2\times |xo-xL|-k1\times |xL-xi|$ and $15-k3\times |xo-xR|-k4\times |xR-xi|$ to obtain equations (7) and (10). It is to be noted here that the multiplication performed by blocks 395 and 398 may be replaced with division.

Figure 32:
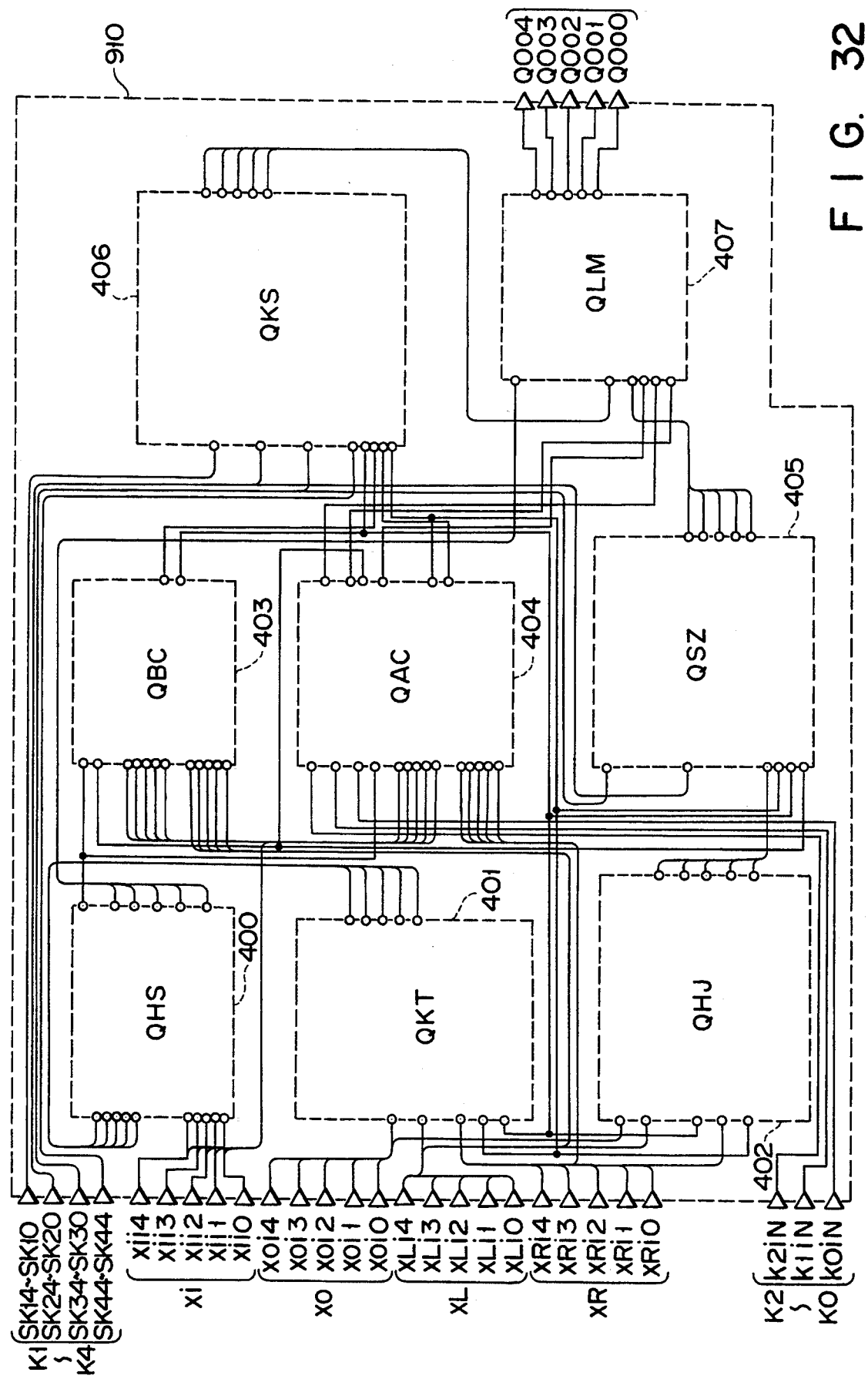
FIG. 32 shows a practical arrangement of the membership function defining circuit of FIG. 31.

FIG. 32 shows a practical arrangement of membership function defining circuit 910 shown in FIG. 31. It is assumed here that membership function $\mu$ (xi) is 5-bit data in view of utility and general use. Accordingly, the membership function $\mu$ (xi) may be expressed as follows.

When xi<xL, $$\mu 1(xi) = \mu 2(xL) - k1 \times |xL - xi| \quad (11)$$
$$= 31 - k2 \times |xo - xL| - k1 \times |xL - xi|$$

When $xL \leq xi \leq xo$, $$\mu 2(xi) = 31 - k2 \times |xo - xi| \quad (12)$$

when $xo < xi \leq xR$, $$\mu 3(xi) = 31 - k3 \times |xo - xi| \quad (13)$$

When xR<xi, $$\mu 4(xi) = \mu 3(xR) - k4 \times |xR - xi| \quad (14)$$
$$= 31 - k3 \times |xo - xR| - k4 \times |xR - xi|$$

Blocks 400 to 407 of membership function defining circuit 910 of FIG. 32 have a one-to-one correspondence with blocks 390 to 398 of membership function defining circuit 910 of FIG. 31, except for the fact that blocks 396 and 397 are combined to form a single block 406. Furthermore, functional blocks 400 to 407 are illustrated in detail in FIGS. 33 to 40.

FIG. 33 shows a subtracter 400 for performing subtractions of $|xo-xi|$, $|xL-xi|$ and $|xR-xi|$. The results of subtractions between input xi and inflection point xo, between input xi and inflection point xL and between input xi and inflection point xR are taken from terminal So. When $xo-xi \geq 0$ or $xL-xi \geq 0$, Co is at a "HIGH" level, while, when $xR-xi<0$ or $xR-xi<0$, Co is at a "LOW" level.

Figure 34:
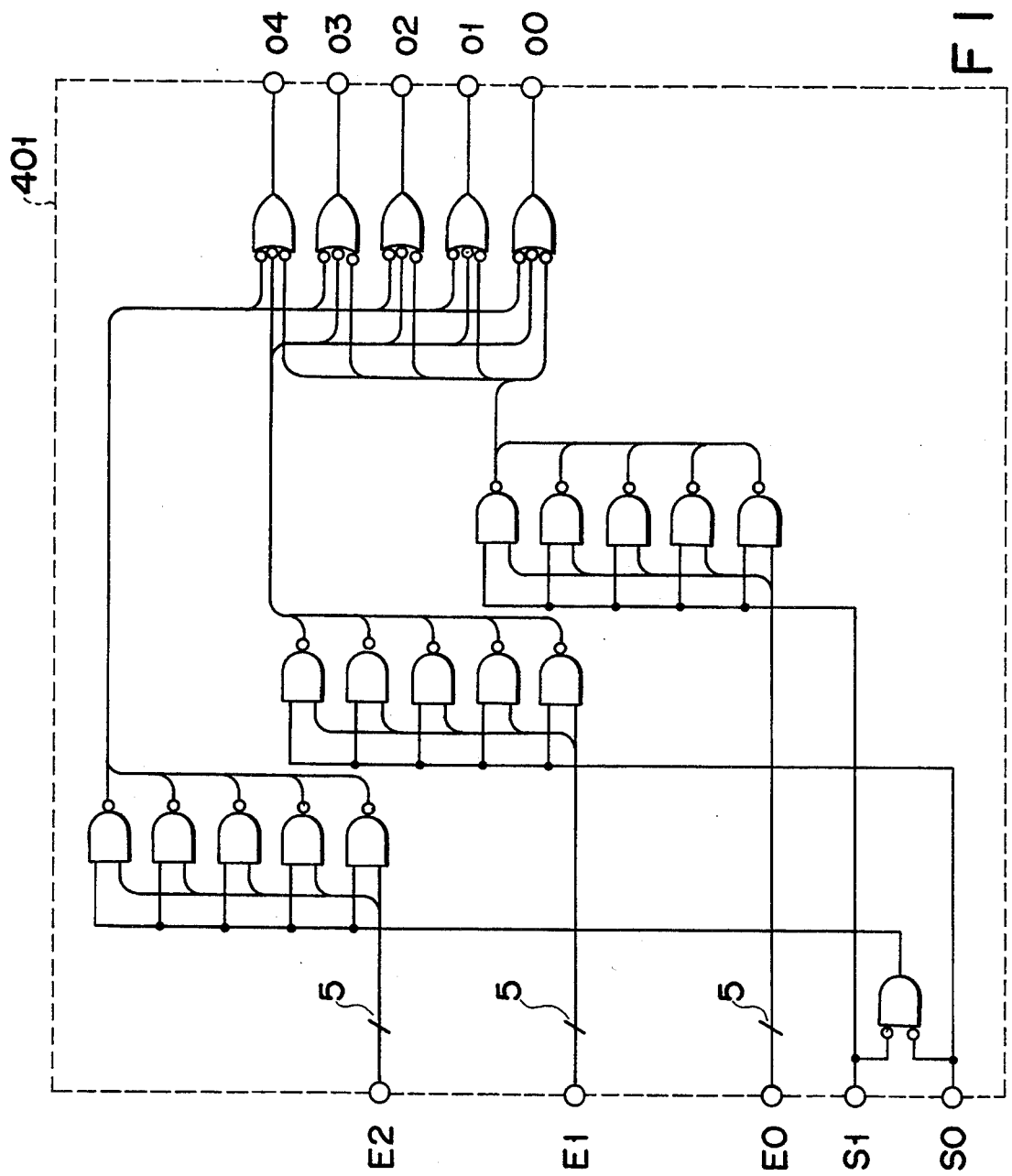

FIG. 34 shows selector circuit 401 for selecting the points of inflection xo, xL and xR in sequence.

Figure 35:
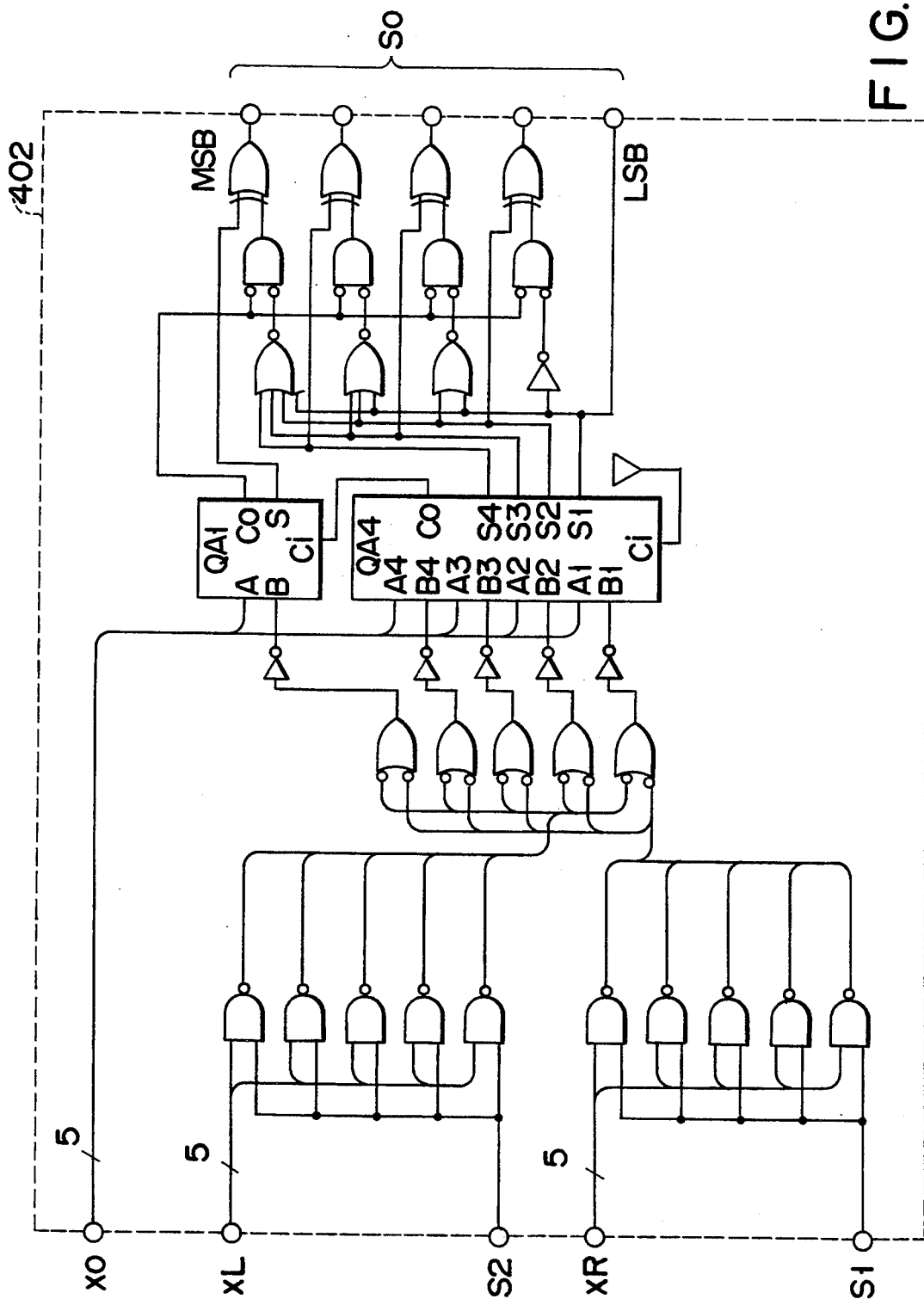

FIG. 35 shows subtracter 402 for performing subtractions of $|xo-xL|$ and $|xo-xR|$. The result of subtraction is taken from terminal So.

Figure 36:
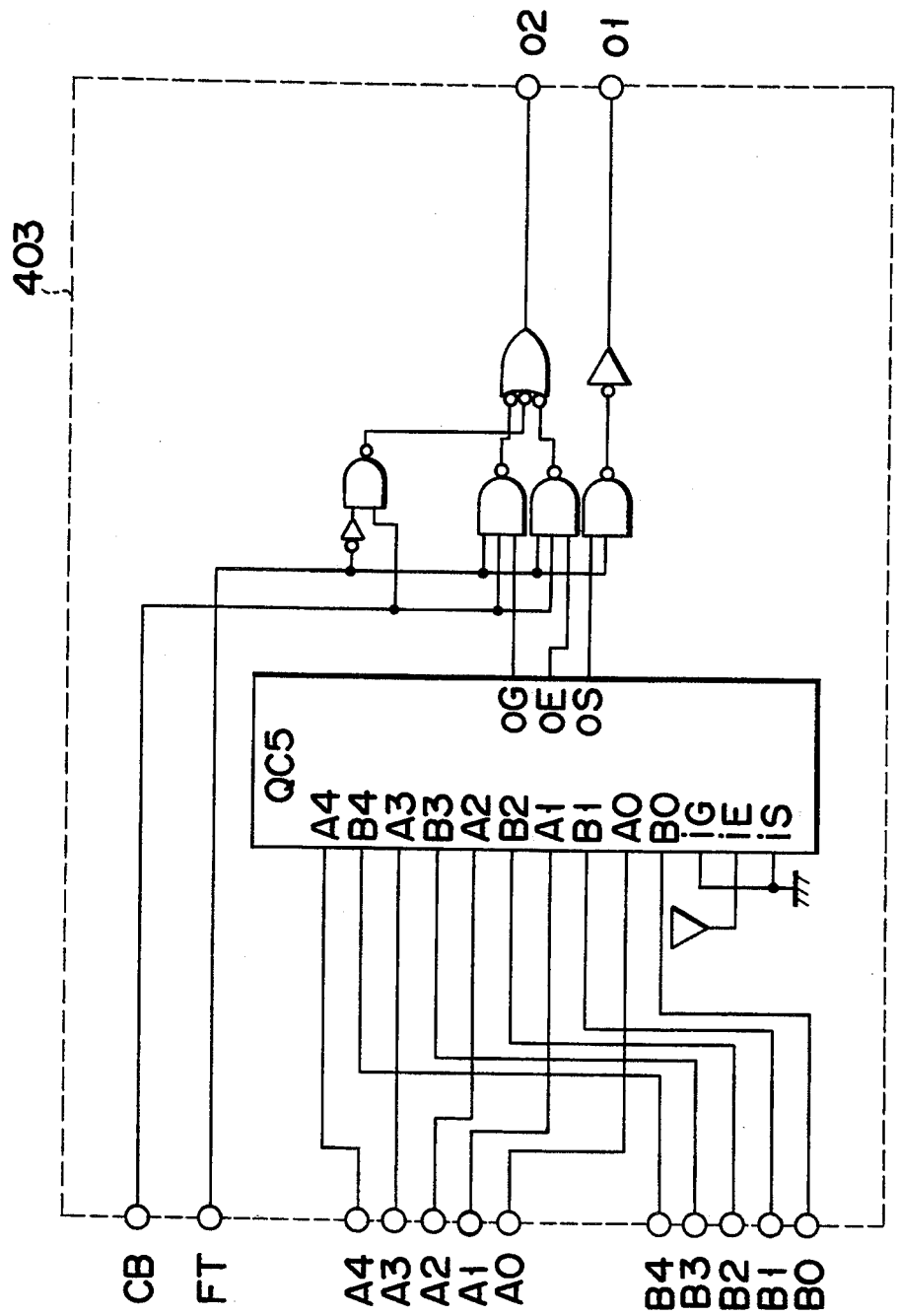

FIG. 36 shows slope coefficient switching comparator 403 formed of a 5-bit magnitude comparator. A comparison in magnitude between input variable xi and point of inflection xL discriminates between conditions of $Xi<XL$ and $xo \geq xi \geq xL$.

FIG. 37 shows slope coefficient switching comparator/function specifying circuit 404 formed of a 5-bit magnitude comparator including a function specifying encoder. A comparison in magnitude between input variable xi and point of inflection xR discriminates between conditions of $xo<xi \leq xR$ and $xi>xR$. Furthermore, function specifying circuit 404 outputs predetermined function specifying parameters in accordance with the input and output relationships shown in FIG. 41.

Figure 38:
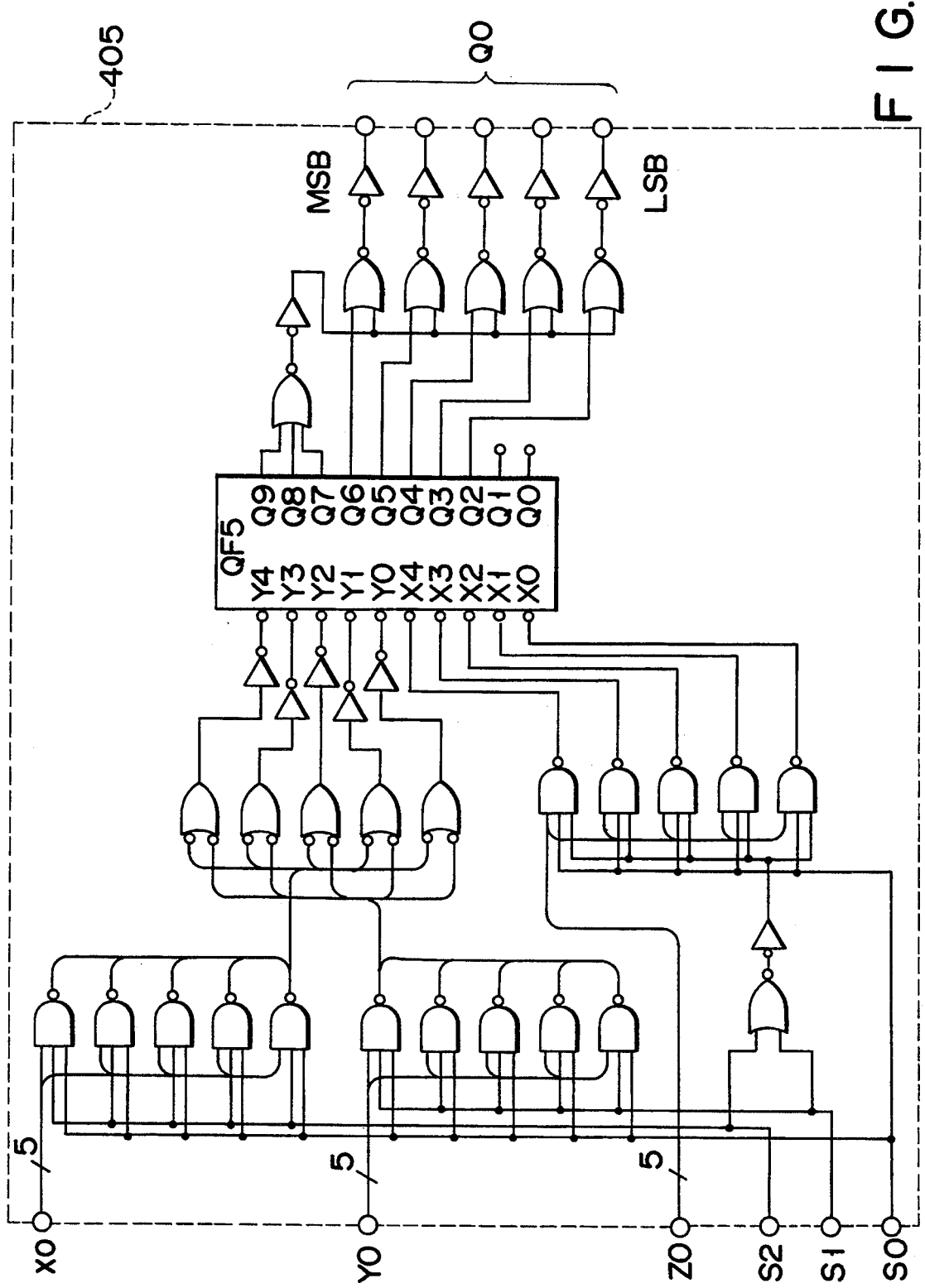

FIG. 38 shows multiplier 405 for carrying out multiplications of $k2\times |xo-xLI$ and $k3\times |xo-xR|$, which is formed of a 5-bit multiplier including a selector circuit.

Figure 39:
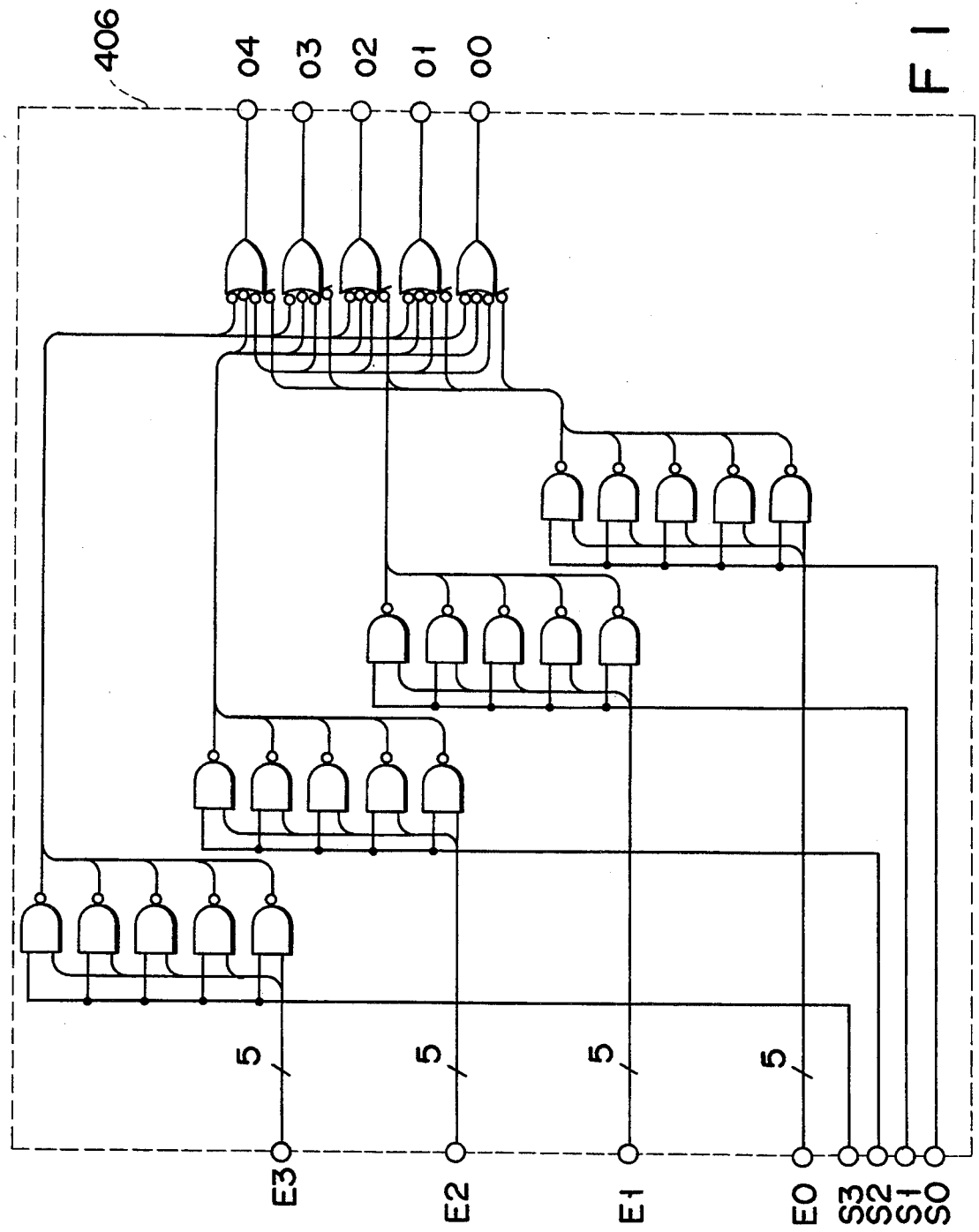

FIG. 39 shows coefficient specifying circuit 406 for selecting slope coefficients k1 to k4 in sequence.

Figure 40:
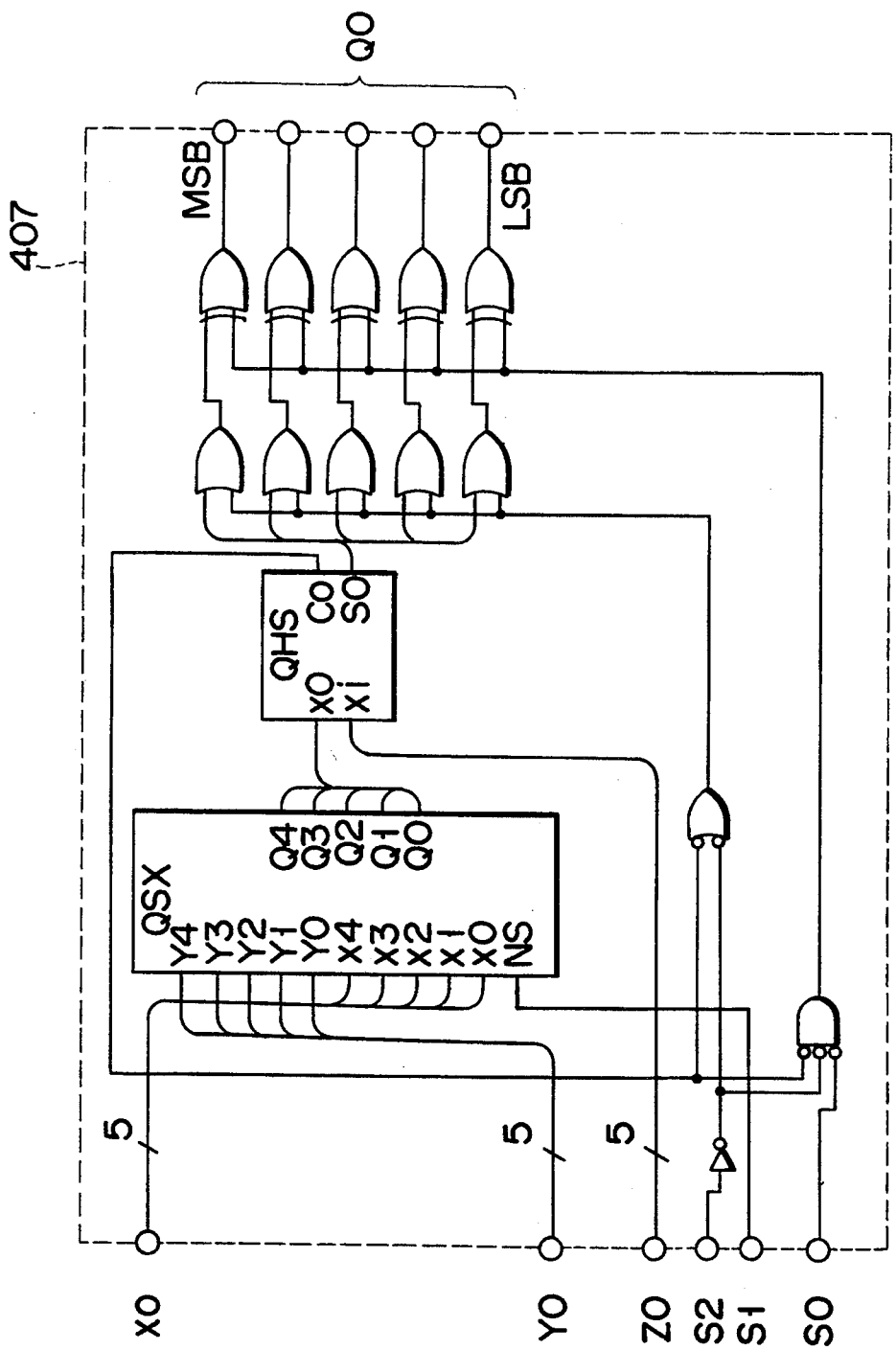

FIG. 40 shows membership function specifying circuit 407 formed of a multiplier and a two-stage subtracter. The preceding 5-bit multiplier performs multiplication of the results of subtraction $|xo-xi|$, $|xL-xi|$, and $|xR-xi|$ and the slope coefficients k1 to k4. The first-stage subtracter included in the multiplier circuit then performs subtractions of $31-k1\times |xL-xi|$, $31-k2\times |xo-xi|$, $31-k3\times |xo-xi|$ and $31-k4\times |xR-xi|$. Furthermore, the second-stage subtracter performs subtractions of $k2\times |xo-XL|$ and $k3\times |xo-xR|$ which are constant parts of the membership functions $\mu$ 1(xi) and $\mu$ 4(xi), respectively. Accordingly, the results of these subtractions represent $\mu$ 1(xi), $\mu$ 2(xi), $\mu$ 3(xi) and $\mu$ 4(xi).

A group of gates on the output side of the second-stage subtracter is separated into a preceding subgroup of OR circuits and a succeeding subgroup of EXCLUSIVE-OR circuits, the preceding and succeeding subgroups setting the P-function and the V-function, respectively. The final output QO, which is represented in a 5-bit binary code, is applied to minimum-value calculator 920.

Figure 44:
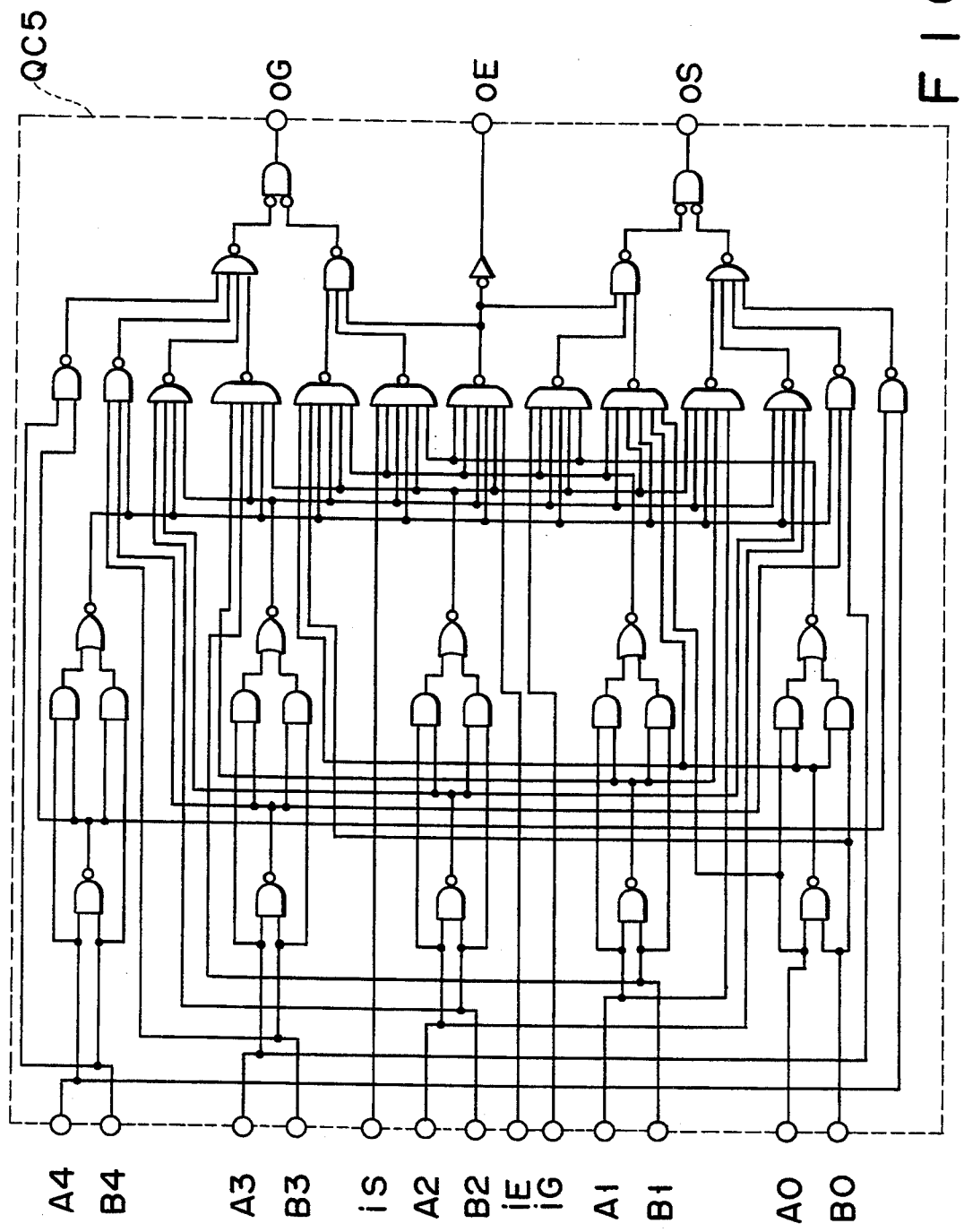
Figure 47:
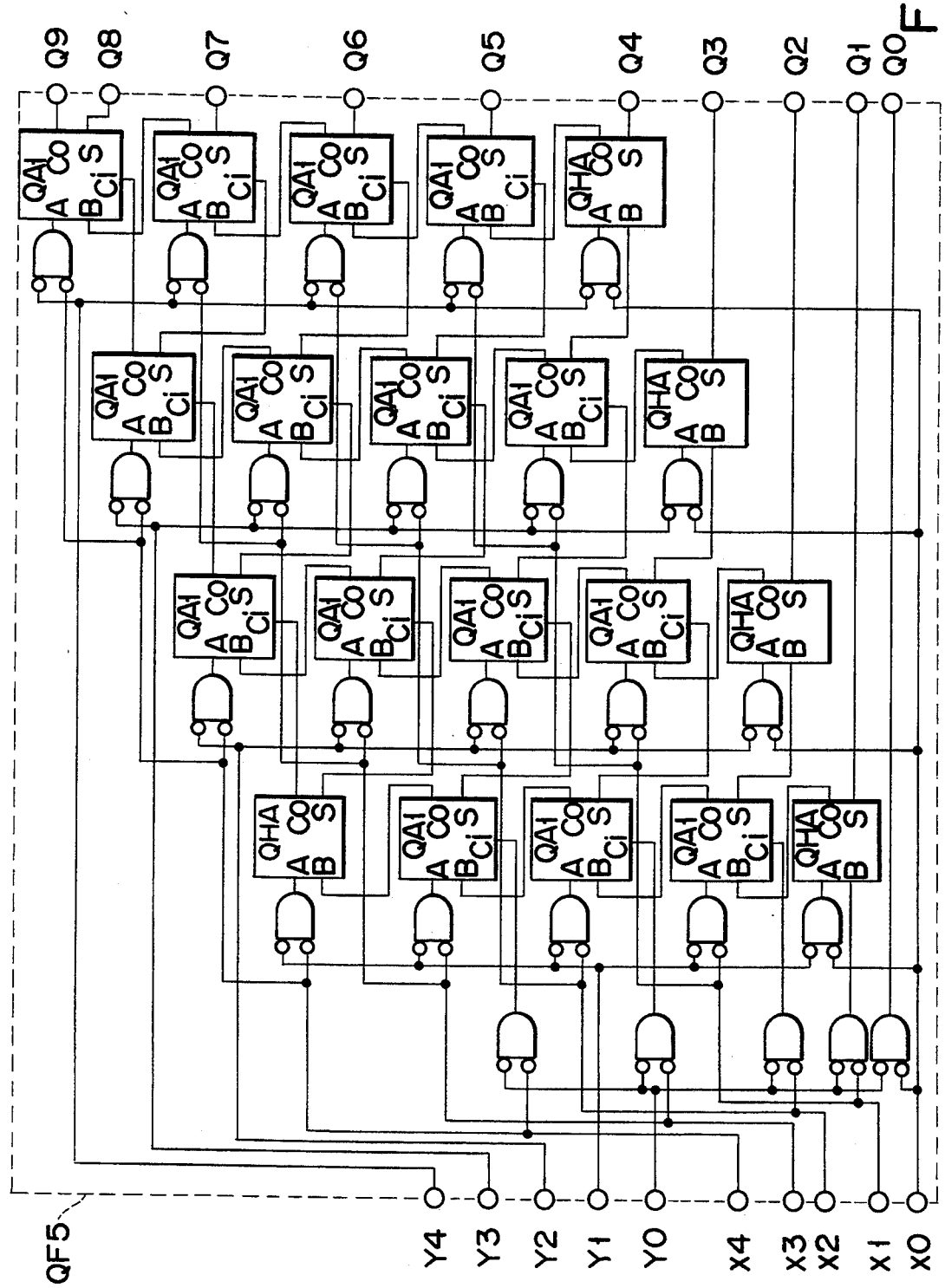
Figure 48:
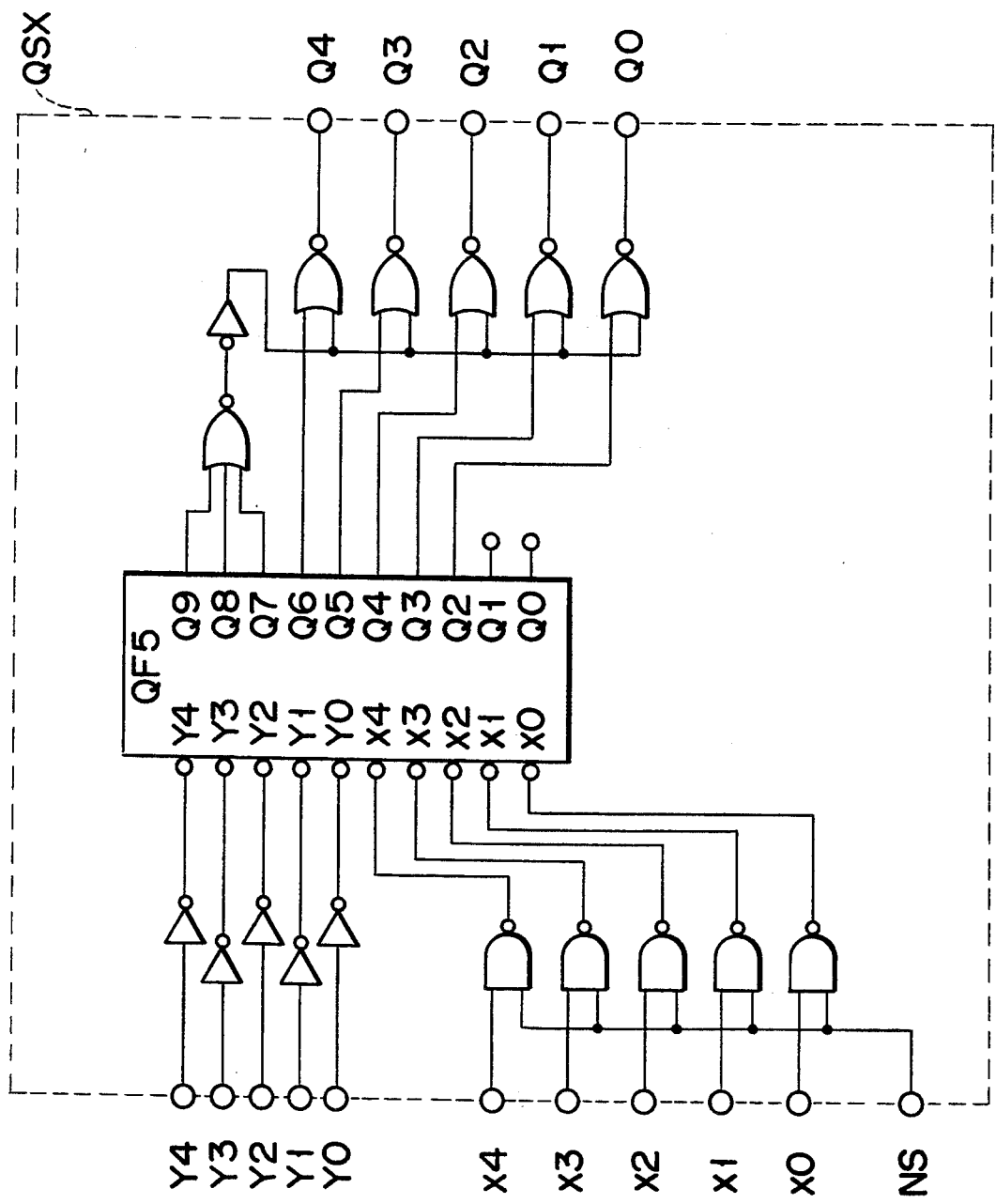

FIGS. 42 to 48 are circuit diagrams of macro-cells included in each of the functional blocks shown in FIGS. 33 to 40. FIG. 42 is a circuit diagram of half adder QIA. FIG. 43 is a circuit diagram of full adder QAI in which a carry input Ci is added to half adder QHA. FIG. 44 is a circuit diagram of 5-bit magnitude comparator QC5. FIG. 45 is a circuit diagram of 2-bit full adder QA2. FIG. 46 is a circuit diagram of 4-bit full adder QA4. FIG. 47 is a circuit diagram of 5-bit multiplier QF5 FIG. 48 is a circuit diagram of 5-bit multiplier QSX to which an output inverting circuit is added.

In the seventh example of the membership function defining circuit as well, the utilization of flexibility of the F-function would enable the A-function, N-function and S-function to be set relatively easily. Moreover, the N-function and S-function can also be set by specification of form parameters Ko, K1 and K2.

As described above, according to the seventh example of the membership function defining circuit, different slopes can be set on both sides of a point of inflection and moreover a plurality of points of inflection can be set, thus allowing if-part membership functions of desired forms to be defined freely with a simple construction.

Next, minimum-value calculation unit 920 of FIG. 2 will be described. The minimum-value calculation in the fuzzy inference takes the minimum value of a plurality of given membership values. In contrast with this, the maximum-value calculation takes the maximum value. To implement a minimum-value calculation unit with digital circuits handling numbers represented in binary code, there is a method in which a digital comparator is used. However, although a digital comparator which handles two numbers can be implemented with a relatively simple construction, a digital comparator which handles three or more numbers has to be increased in circuit scale. Thus, the use of a digital comparator cannot be said to be a very good method. Descriptions will be given below of two types of minimum-value calculation units, one using a digital comparator and the other using no digital comparator.

Figure 49:
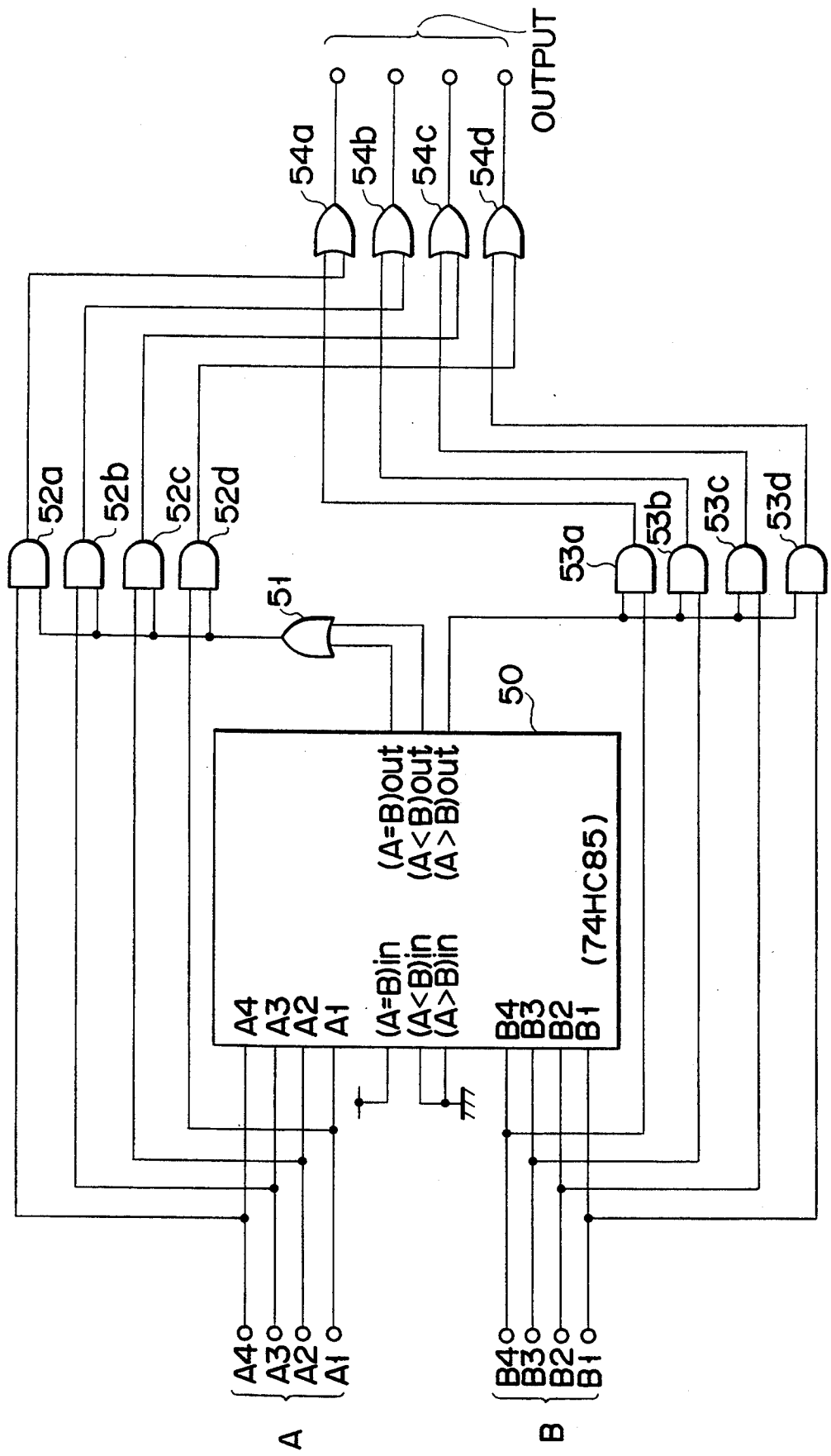
FIG. 49 is a circuit diagram of a first example of the minimum-value calculation circuit in the first embodiment.

In FIG. 49 is illustrated the first example of a minimum-value calculation unit using a digital comparator. A digital comparator 50 is adapted to make a comparison between two binary numbers and formed of a high-speed CMOS standard logic IC such as 74HC85. The input and output relationships of digital comparator 50 is illustrated in FIG. 50. The symbol x represents that don't care whether they are "0"s or "1"s.

Since digital comparator 50 has a cascade input terminal $(A=B)_{in}$ held always at a "1" (High) level, an output terminal $(A=B)_{out}$ is at a "0" level when two 4-bit binary codes A and B are $A \neq B$ or at a "1" level when $A=B$. Likewise, an output terminal $(A>B)_{out}$ is at a "1" level when $A>B$ or at a "0" level when $A<B$. An output terminal $(A<B)_{out}$ is at a "1" level when $A<B$ or at a "0" level when $A>B$.

When binary codes A and B are $A>B$ in magnitude, digital comparator 50 produces a "1" output at its output terminal $(A>B)_{out}$ so that AND circuits 53a to 53d output respective bits B4 to B1 of 4-bit binary code B intact. At this time, output terminal $(A<B)_{out}$ and output terminal $(A=B)_{out}$ are both at a "0" level so that an OR circuit 51 produces a "0" output to disable AND circuits 52a to 52d. Thus, OR circuits 54a to 54d output respective outputs of AND circuits 53a to 53d, i.e., the input binary code B.

When two binary codes A and B are in magnitude such that $A \leq B$ ($A<B$ or $A=B$), on the other hand, output terminal $(A>B)_{out}$ is at a "0" level so that AND circuits 53a to 53d all produce "0" outputs. In this case, since at least one of output terminals $(A=B)_{out}$ and $(A<B)_{out}$ is at a "1" level, the output of OR circuit 51 is at a "1" level, thus causing AND circuits 52a to 52d to output respective bits of input binary code A intact. The input binary code A is thus taken from OR circuits 54a to 54d.

When $A=B$, no problem arises, whichever of A and B is selected. In this example, A is selected as the minimum value output.

In this way the minimum-value calculation circuit of FIG. 49 performs the minimum-value calculation on two 4-bit binary codes A and B. Where the number of input binary codes is three or more, assuming N to be the number of inputs, a combination of (N−1) digital comparators 50, AND circuits 52 and 53 and OR circuits 51 and 54 would implement a minimum-value calculation unit.

Figure 51:
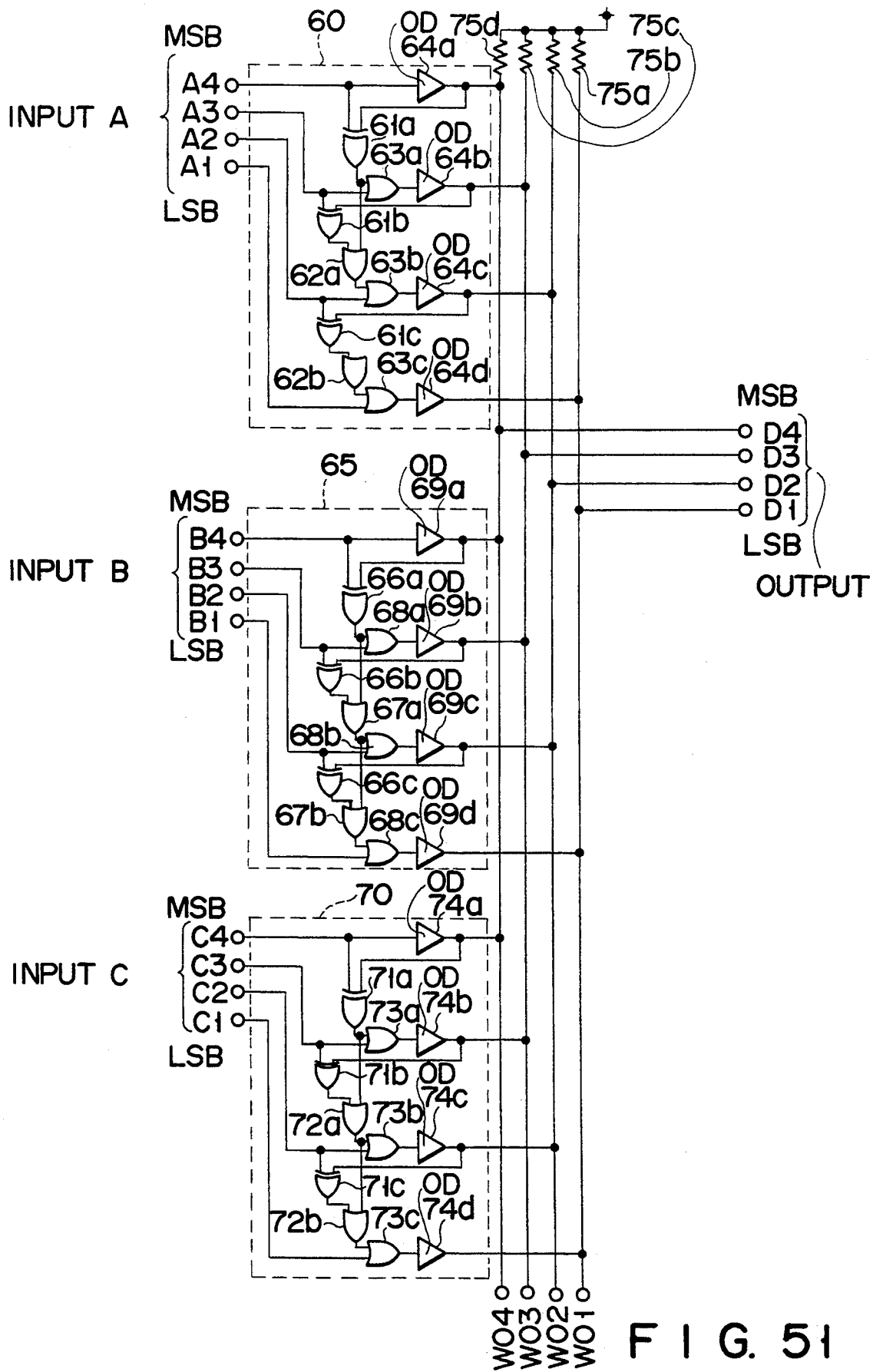
FIG. 51 is a circuit diagram of a second example of the minimum-value calculation circuit.
Figure 52:
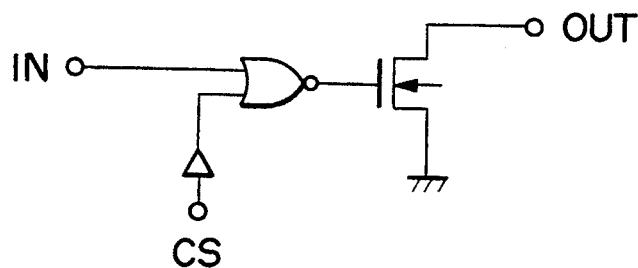
FIG. 52 is a circuit diagram of the noninverting buffer circuits of the open drain output type of FIG. 51.
Figure 53:
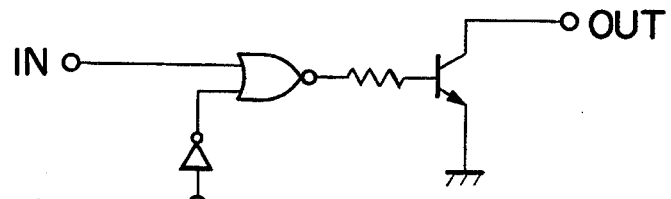
FIG. 53 is a circuit diagram of the noninverting buffer circuits of the open collector output type.

In FIG. 51 is illustrated a second example of a minimum-value calculation circuit for 4-bit binary codes which uses no digital comparator. In this Figure, reference characters 64a to 64d, 69a to 69d and 74a to 74d each denote noninverting buffer circuits of an open drain output type (open collector outputs in the case of bipolar IC) which perform no logical operation. An example of the noninverting buffer circuit of the open drain output type is illustrated in FIG. 52. An example of the noninverting buffer circuit of the open collector output type is illustrated in FIG. 53. By rendering a CS (chip select) input "0" in FIG. 52, currents flowing into noninverting buffer circuits 64a to 64d, 69a to 69d and 74a to 74d through pull-up resistors 75a to 75d can be blocked while the minimum-value calculation circuit is disabled, thus decreasing power dissipation when the circuit is disabled. If such CS signals are combined in a single signal and the circuit is integrated into IC, CS may serve as its operation standby signal.

Reference characters 60, 65 and 70 of FIG. 51 denote comparison operation circuits the outputs of which are wire-ORed by signal lines WO1, WO2, WO3 and WO4. These signal lines serve as outputs D1, D2, D3 and D4 of the minimum-value calculation unit. A "High" level of signal lines WO1 to WO4 is determined by pull-up resistors 75a to 75d.

The minimum-value calculation circuit successively performs magnitude comparison on 4-bit binary codes A, B and C bit by bit starting with their most significant bits (MSBs) for the minimum-value calculation.

By reference to FIG. 54 a description will be given of a case where three 4-bit binary numbers A, B and C are "1001" (=9), "0101" (=5) and "0110" (=6), respectively. First, as to the most significant bit, since A4="1", B4="0" and C4="0", A4>B4=C4. At this stage $A>B$ and $A>C$. It is therefore evident that A is maximum among A, B and C and comparison between only B and C will suffice for three lower bits. Since A4="1", the output of noninverting buffer circuit 64a is opened, i.e., in the high impedance state. Since B4=C4="0", the outputs of noninverting buffer circuits 69a and 74a are shorted, i.e., at a "0" level. Since the outputs of noninverting buffer circuits 64a, 69a and 74a are wire-ORed by signal line WO4, signal line WO4 is at a "Low" level (="0"). Thus, the output D4 of the minimum-value calculation circuit is "0".

EXCLUSIVE-OR circuit 61a of comparison operation circuit 60 produces an "1" output because A4="1" and WO4="0". OR circuits 63a, 62a and 62b thus produce "1" outputs. OR circuits 63b and 63c also produce "1" outputs. Hence, the outputs of noninverting buffer circuits 64b, 64c and 64d are in the high impedance state regardless of levels of inputs A3, A2 and A1. This allows to consider that the three lower bits A3, A2 and A1 of the input A have no influence upon the three lower bits D3, D2 and D1 of the minimum-value calculation output. Therefore, for the three lower bits of the inputs, B and C have only to be compared in magnitude as described above.

EXCLUSIVE-OR circuit 66a of comparison operation circuit 65 produces a "0" output because B4="0" and WO4="0" as described above. OR circuit 68a thus supplies B3 to noninverting buffer circuit 69b. Similarly, OR circuit 73a of comparison operation circuit 70 supplies C3 to noninverting buffer circuit 74b because C4="0" and WO4="1". In the present case, since B3 is "1" and C3 is also "1", that is, B3=C3, the outputs of noninverting buffer circuits 69b and 74b are both in the high-impedance state. Since the output of non-inverting buffer circuit 64b is also in the high-impedance state as described above, WO3 goes to a "High38 level (="1") through pull-up resistor 75c so that the output D3 of the minimum-value calculation circuit goes to a "1" level.

The output of EXCLUSIVE-OR circuit 66b of comparison operation circuit 65 is at a "0" level as described above because B3="1" and WO3="1". Also, since the output of EXCLUSIVE-OR circuit 66a is also at a "0" level as described above, OR circuit 67a produces a "0" output so that OR circuit 68b outputs B2 intact. Similarly, OR circuit 73b of comparison operation circuit 70 also outputs C2 because C3="1" and W03="1". At this stage the fact that C>B becomes evident because B2="0" and C2="1".

The output of noninverting buffer circuit 69c of comparison operation circuit 65 is shorted (="0") because B2="0", while the output of noninverting buffer circuit 74c of comparison operation circuit 70 is in the high impedance state because C2="1". Since the output of noninverting buffer circuit 64c of comparison operation circuit 60 is also in the high impedance state as described above, WO2 goes to a "0" level because of the wired-OR connection so that the output D2 of the minimum-value calculation circuit goes to a "0" level. Hence the output of EXCLUSIVE-OR circuit 71c goes to a "1" level since C2="1" and W02="1".

The output of OR circuit 72b thus goes to a "1" level and moreover the output of OR circuit 73c also goes to a "1" level with the result that the output of noninverting buffer circuit 74d becomes the high impedance state. The output of EXCLUSIVE-OR circuit 66c is at a "0" level since B2="0" and WO2="0", and the output of OR circuit 67a is at a "0" level as described above OR circuit 67b produces a "0" output, thus causing OR circuit 68c to output B1 intact. Furthermore, because the output of noninverting buffer circuit 64d is in the high impedance state as described above, it follows that WO1 is equal to B1 regardless of A1 and C1. In other words, since B1="1", WO1="1". The output D1 of the minimum-value calculation circuit thus becomes "1".

Figure 54:
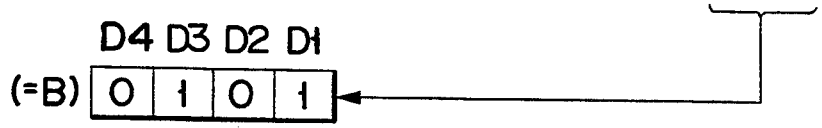
FIG. 54 is a diagram for illustrating the operation of the second example of the minimum-value calculation circuit of FIG. 51.

Consequently D4="0", D3="1", D2="0" and D1="1" result as shown in FIG. 54. "0101" (=5) is thus obtained as an output of the minimum-value calculation circuit of FIG. 51. This is the minimum value of three input binary numbers, A="1001" (=9), B="0101" (=5) and C="0110" (=6). The minimum-value calculation was thus carried out on three binary numbers A, B and C. The symbol x in FIG. 54 represents that they may take either "0" or "1".

To increase the number of input 4-bit binary numbers to four or more, the comparison operation circuits 60, 65 and 70 of FIG. 51, which are identical to each other in circuit arrangement, have only to be increased in number and wire-ORed. By adding noninverting buffer circuits and so on to the LSB side portion of each of comparison operation circuits 60, 65 and 70, the minimum-value calculation circuit would be permitted to accommodate five or more bits.

Next, then-part membership function defining circuit 930 and membership function synthesizing circuit 940 will be described. As described before with respect to the definition of the if-part membership functions, the then-part membership functions will be handled as triangular membership functions (A-function) as shown in FIGS. 4 and 5. Assuming that the membership value for an if-part input is the height h of a triangular membership function and the width of broadening of a then-part membership function is w as shown in FIG. 55, then the then-part membership function is defined as the area S of the triangular membership function. Where there are a plurality of if-part inputs, their minimum value obtained through the minimum-value calculation is used as the height h of the membership function. Accordingly, the then-part membership function will be expressed as follows:

$$S = w \times h/2 \tag{15}$$

Putting W as w/2, equation (15) may be rewritten as follows:

$$S = h \times W \tag{16}$$

W in equation (16) is a definition parameter for defining the then-part membership function. As a parameter W needs only relative variations. In order to implement the operation of equation (16) readily by use of a digital logic circuit, therefore, W should be set as a ratio relative to a fundamental value of W which might be taken as unity (="1").

When the membership function is defined, the positions (hereinafter referred to as the addresses) of the membership function are determined in accordance with then-part inputs. In general, the number of addresses is seven as shown in FIG. 56. The following labels are attached to the respective addresses.

NB: Negative Big (rather small)
NM: Negative Medium (small)
NS: Negative Small (somewhat small)
ZO: Zero
PS: Positive Small (somewhat big)
PM: Positive Medium (big)
PB: Positive Big (rather big)

When then-part membership functions S of equation (16) are defined from plural fuzzy rules and output from then-part membership function defining circuit 930, membership function synthesizing circuit 940 synthesizes then-part membership functions through maximum-value calculations for individual addresses (labels).

Figure 57:
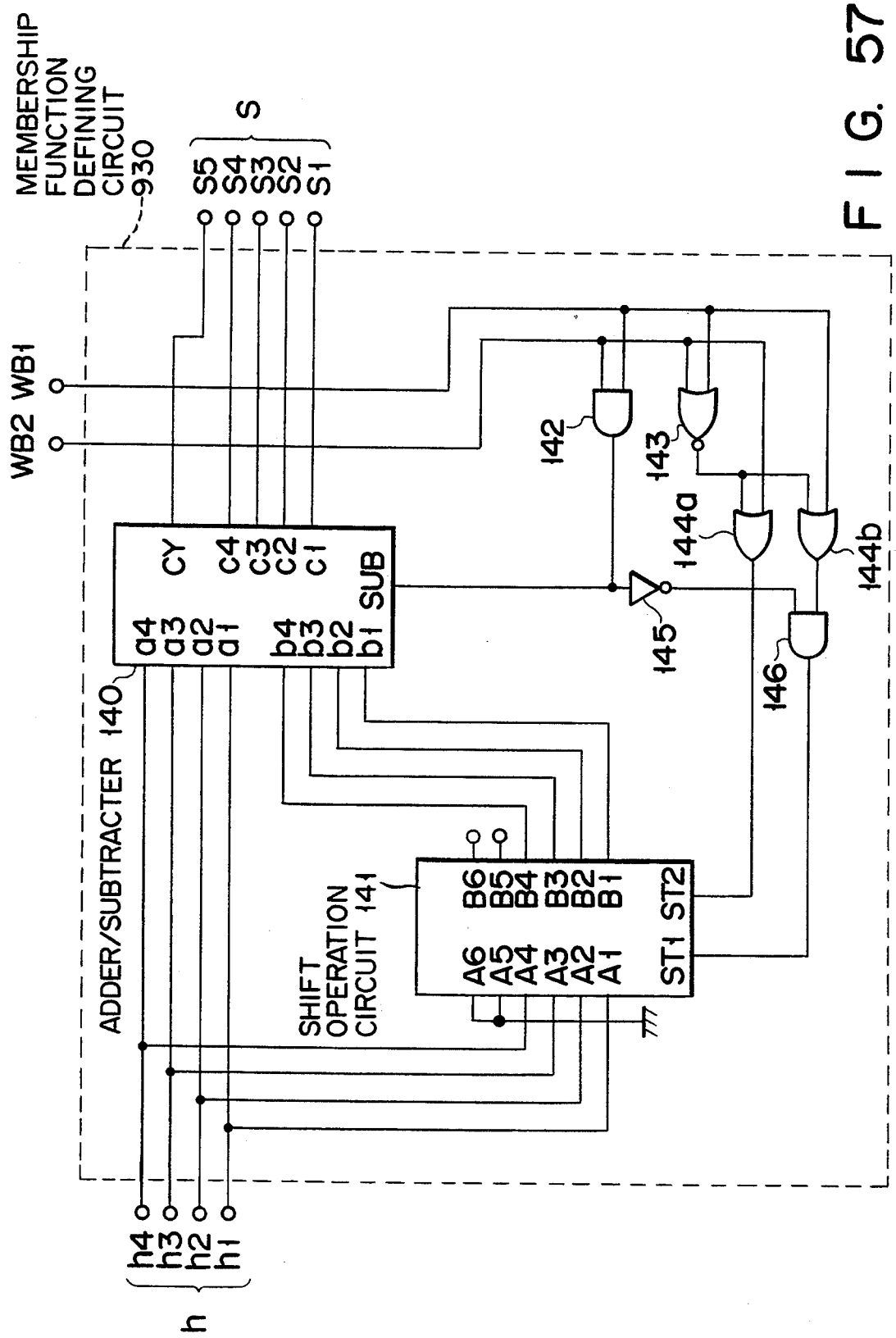
FIG. 57 is a circuit diagram of the then-part membership function defining circuit.

FIG. 57 is a block diagram of then-part membership function defining circuit 930 constructed with digital logic circuits for each of the fuzzy rules. Then-part membership function defining circuit 930 obtains the area S (refer to equation (16)) of a then-part membership function which is triangle in shape. Function defining circuit 930 includes a 4-bit binary code add-subtract circuit 140 and a shift operation circuit 141.

Adder/subtracter 140 is obtained by modifying subtracter 1 described in the if-part membership function defining circuit (FIG. 10) such that it may be used as an adder, a circuit arrangement of which being illustrated in FIG. 58. That is, in adder/subtracter circuit 140, inverters 6b to 6e of subtracter 1 are replaced with EXCLUSIVE-OR circuits 162a to 162d and a control input SUB is added to switch between addition and subtraction operations. When control input SUB is at a "1" level, EXCLUSIVE-OR circuit 162a to 162d operate like inverters for their respective inputs b4 to b1, and AND circuit 163 outputs the output of inverter 164 intact. Hence the adder/subtracter 140 operates in the same manner as in the case where subtracter 1 is adapted to 4-bit binary numbers. Conversely, when SUB="0", EXCLUSIVE-OR circuits 162a to 162d output their inputs b4 to b1 intact, and AND circuit 163 produces a "0" output. Thus, EXCLUSIVE-OR circuits 165a to 165d and 4-bit full adder 161 perform no logical operations so that adder/subtracter circuit 140 operates as an adder.

Shift operation circuit 141 of FIG. 57 is illustrated in detail in FIG. 59. Shift operation circuit 141 shifts each of bits of a 6-bit binary code to the LSB (least significant bit) side the number of bits specified by shift control inputs ST1 and ST2. The input/output relationships of shift operation circuit 141 is illustrated in FIG. 60.

When ST2="0" and ST1="0", NOR circuit 150a produces a "1" output with the result that AND circuits 151a to 151f output their respective inputs A6 to A1 intact. NOR circuits 150b and 150c both produce "0" outputs so that AND circuits 152a to 152e and 153a to 153d all produce "0" outputs OR circuits 154 and 155a to 155d thus output A5 to A1.

When ST2="0" and ST1="0", accordingly, no shift operation is performed so that inputs A6 to A1 are transferred to outputs B6 to B1 intact.

When ST2="0" and ST1="1", NOR circuits 150a and 150c both produce "0" outputs so that AND circuits 151a to 151f and 153a to 153d all produce "0" outputs. Since NOR circuit 150b produces a "1" output, AND circuits 152a to 152e output their respective inputs A6 to A2 intact. Hence OR circuits 154, 155a to 155d output inputs A6 to A2, respectively, so that B6 goes to a "0" level. Accordingly, inputs A6 to A1 are taken from B6 to B1 being shifted one bit to the LSB side.

When ST2="1" and ST1="0" NOR circuits 150a and 150b both produce "0" outputs so that AND circuits 151a to 151f and 152a to 152e all produce "0" outputs. Since NOR circuit 150c produces a "1" output, AND circuits 153a to 153d output their respective inputs A6 to A3 intact. Thus, OR circuits 155a to 155d outputs inputs A6 to A3, while OR circuit 154 produce a "0" output so that B6 is at a "0" level. Therefore, inputs A6 to A1 are taken from B6 to B1 being shifted two bits to the LSB side.

When ST1="1" and ST2="1", NOR circuits 150a to 150c all produce "0" outputs. Thus AND circuits 151a to 151f, 152a to 152e and 153a to 153d also all produce "0" outputs and moreover OR circuits 154, 155a to 155d thus produce "0" outputs. Therefore, outputs B6 to B1 are all at "0" levels regardless of inputs A6 to A1.

Shift operation circuit 141 is adapted to 6-bit input and output for use in a center-of-gravity calculation circuit as well, which is described later. Because four bits are sufficient for then-part membership function defining circuit 930, the two higher bits A6 and A5 of the input of shift operation circuit 141 are fixed to "0" in FIG. 57. Shift operation circuit 2-3 of FIG. 20 also has the arrangement shown in FIG. 59.

As described above, parameter W required to obtain S in equation (16) has its fundamental value set to 1.0 for simplifying the calculation. In the present embodiment, in addition to W=1.0, w can be set to 0.75, 1.25 and 1.5. W is varied by two binary codes WB1 and WB2. That is, in then-part membership function defining circuit 930 of FIG. 57, when WB2="0" and WB1="0", AND circuit 142 produces a "0" output so that adder/subtracter 140 operates as an adder. On the other hand, NOR circuit 143 produces a "1" output and hence OR circuits 144a and 144b both produce "1" outputs. Inverter 145 produces a "1" output so that the output of AND circuit 146 goes to a "1" level. In conclusion, ST2 and ST1 of shift operation circuit 141 are both supplied with "1"s with the result that shift operation circuit 141 produces "0"s at B6 to B1. Therefore, adder/subtracter 140 performs addition of h and 0 and hence the output S of then-part membership function defining circuit 930 becomes h. From equation (16) it follows that W=1.0.

When WB2="0" and WB1="1", AND circuit 142 produce a "0" output so that adder/subtracter 140 operates as an adder. On the other hand, NOR circuit 143 produces a "0" output and thus OR circuits 144a and 144b output their respective inputs WB2 and WB1 intact. Inverter 145 produces a "1" output so that AND circuit 146 outputs the output of OR circuit 144b intact. Hence ST2 and ST1 of shift operation circuit 141 are supplied with WB2 and WB1, respectively. That is, since WB2="0" and WB1="1", ST2="0" and ST1="1". As shown in FIG. 60, inputs A6 to A1 of shift operation circuit 141 are output to B6 to B1 being shifted one bit to the LSB side. In other words, h input to shift operation circuit 141 is output as h/2 and adder/subtracter 140 performs addition of h and h/2. When WB2="0" and WB1="1", therefore, the output S of then-part membership function defining circuit 930 becomes h+(h/2)=1.5 h. From equation (16) it follows that W=1.5.

When WB2="1" and WB1="0", AND circuit 142 produces a "0" output as with the case where WB2="0" and WB1="1". Hence adder/subtracter 140 operates as an adder. OR circuit 144a and AND circuit 146 output WB2 and WB1, respectively. That is, since WB2="1" and WB1="0", ST2="1" and ST1="0". According to the relationship of FIG. 60, inputs A6 to A1 of shift operation circuit 141 are taken from outputs B6 to B1 being shifted two bits to the LSB side. In other words, h applied to shift operation circuit 141 is taken as h/4, which is then added to h in adder/subtracter 140. Hence the output S of then-part membership function defining circuit 930 becomes h+(h/4)=1.25 h when WB2="1" and WB1="0". Then it follows that W=1.25.

When WB2="1" and WB1="1", adder/subtracter 142 operates as a subtracter because AND circuit 142 produces a "1" output. On the other hand, NOR circuit 143 produces a "0" output so that OR circuits 144a and 144b respectively output WB2 and WB1 intact. Since inverter 145 produces a "0" output, AND circuit 146 produces a "0" output. Thus, shift operation circuit 141 has ST2 supplied with WB2="1" and ST1 supplied with a "0" through AND circuit 146. Since ST2="1" and ST1="0", therefore, inputs A6 to A1 of shift operation circuit 141 is taken from outputs B6 to B1 being shifted two bits to the LSB side. Namely, h applied to shift operation circuit 141 is taken as h/4 and h/4 is then subtracted from h in adder/subtracter 140. Hence the output S of then-part membership function defining circuit 930 becomes h−(h/4)=0.75 h when WB2="1" and WB1="1". It thus follows that W=0.75 from equation (16).

As can be seen from FIG. 57, the output S of then-part membership function defining circuit 930 is a 5-bit binary code. However, for the purpose of simplifying the subsequent description of the center-of-gravity calculation circuit, only 1.0 is set to W and the output S is handled as a 4-bit binary code. It is to be noted here that a dedicated fuzzy inference device which is limited to W=1.0 needs no then-part membership function defining circuit.

Next, membership function synthesizing circuit 940 will be described. FIG. 62 is a block diagram of membership function synthesizing circuit 940 which is formed of digital logic circuits. Function synthesizing circuit 940 comprises data selectors 132a, 132b ... which are connected to then-part membership function defining circuits 930 each of which is provided for a separate fuzzy rule and maximum-value (MAX) calculation circuits 133a to 133g which are connected to the outputs of the data selectors.

FIG. 63 illustrates one example of the data selectors 133a, 132b ... Area data Si from then-part membership function defining circuit 930 is taken from one of output terminals So1 to So7 through AND circuits controlled by an output of address decoder 170. Address decoder 170 is formed of a standard logic IC74HC237 and has such input/output relationships as shown in FIG. 64. In FIG. 64, symbols x represent don't care data which is allowed to have either of "0" and "1" and *hold represents that data is depends on an address state when LE (latch enable) is "0".

Address decoder 170 is defined such that one of outputs Y0 to Y7 is a "1" and the remaining seven outputs are all "0"s in accordance with three address inputs A0 to A2. For example, when the address input is "000", address decoder 170 produces a "1" output at its output Y0 and "0" outputs at the other outputs Y1 to Y7 so that a 4-bit binary code applied to the input Si is taken from output So7 and the other outputs So1 to So6 all produce "0000" outputs. In this way, address decoder 170 is responsive to a 3-bit address input to output an input Si at one of outputs So1 to So7. The address inputs correspond to the addresses of the then-part membership functions.

As shown in FIG. 62, area data output from data select circuits 132a and 132b are entered into maximum-value calculation circuits 133a to 133g corresponding to the addresses (PB, PM, PS, ZO, NS, NM, NB) of the then-part membership function. Each of maximum-value calculation circuits 133a ... selects the maximum value of outputs for a corresponding one of the addresses for separate fuzzy rules, thereby to produce a fuzzy inferential result.

It is to be noted here that, with a dedicated fuzzy inference device, there is no need for data select circuits 132a, 132b ... because one of So1 to So7 to which the output S of then-part membership function defining circuit 930 is to be connected is determined beforehand. That is, it is necessary only that the outputs S of then-membership function defining circuits 930 for separate fuzzy rules be directly connected to corresponding maximum-value calculation circuits 133a to 133g.

Next, maximum-value calculation circuit 133a, 133b, ... will be described. The maximum-value calculation in the fuzzy theory is take the maximum value of given plural membership values. To implement a maximum-value calculation circuit with digital circuits handling numbers in binary code like the minimum-value calculation circuit, there is a method to use a digital comparator. However, although a digital comparator can be implemented with a relatively simple construction in handling two numbers, it has to be increased in circuit scale to handle three or more numbers. Thus, the use of a digital comparator cannot be said to be a very good method. As examples of the maximum-operation circuit, two cases will be described, one of which utilizes a digital comparator and the other of which utilizes no digital comparator.

First, an example of the maximum-value calculation circuit which uses a digital comparator is illustrated in FIG. 65. Reference numeral 80 denotes a 4-bit digital comparator (high-speed C-MOS standard logic IC such as 74HC85) which has the same input/output relationships as those of the minimum-value calculation circuit shown in FIG. 50.

Having a cascade input $(A=B)_{in}$ set to a "1" level ("High38 level) always, digital comparator 80 produces a "0" output at its output $(A=B)_{out}$ when two 4-bit binary numbers A and B are $A \neq B$ and a "1" output when $A=B$. Similarly, comparator 80 produces at output $(A>B)_{out}$ a "1" output when $A>B$, while a "0" output when $A \leq B$. Furthermore, at output $(A<B)_{out}$ a "1" output is produced when $A<B$, and a "0" output is produced when $A \geq B$.

When two 4-bit binary numbers A and B are related such that $A<B$, digital comparator 80 produces a "1" output at its output $(A<B)_{out}$ so that AND circuits 83a to 83d output bits B4 to B1 of 4-bit binary input number B intact. At this point, since each of outputs $(A>B)_{out}$ and $(A=B)_{out}$ is at a "0" level, OR circuit 81 produces a "0" output, causing all the AND circuits 82a to 82d to produce "0" outputs. Hence, OR circuits 84a to 84d output the outputs of AND circuits 83a to 83d, i.e., input B.

On the other hand, when two inputs A and B are related such that $A \geq B$ ($A>B$, or $A=B$), a "0" output is produced at output $(A>B)_{out}$ so that AND circuits 83a to 83d all produce "0" outputs. In this case, because either of outputs $(A=B)_{out}$ and $(A>B)_{out}$ is necessarily at a "1" level, OR circuit 81 produces a "1" output so that AND circuits 82a to 82d output their respective input bits A4 to A1 intact. Consequently OR circuits 84a to 84d output input A. When $A=B$, either of A and B may be selected. In this example, A is selected as the maximum-value output.

In this way the maximum-value calculation circuit of FIG. 65 performs the maximum-operation on two 4-bit binary codes A and B. If there are three or more inputs, (N−1) digital comparators 80, AND circuits 82 and 83 and OR circuits 81 and 84 may be combined to implement a maximum-value calculation circuit. Here N is the number of inputs.

Figure 66:
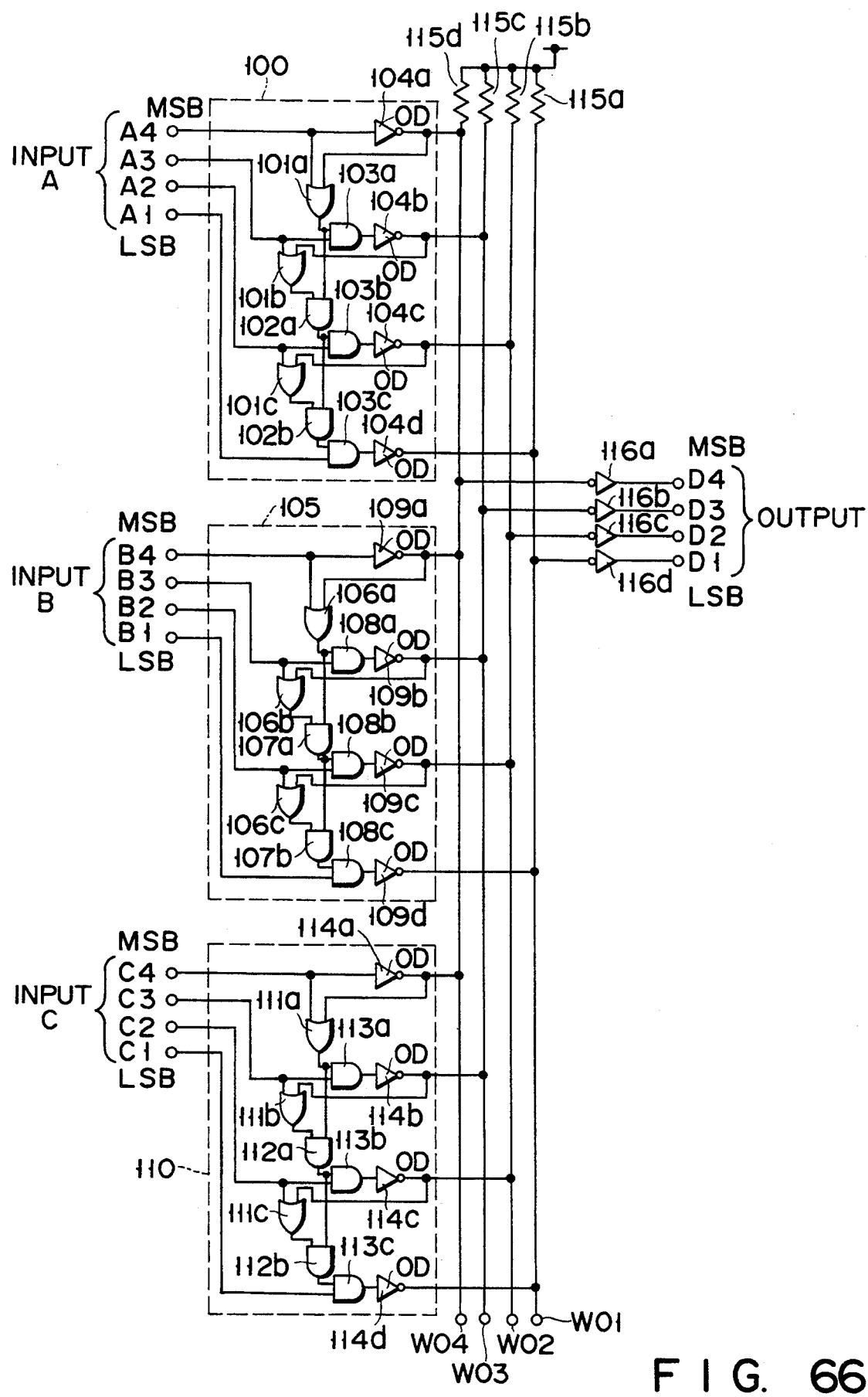
FIG. 66 is a circuit diagram of a second example of the maximum-value calculation circuit.

Next, an example of a maximum-value calculation circuit for 4-bit binary codes which uses no digital comparator is illustrated in FIG. 66. In this Figure, reference numerals 104a to 104d, 109a to 109d and 114a to 114d denote inverting buffer circuits of open drain output type (open collector output type in the case of bipolar ICs). An example of the inverting buffer circuits of open drain output type is illustrated in FIG. 67. An example of the inverting buffer circuit of open collector output type is illustrated in FIG. 68. By rendering a CS (chip select) input "0" in FIG. 67, current flowing into inverting buffer circuits 104a to 104d, 109a to 109d and 114a to 114d through pull-up resistors 115a to 115d can be blocked while the maximum-value calculation circuit is disabled, thus decreasing power dissipation. If the circuit is integrated into an IC and CS signals are all combined, the CS signals may be used as an operation standby signal for the IC.

In FIG. 66, outputs of comparison operation circuits 100, 105 and 110 are wire-ORed by signal lines WO1 to WO4. Inverting buffer circuits 116d to 116a connected to signal lines WO1 to WO4 convert the level of signal lines WO1 to WO4 and provide an output of the maximum-value calculation circuit. Signal lines WO1 to WO4 have their respective "High38 levels determined by pull-up resistors 115a to 115d.

The maximum-value calculation circuit performs magnitude comparison on 4-bit binary numbers bit by bit starting with their most significant bits (MSB) to obtain the maximum value. The operation of the maximum-value calculation circuit will be described with reference to FIG. 69 taking, as an example, a case where three 4-bit binary numbers A, B and C are "0110" (=6), "1010" (=10) and "1001" (=9), respectively. First, the most significant bits are related in magnitude such that A4<B4=C4 because A4="0", B4="1" and C4="1". At this stage it is evident that A<B and A<C, that is, A is minimum among A, B and C. For the three lower bits, therefore, comparison has only to be made between B and C.

At this point, since A4="0", the output of inverting buffer circuit 104a is open, i.e., in the high impedance state. Since B4=C4="1", on the other hand, the outputs of inverting buffer circuits 109a and 114a are shorted (at "Low38 level). Since the outputs of inverting buffer circuits 104a, 109a and 114a are wire-ORed by signal line WO4, WO4 goes to a "Low38 level (="0"). The output D4 of the maximum-value calculation circuit is D4="1" because the level of WO4 is inverted by inverting buffer circuit 116a. The output of OR circuit 101a of comparison operation circuit 100 is at a "0" level because A4="0" and WO4="0". Hence AND circuits 103a, 102a and 102b also produce "0" outputs and moreover AND circuits 103b and 103c also produce "0" outputs. Consequently the outputs of inverting buffer circuits 104b, 104c and 104d enter into the high impedance state regardless of the values of inputs A3, A2 and A1. This means that the three lower bits A3, A2 and A1 of input A exert no influence upon the three lower bits D3, D2 and D1 of the maximum-value calculation output. Therefore, only B and C are compared in magnitude for the three lower bits of the inputs.

Since B4="1" and WO4="0" as described above, the output of OR circuit 106a of comparison operation circuit 105 is at a "1" level. Thus, AND circuit 108a transfers B3 to the input of inverting buffer circuit 109b intact. Similarly, since C4="1" and WO4="0", AND circuit 113 of comparison operation circuit 110 also outputs C3 intact. Since, as shown in FIG. 69, B3="0" and C3="0" (i.e., B3=C3), the outputs of inverting buffer circuits 109b and 114b are together in the high impedance state. Since the output of inverting buffer circuit 104b is also in the high impedance state as described above, WO3 is raised to a "High38 level (="1") through pull-up resistor 115c, and output D3 becomes D3="0" by being inverted by inverting buffer circuit 116b.

Since B3="0" and W03="1" as described above, the output of OR circuit 106b of comparison operation circuit 105 is at a "1" level. Also, the output of OR circuit 106a is at a "1" level as described above and hence the output of AND circuit 107a goes to a "1" level, thus causing AND circuit 108b to output B2 intact. Similarly, since C3="0" and W03="1", AND circuit 113b of comparison operation circuit 110 also outputs C2 intact. Since B2="1" and C2="0", it is found at this stage that C>B (refer to FIG. 69).

The output of inverting buffer circuit 109c of comparison operation circuit 105 is shorted (at a "0" level) because B2="1", while the output of inverting buffer circuit 114c of comparison operation circuit 110 enters the high impedance state because C2="0". Since the output of inverting buffer circuit 104c of comparison operation circuit 110 is in the high impedance state as described previously, WO2 becomes "0" because of the wired-OR connection. The output D2 of the maximum-value calculation circuit is inverted by inverting buffer circuit 116c to provide D2="1". OR circuit 111c thus produces a "0" output because C2="0" and WO2="0". In response to this AND circuit 112b produces a "0" output and moreover AND circuit 113c also produces a "0" output so that the output of inverting buffer circuit 114d enters the high impedance state.

Since B2="1" and WO2="0", on the other hand, OR circuit 106c produces a "1" output. Since the output of AND circuit 107a is at a "1" level as described above, AND circuit 107b produces a "1" output, causing AND circuit 108c to output B1 intact. Moreover, since the output of inverting buffer circuit 104d is in the high impedance state as described previously, WO1 is equal to the inverted value of B1 regardless of A1 and C1. That is, since B1="0", inverting buffer circuit 109d provides WO1="1", and the output D1 of the maximum-value calculation circuit becomes D1="0" through inversion by inverting buffer circuit 116d.

As shown in FIG. 69, it follows that D4="1", D3="0", D2="1" and D1="0". "1010" (=10) results as the output of the maximum-value calculation circuit of FIG. 66. This is the maximum of three inputs A="0110" (=6), B="1010" (=10) and C="1001" (=9). In this way, the circuit of FIG. 66 performs the maximum-value operation on three 4-bit binary numbers A, B and C. For four or more 4-bit binary numbers, comparison operation circuits 100, 105 and 110 (as can be seen from FIG. 66, they are the same circuits) has only to be increased in number for wired-OR connection. Inverting buffer circuits may be added to the LSB side of each of comparison operation circuits 100, 105 and 110 to accommodate five or bits.

Next, center-of-gravity calculation circuit 950 will be described. The center-of-gravity calculation is to vary fuzzy inferential results obtained by the membership synthesizing circuit 940 to non-fuzzy values (to obtain the gravity center of fuzzy inferential results), thereby to obtain an output value (definite value) of a fuzzy controller.

The fuzzy inferential results are allocated to addresses of 0 to 6 corresponding to labels NB to PB as shown in FIG. 70. The fuzzy inferential results are represented by triangles and the positions of the centers of gravity of the triangles are represented by the addresses of 0 to 6.

In general, where a material body is divided into some parts whose centers of gravity are known beforehand, the position of the material body can be obtained as the center of gravity of a system of material points in which the mass of each of the parts is concentrated on its center of gravity. Therefore, assuming that the areas of triangles of NB, NM, NS, ZO, PS, PM and PB are $S_{NB}$, $S_{NM}$, $S_{NS}$, $S_{ZO}$, $S_{pS}$, $S_{pM}$ and $S_{pB}$ and addresses 0 to 6 are distances up to material points (centers of gravity of the triangles) from the origin 0, the center of gravity of fuzzy inferential results shown in FIG. 70 can be replaced as shown in FIG. 71.

With address 0 taken as the center, the position GA of center of gravity can be obtained as follows:

$$GA = (S_{NM} + 2S_{NS} + 3S_{ZO} + 4S_{PS} + 5S_{PM} + 6S_{PB}) \div \quad (17)$$
$$(S_{NB} + S_{NM} + S_{NS} + S_{ZO} + S_{PS} + S_{PM} + S_{PB})$$

With $S_s = S_{NM} + S_{NS} + S_{ZO} + S_{PS} + S_{PM} + S_{PB}$, (18)

equation (17) may be changed as follows:

$$GA = (S_s + S_{NS} + 2S_{ZO} + 3S_{PS} + 4S_{PM} + 5S_{PB}) \div \quad (19)$$
$$(S_{NB} + S_s)$$
$$= \{S_{NS} + S_{PS} + 2(S_{ZO} + S_{PS}) + 4(S_{PM} + S_{PB}) + S_{PB} + S_s\} \div (S_{NB} + S_s)$$

According to equation (19) the center-of-gravity calculation circuit can be implemented by use of adders and a divider. Putting numerator $\{S_{NS}+S_{PS}+2(S_{ZO}+S_{PS})+4(S_{PM}+S_{PB})+S_{PB}+S_s\}$ as ScC and denominator $(S_{NB}+S_s)$ as SmC, center-of-gravity calculation circuit 950 may be arranged as shown in FIG. 72.

Figure 73:
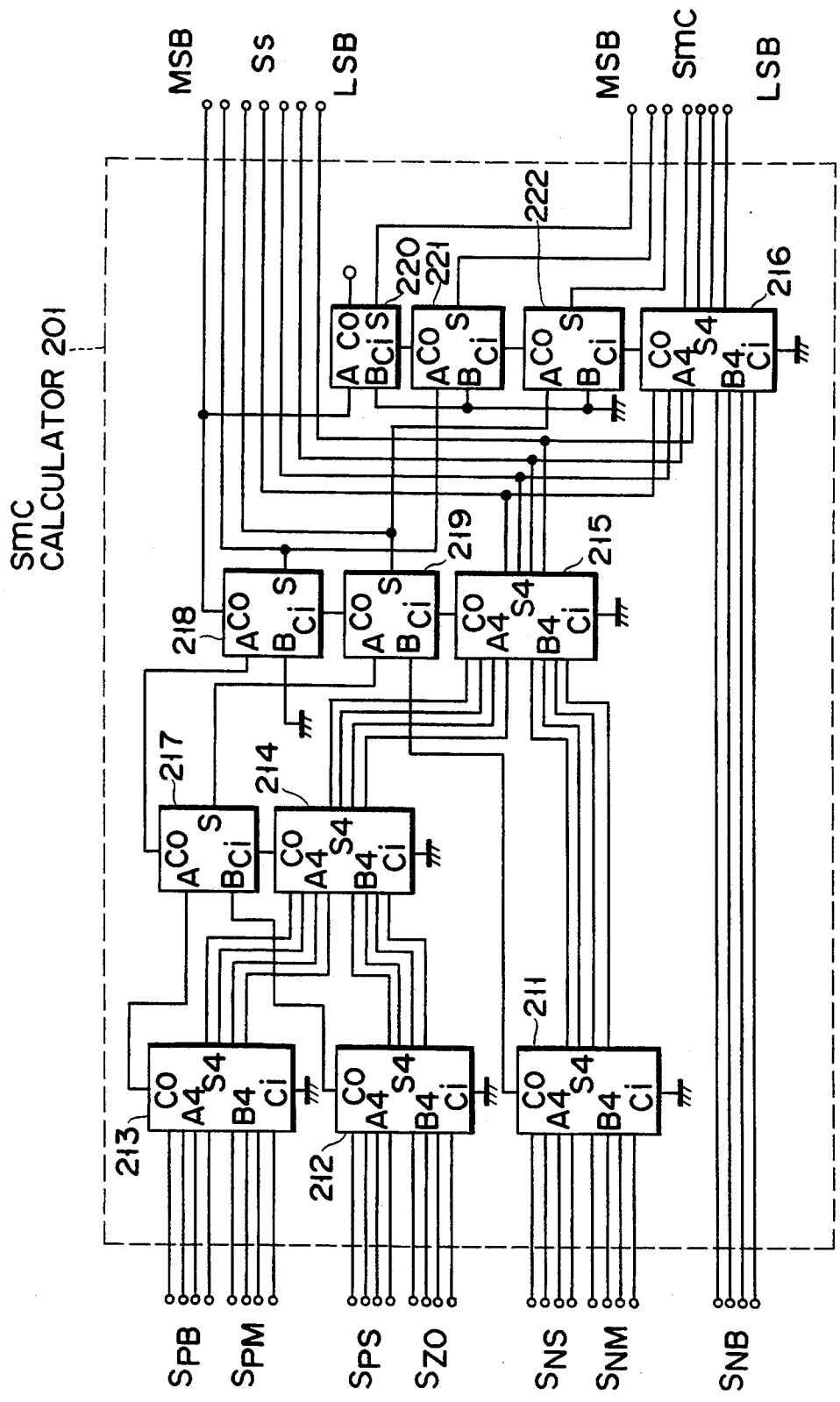
FIG. 73 shows a circuit arrangement of the calculation circuit for obtaining a denominator used for obtaining the center-of-gravity.

Calculation circuit 201 of center-of-gravity calculation circuit 950 is a circuit for obtaining SmC in equation (19), i.e., for obtaining Ss and the denominator SmC=$S_{NB}$+Ss in equation (19) from area data $S_{NB}$ to $S_{pB}$ output from maximum-value calculation circuits 133a to 133g of FIG. 62. Assuming that $S_{NB}$ to $S_{pB}$ are each four bits in length, SmC-calculation circuit 201 may be arranged as shown in FIG. 73. Ss and SmC each have only to be seven bits in length because each input data is of four bits. Reference numerals 211 to 216 denote 4-bit full adders and 217 to 222 1-bit full adders.

Arithmetic operation circuit 202 is a circuit for obtaining numerator ScC in equation (19) and performs the following arithmetic operation on the input data of $S_{NS}$, $S_{ZO}$, $S_{PS}$, $S_{PM}$, $S_{PB}$ and Ss.

$$ScC = S_{NS} + S_{PS} + 2(S_{ZO} + S_{PS}) + 4(S_{PM} + S_{PB}) + S_{PB} + S_s \quad (20)$$

Figure 74:
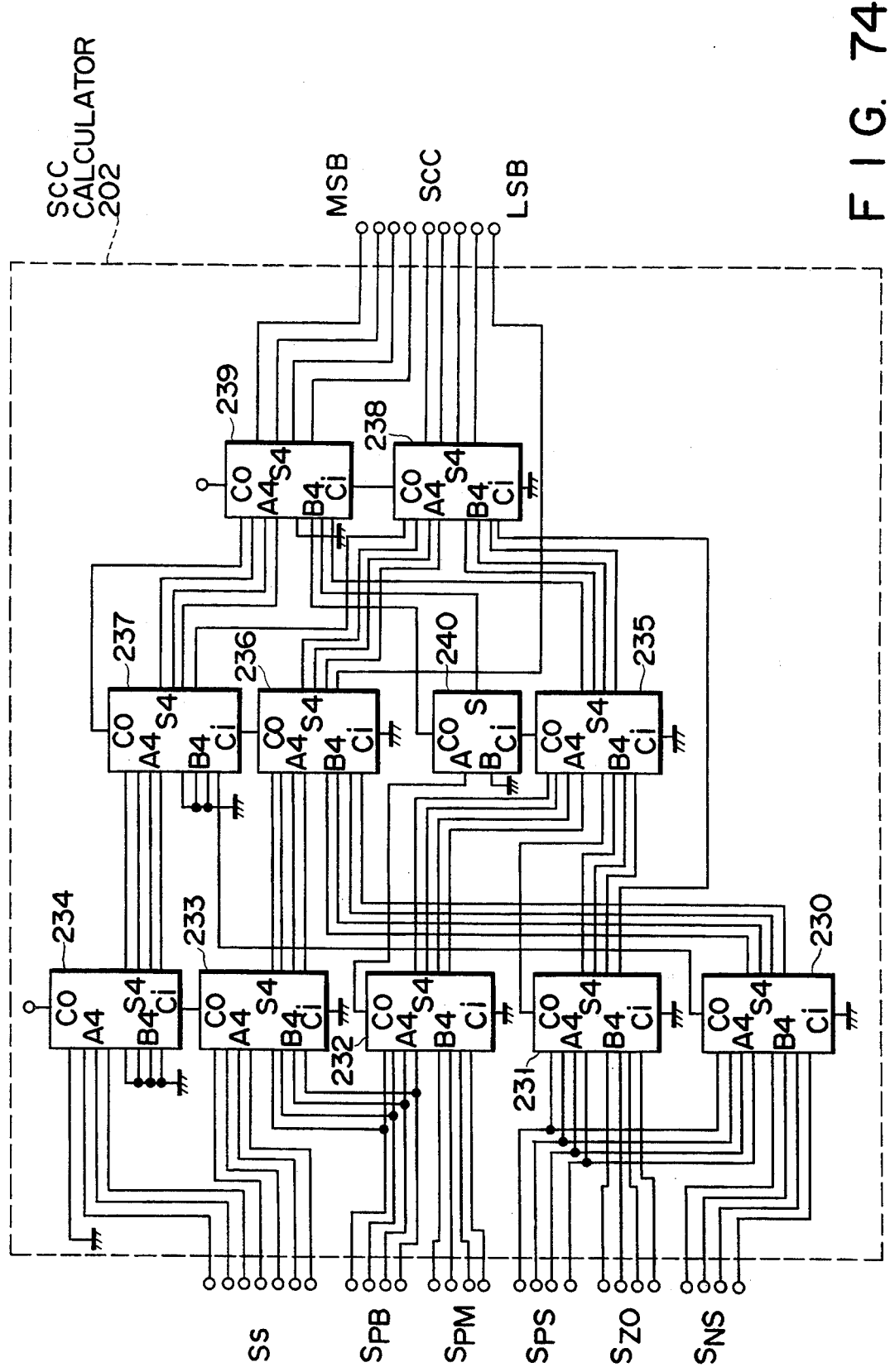
FIG. 74 shows a circuit arrangement of the calculation circuit for obtaining a numerator used for obtaining the center-of-gravity.

Assuming that $S_{NS}$ to $S_{pB}$ are each four bits in length and Ss is seven bits in length, ScC-calculation circuit 202 may be arranged as shown in FIG. 74. The number of bits of calculation results is as many as nine bits since the maximum is 315 (="100111011") even if all the input values are 15 of the maximum value of 4-bit number. Reference numerals 230 to 239 denote 4-bit full adders and 240 a 1-bit full adder. Full adder 230 calculates $S_{NS}+S_{pS}$ in equation (20), full adder 231 calculates $S_{ZO}+S_{pS}$ in equation (20), full adder 232 calculates $S_{pM}+S_{pB}$ in equation (20) and full adders 233 and 234 calculate $S_{pB}+S_s$ in equation (20). Carry output Co of full adder 234 is not needed because the result of addition does not exceed eight bits.

Full adders 235 and 240 calculate $(S_{ZO}+S_{pS})+2+(S_{pM}+S_{pB})$, add the result of calculations by adders 235 and 240 to $S_{ZO}+S_{pS}$ being shifted one bit to the MSB side and consequently calculate $(S_{ZO}+S_{pS})+2(S_{pM}+S_{pB})$. Full adders 236 and 237 calculate $(S_{NS}+S_{pS})+(S_{pB}+Ss)$. Full adders 238 and 239 add the results of calculation by full adders 235 and 240 to $\{(S_{NS}+S_{pS})+(S_{pB}+Ss)\}+2$, resulting in $(S_{NS}+S_{pS})+(S_{pB}+Ss)+2\{(S_{ZO}+S_{pS})+2(S_{pM}+S_{pB})\}=S_{NS}+S_{pS}+2(S_{ZO}+S_{pS})+4(S_{pM}+S_{pB})+S_{pB}+Ss$. This result agrees with equation (20). There is also no need for carry output Co of full adder 239 because the result of calculation never exceeds nine bits or more.

Outputs SmC and ScC of calculation circuits 201 and 202 are applied to division circuit 203 to calculate ScC÷SmC. Division circuit 203 performs division by repeating subtraction. That is, a divisor is subtracted from a dividend with their most significant bits aligned with each other, and when the result is positive, a "1" is placed as the answer for the bit position of the dividend. When the result is negative, a "0" is placed as the answer for the bit position. Also, when the result is positive, the remainder is used for the next calculation, while the dividend is used for the next calculation as it is when the result is negative.

By way of example, "11010÷101" will be explained with reference to FIG. 75. First, "101" is subtracted from "11010" with their most significant bits aligned with each other. Since the result of subtraction, i.e., "011" is positive, "1" is placed as an answer bit. The result of subtraction is used for the next subtraction. A lower bit "1" is received from the dividend. A "0" within broken lines at the side of the least significant bit of the dividend is used to obtain decimal fractions of a quotient. In this case, the quotient may have an accuracy of $\frac{1}{2}$.

Similarly, the divisor "101" is subtracted from the result of subtraction "011". In this case, since the result is negative, the answer bit is "0". The two lower bits "11" of the previous result of subtraction "011" is used as the result of subtraction as it is. Similarly, the operation is continued up to the least significant bit and the answer "101.0" results. To raise the accuracy in the decimal fraction part a little more, "0"s may be added to the lower order bit side of the dividend "11010.0" and the resultant dividend has only to be shifted left for calculation. For each of "0"s added, the accuracy improves in units of $\frac{1}{2}^n$ such that $\frac{1}{2}$, $\frac{1}{4}$, $\frac{1}{8}$. . . .

FIG. 76 shows a division circuit 203 arranged on the basis of the above system. The above subtractions are carried out by subtraction multiplexers 280 to 285. FIG. 77 shows in detail subtraction multiplexers 280 to 285 when the minuend ScC is seven bits, the subtrahend SmC is seven bits, the answer D is one bit ("1" when the subtraction can be made) and the remainder or minuend ScC is six bits. 4-bit full adders 250 and 251 perform an arithmetic operation of Smc+scc+1=scc−smc. If the answer is positive or "0", a "1" is output to the carry output Co of full adder 250. When the answer is negative, a "0" is output. That is, this is an answer bit D of division circuit 203. Therefore, by multiplexing the result of subtraction when the carry output Co of full adder 250 is "1" or the minuend ScC when the carry output Co of full adder 250 is "0", ScC is output from subtraction multiplexers 280 to 285.

In division circuit 203 of FIG. 76, ScC is shifted left three bits (the lower bits of subtraction multiplexers 283 to 285 are "0"s) and the PB address is set to 48 as shown in FIG. 78C to obtain the result GA of division. The denominator and numerator for division are conditioned in equation (17) and hence the result necessarily becomes three bits when there are no subtraction multiplexers 283 to 285.

Center-of-gravity calculation circuit 950 of FIG. 72 was described with respect to the case where the then-part membership functions have seven addresses. How to obtain the position GA of center of gravity in a case where the number n of the addresses of the functions is other than seven will be illustrated below. It is assumed here that the area of a then-part membership function having a position of center of gravity of n is Sn.

When n=2:

$$GA = S1 + (S0 + S1) \quad (21)$$

When n=3:

$$GA = (Ss + S2) + (S0 + Ss) \quad (22)$$
where Ss=S1+S2.

When n=4:

$$GA = (Ss + S2 + 2S3) + (S0 + Ss) \quad (23)$$

where Ss=S1+S2+S3.

When n=5:

$$GA = \{Ss + S2 + 2(S3 + S4) + S4\} + (S0 + Ss) \quad (24)$$

where Ss=S1+S2+S3+S4.

When n=6:
$$GA = \{Ss + S2 + 2(S3 + S4) + S4\} + 4S + (S0 + Ss)$$

where Ss=S1+S2+S3+S4+S5.

In this way calculation circuits 201 and 202 shown in FIGS. 73 and 74 may be modified according to equations (21) to (25) to obtain the centers of gravity even when n is other than seven.

Center-of-gravity address calculation circuit 204 of FIG. 72 will be described. This circuit sets the values of GA data (NB to PB addresses) to those of FIG. 78A, FIG. 78B or FIG. 78C by specifying address dividing data. With a dedicated fuzzy controller, GA outputs have only to select output lines (corresponding to FIG. 78A when GA5 to GA2 are used) so that there is no need for center-of-gravity address calculation circuit 204. For use as a general purpose fuzzy controller, the number of addresses is specified by the address division specification data to output being LSBs aligned.

As center-of-gravity address calculation circuit 204, shift operation circuit 141 shown in FIG. 59 may be used as it is. In FIG. 59, A corresponds to the GA input and ST2 and ST1 correspond to the address division specifying inputs. When ST2 and ST1 are "0, 0", FIG. 78C is selected and the PB address is 48. When ST2 and ST1 are "0, 1", FIG. 78B is selected and the PB address is 24. When ST2 and ST1 are "1, 0", FIG. 78A is selected and the PB address is 12.

That is, when the interval between addresses is divided into two, the number of addresses from NB to PB is set to 12 as shown in FIG. 78A. For division into four, the number of addresses is set to 24 as shown in FIG. 78B. For division into eight, the number of addresses is set to 48 as shown in FIG. 78C. In this way coarse fuzzy controller outputs or fine fuzzy controller outputs may be selected by specifying the address division.

In the above description, the addresses of centers of gravity of the then-part membership functions are seven in number as shown in FIG. 70 and, in each of the data select circuits 132a ... of FIG. 62, one of seven addresses is determined by a then-part address input for one rule. If there is a need for the center-of-gravity addresses of the then-part membership functions to be set more finely, the address of a then-part membership function for one rule may be specified to more than two different positions (hereinafter referred to as the multi-addressing) to displace the position of center of gravity equivalently.

As shown in FIG. 79, when the result S of area calculation output to the inherent address (called the main address) determined by the then-part address input and the result S of area calculation output to an address (called a subaddress) added to displace the position of center of gravity of the then-part membership function are equal to each other, the position of center of gravity is a midway position between the main address and the subaddress.

It is possible to displace the position of center of gravity from the midway position between the main address and the subaddress shown in FIG. 79 by multiplying the different values $R_M$ and $R_S$ which are not unity to the results S of area calculation as shown in FIG. 80. The estimated membership function as a result of center-of-gravity shifting is shown by a broken line in FIG. 80. However, it is possible to estimate the membership function as shown in FIG. 81.

FIG. 82 is a basic block diagram of a modification of membership function synthesizing circuit 940 of FIG. 62 which is adapted to the multi-addressing described above. Area data Si output from area calculation circuit (then-part membership function defining circuit) 930 is input to two multipliers 500 and 502 to which parameters $R_M$ and $R_S$ are applied, respectively. Multipliers 500 and 502 output Si·$R_M$ and Si·$R_S$ to multi-address designating circuit 504. Responsive to a then-part main address input MA and a then-part subaddress input SA, multi-address designating circuit 504 outputs Si·$R_M$ and Si·$R_S$ to one of So1 to So7. The output of multi-address designating circuit 404 is supplied to maximum-value calculation circuits 133a to 133g of FIG. 62. To acquire balance with other rules, it is required that the sum of parameters $R_M$ and $R_S$ be unity.

FIG. 83 shows a digital circuit arrangement for the circuit of FIG. 82. FIG. 83 comprises 4-bit multipliers 250a and 250b, address decoders (standard logic IC such as 74HC237: refer to FIG. 64 for their input/output relationships) 251 and 252 and data select circuits 253a to 253g. Multipliers 250a and 250b are each identical to multiplier 2-2 of FIG. 10 and multiply area data Si and coefficients $R_M$, $R_S$ to obtain area data Si·$R_M$ and Si·$R_S$ to be output to the main address and subaddress. In this circuit, the four higher bits of eight bits output from each of multipliers 250a and 250b are used. Accordingly, the outputs of multipliers 250a and 250b take values of Si·(R/16) (R is $R_M$ or $R_S$ and an integer from 0 to 15) which are output to the main address and the subaddress.

Data select circuits 253a to 253g are identical to one another in circuit arrangement and their internal circuit arrangement is illustrated in FIG. 84. This circuit is adapted to output 4-bit binary code inputs A, B or "0" from output terminal O according to inputs SE1 and SE2 from address decoders 251 and 252. Its input/output relationship is illustrated in FIG. 85. Symbols x represent that they may take either of "0" and "1".

In FIG. 84, when control inputs SE1 and SE2 are both at "0" levels, AND circuit 260 produces a "0" output, the output of inverter 269 becomes "1" and thus AND circuits 264 and 265 output the outputs of AND circuits 262 and 263 intact. On the other hand, since control inputs SE1 and SE2 are at "0" levels, AND circuits 262 and 263 produce "0" outputs. AND circuits 266a to 266d and 267a to 267d all produce "0" outputs so that OR circuits 268a to 268d produce an output 0 whose bits are all "0"s.

When SE1="1" and SE2="0", AND circuit 260 produces a "0" output so that OR circuit 264 and AND circuit 265 output the outputs of AND circuits 262 and 263 intact. Since EXCLUSIVE-OR circuit 261 produces a "1" output and SE1="1" and SE2="0", AND circuits 262 and 263 produce "1" and "0" outputs, respectively. AND circuits 266a to 266d thus output A4 to A1 of input A. Since AND circuits 267a to 267d produce "0" outputs, OR circuits 268a to 268d output at output 0 input A.

When SE1="0" and SE2="1", since AND circuit 260 produces a "0" output, OR circuit 264 and AND circuit 265 output the outputs of AND circuits 262 and 263 intact. Since EXCLUSIVE-OR circuit 261 produces a "1" output and SE1="0" and SE2="1", AND circuits 262 produces a "0" output and 263 produces "1". AND circuits 266a to 266d thus produce "0" outputs. Since AND circuits 267a to 267d output B4 to B1 of input B, OR circuits 268a to 268d output input B at output O.

When SE1 and SE2 are both "1"s, AND circuit 260 produces a "1" output, OR circuit 264 produces a "1" output and AND circuit 265 produces a "0" output because of "0" output of inverter circuit 269. Thereby, AND circuits 266a to 266d output A4 to A1 of input A. Since AND circuits 267a to 267d produce "0" outputs, OR circuits 268a to 268d output input A at output O. The operation of data select circuits 253a to 253g was described so far.

Next, the multi-address designation performed by the circuit of FIG. 83 will be described. The main address MA and subaddress SA of a then-part membership function are entered into address decoders 251 and 252, respectively.

As an example. a description is made of a case where the main address MA is a binary code of "110" and the subaddress SA is a binary code of "101". Since MA="110", the output of address decoder 251 is such that Y6="1" and Y5 to Y0 are "0"s as may be seen from FIG. 64. On the other hand, since SA="101", the output of address decoder 252 is such that Y6="0". Y5="1" and Y4 to Y0="0" as may be seen from FIG. 64. Since control inputs SE1 and SE2 of data select circuits 253c to 253g are both at "0" levels. the outputs O of data select circuits 253c to 253g become 0s. Because SE1="1" and SE2="0", data select circuit 253a outputs input A, i.e., SRM (=Si−$R_M$/16) as may be seen from FIG. 85. On the other hand, since SE1="0" and SE2="1", data select circuit 253b outputs input B. i.e., $S_{RS}$ (=Si−$R_S$/16) as can be seen from FIG. 85. Thus, So1 is output as the main address and So2 is output as the subaddress.

When the main address and subaddress are specified as the same address, the corresponding data select circuit outputs input A, i.e., $S_{RM}$ as may be seen from FIG. 85 because control inputs SE1 and SE2 are both at "1" levels. This is a case where a subaddress is not specified. In this case, $R_M$ needs to be set to "0001" because input Si has to be multiplied by one by multiplier 250a.

Figure 86:
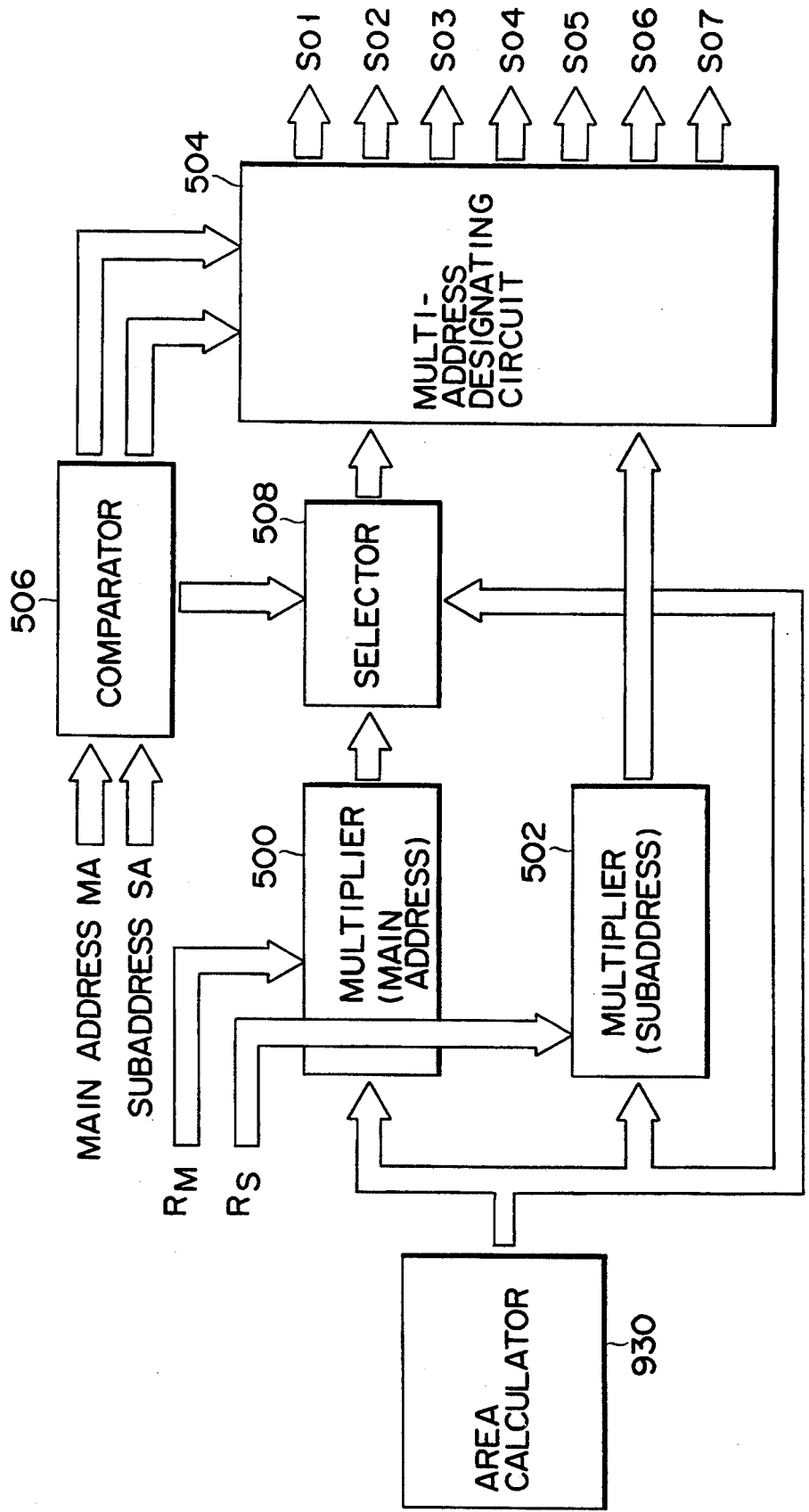
FIG. 86 is a block diagram of a modification of the multi-address designating circuit.

When the subaddress is not designated, multiplication of Si and $R_M$, $R_S$ is not required. As shown in FIG. 86, therefore, when the main address and the subaddress are equal to each other, comparator 506 transmits a coincidence signal to data select circuit 508. Responsive to the coincidence signal, data select circuit 508 selects an output signal of area calculation circuit 930, which bypasses multipliers 500 and 502, for transfer to multi-address designating circuit 504.

The multipliers in FIGS. 86 and 82 may have a function of calculating the area and area calculation circuit 930 may thus be omitted.

As may be seen from the foregoing, each of the main address and the subaddress may be allocated to any one of seven addresses (seven labels shown in FIG. 70) independently. It is not necessary, therefore, that the main address and the subaddress be adjacent to each other as in the example described above. For example, in FIG. 70, the main address and the subaddress may be set to PM and NB, respectively. According to this modification, by multiplying or dividing the area for each of inferential results by a specified parameter and outputting the result of calculation to predetermined plural addresses, it is possible to define then-part membership functions freely with a simple construction.

Figure 87:
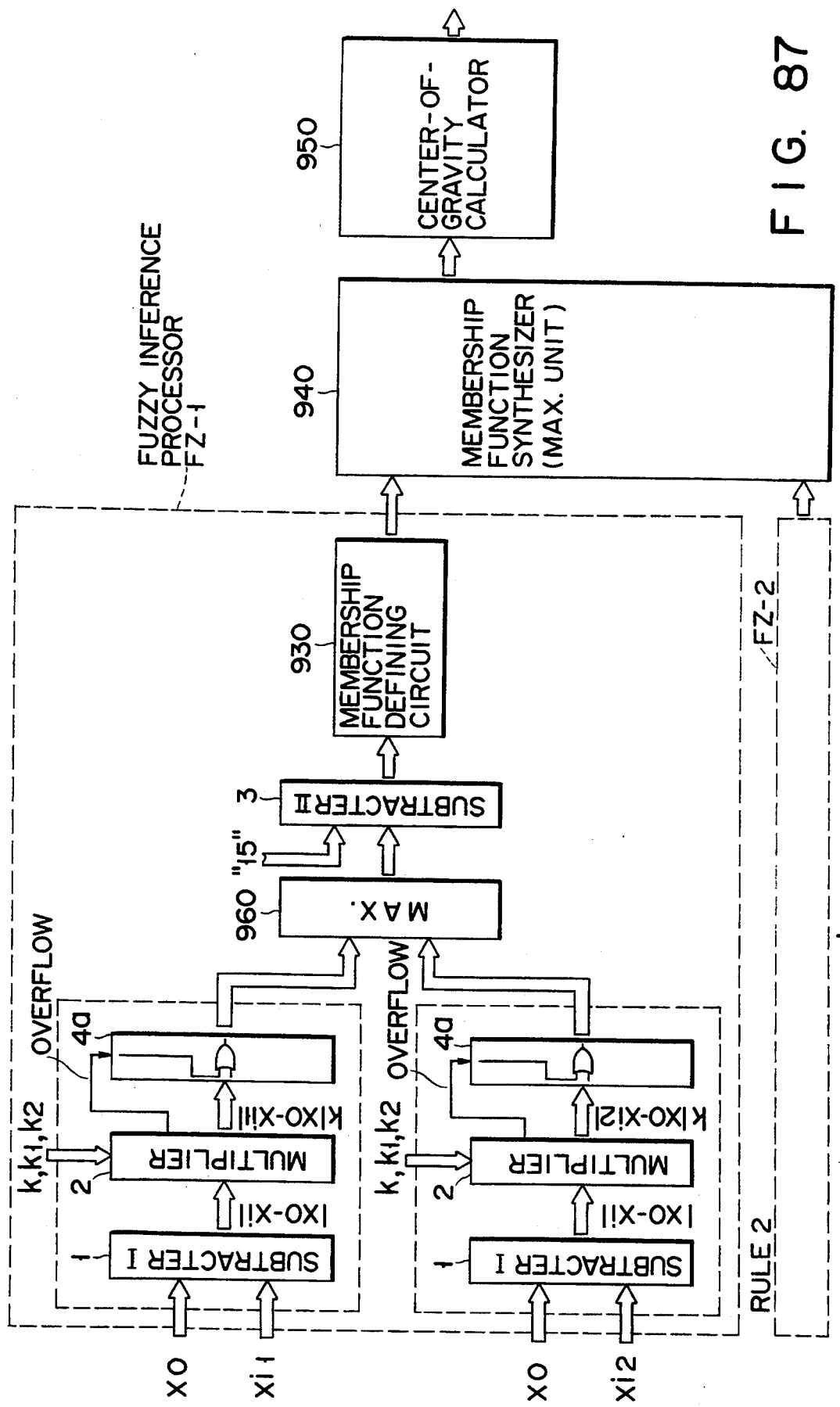
FIG. 87 is a block diagram of a digital fuzzy inference system according to a second embodiment of the present invention.

Next, a second embodiment of the present invention will be described. Illustrated in FIG. 87 is a block diagram of the second embodiment in which the output of the second subtracter 3 in membership function defining circuit 910 of the first embodiment shown in FIG. 9 is connected to the input of the then-part membership function defining circuit 930. It is to be noted here that outputs of OR circuits 4a for respective then-part inputs are reversed in magnitude relationship of membership values. It is accordingly required that not a minimum-value calculation circuit but maximum-value calculation circuit 960 be connected to follow OR circuits 4a and then the reversal of magnitude, i.e., the calculation by second subtracter 3 in FIG. 9 be performed.

By doing so, the minimum-value calculation in the fuzzy theory may be replaced with the maximum-value calculation. Furthermore, according to the second embodiment, second subtracter 3 may be one in number for each of rules, which is provided for each of membership function defining circuits 910 for then-part inputs in the first embodiment. This will decrease the number of subtracters 3, thereby to provide an advantage in that the circuit scale is reduced. This advantage increases as the number of then-part inputs increases. Each circuit blocks in the second embodiment can be implemented by circuits described in the first embodiment.

As described above, the fuzzy inference device according to the present invention is simple in construction and has advantages that the fuzzy inference speed is very fast and noise is not generated because a system clock is not used. In addition, according to the present invention, there is provided a digital fuzzy inference device having an advantage that, because of the use of if-part membership function defining circuits simple in construction, an increase of if-part inputs in number will not result in a corresponding increase in circuit scale. Moreover, according to the present invention, the forms of the if-part membership function can be defined freely. Also, the addresses of the then-part membership functions may be changed freely.

What is claimed is:

1. An if-part membership function generating apparatus for use in a digital fuzzy inference system, for obtaining an inferential result using an if-part membership function which responds to binary input data and a then-part membership function which responds to a value of the if-part membership function with respect to the binary input data, comprising:

means for inputting binary data;
  means for inputting parameters for the if-part membership function represented as a line having a combination of gradients, each parameter including a tangent of a gradient and a point of change at which the gradient of the line changes;

means for producing an if-part membership value for the binary data inputted by said binary data inputting means which has said point of change and said tangent of a gradient set by the parameters inputted by said parameters inputting means, wherein said if-part membership value producing means comprises:

a first subtracter having means for calculating output $|xo-xi|$ from the point of change xo and the binary data xi;

a multiplier coupled to the first subtracter and having means for calculating $k \cdot |xo-xi|$ from the output of said first subtracter and the tangent k; and a second subtracter coupled to the multiplier for calculating $C - k \cdot |xo-xi|$ from the output of said multiplier and a predetermined value C, the output of said second subtracter serving as the if-part membership value.

2. The system according to claim 1, in which said membership value producing means further comprises means for changing the shape of the if-part membership function by setting the value corresponding to one of the gradients to zero.

3. The system according to claim 1, in which said membership value producing means further comprises means for changing the shape of the if-part membership function by inverting the sign of the value corresponding to the gradients and by setting the value corresponding to one of the gradients to zero.

4. The system according to claim 1, in which said first subtracter comprises:

a full adder for adding the point of change xo, a complement of the binary data xi, and a carry input, said full adder outputting a result of addition and a carry output, the carry output being 0 if an overflow does not occur during an addition procedure and 1 if the overflow occurs;

an inverter for inverting the carry output of the full adder; and an EX-OR gate for outputting an EX-ORed value of the result of addition and an output of the inverter, the EX-ORed value being $|xo-xi|$.

5. The system according to claim 1, in which said second subtracter comprises:

a subtracter for outputting a result of subtraction of $C - k \cdot |xo-xi|$ and an underflow signal, the underflow signal being 0 if underflow occurs during a subtraction procedure and 1 if the underflow does not occur; and and AND gate for outputting an ANDed value of the result of subtraction and the underflow signal.

6. The system according to claim 1, in which said multiplier comprises:

a multiplier including means for producing a shifted input by shifting a bit of one input signal to a most significant bit and an adder for adding the shifted input to another input signal, the adder outputting an overflow signal if an overflow occurs;

an OR gate for outputting an ORed value of the result of multiplication and the overflow; and an EX-OR gate for outputting an EX-ORed value of an output of the OR gate and a maximum value of the if-part membership value, the EX-ORed value being the if-part membership value.

7. An if-part membership function generating apparatus for use in a digital fuzzy inference system, for obtaining an inferential result using an if-part membership function which responds to binary input data and a then-part membership function which responds to a value of the if-part membership function with respect to the binary input data, comprising:

means for inputting binary data;

means for inputting parameters for the if-part membership function represented as a line having a combination of gradients, each parameter including a tangent of a gradient and a point of change at which the gradient of the line changes;

means for producing an if-part membership value for the binary data inputted by said binary data inputting means which has said point of change and said tangent of a gradient set by the parameters inputted by said parameters inputting means, wherein said if-part membership value producing means comprises:

a multiplier having means for calculating $k \cdot xi$ from the tangent k and the binary data xi;

means for setting a product $k \cdot xo$ of the point of change xo and the tangent k as a parameter;

a first subtracter coupled to said multiplier and said parameter setting means for calculating $|k \cdot xo - k \cdot xi|$ from the output of said multiplier and the parameter $k \cdot xo$; and a second subtracter coupled to said first subtracter and having means for calculating $C - |k \cdot xo - k \cdot xi|$ from the output of said first subtracter and a predetermined value C, the output of said second subtracter serving as the if-part membership value.

8. The system according to claim 7, in which said first subtracter comprises:

a full adder for adding the point of change xo, a complement of the binary data xi, and a carry input, said full adder outputting a result of addition and a carry output, the carry output being 0 if an overflow does not occur during an addition procedure and 1 if the overflow occurs;

an inverter for inverting the carry output of the full adder; and an EX-OR gate for outputting an EX-ORed value of the result of addition and an output of the inverter, the EX-ORed value being $|xo-xi|$.

9. The system according to claim 7, in which said second subtracter comprises:

a subtracter for outputting a result of subtraction of $C - k \cdot |xo-xi|$ and an underflow signal, the underflow signal being 0 if underflow occurs during a subtraction procedure and 1 if the underflow does not occur; and an AND gate for outputting an ANDed value of the result of subtraction and the underflow signal.

10. The system according to claim 7, in which said multiplier comprises:

a multiplier including means for producing a shifted input by shifting a bit of one input signal to a most significant bit and an adder for adding the shifted input to another input signal, the adder outputting an overflow signal if an overflow occurs;

an OR gate for outputting an ORed value of the result of multiplication and the overflow; and an EX-OR gate for outputting an EX-ORed value of an output of the OR gate and a maximum value of the if-part membership value, the EX-ORed value being the if-part membership value.

11. The system according to claim 7, in which said membership value producing means further comprises means for changing the shape of the if-part membership function by setting the value corresponding to one of the gradients to zero.

12. The system according to claim 7, in which said membership value producing means further comprises means for changing the shape of the if-part membership function by inverting the sign of the value corresponding to the gradients and by setting the value corresponding to one of the gradients to zero.

13. An if-part membership function generating apparatus for use in a digital fuzzy inference system, for obtaining an inferential result using an if-part membership function which responds to binary input data and a then-part membership function which responds to a value of the if-part membership function with respect to the binary input data, comprising:

means for inputting binary data;
means for inputting parameters for the if-part membership function represented as a line having a combination of gradients, each parameter including a tangent of a gradient and a point of change at which the gradient of the line changes;
means for producing an if-part membership value for the binary data inputted by said binary data inputting means which has said point of change and said tangent of a gradient set by the parameters inputted by said parameters inputting means, wherein said if-part membership value producing means comprises:
means for inputting a product k·xo of the point of change xo and the tangent k as a parameter;
a subtracter coupled to the inputting means and having means for calculating an output of C−k·xo from a predetermined value C and the parameter k·xo;
a multiplier having means for calculating k·xi from the binary data xi and the tangent k; and
an adder-subtracter coupled to said multiplier and said subtracter, and having means for calculating k·xi−|C−k·xo| when the sign of the value represented by the output of said subtracter is positive and for calculating k·xi+|C−k·xo| when the signal of the value represented by the output of said subtracter is negative, the output of said adder-subtracter serving as the if-part membership value.

14. The system according to claim 13, in which said first subtracter comprises:

a full adder for adding the point of change xo, a complement of the binary data xi, and a carry input, said full adder outputting a result of addition and a carry output, the carry output being 0 if an overflow does not occur during an addition procedure and 1 if the overflow occurs;
an inverter for inverting the carry output of the full adder; and
an EX-OR gate for outputting an EX-ORed value of the result of addition and an output of the inverter, the EX-ORed value being |xo−xi|.

15. The system according to claim 13, in which said second subtracter comprises:

a subtracter for outputting a result of subtraction of C−k·|xo−xi| and an underflow signal, the underflow signal being 0 if underflow occurs during a subtraction procedure and 1 if the underflow does not occur; and
an AND gate for outputting an ANDed value of the result of subtraction an the underflow signal.

16. The system according to claim 13, in which said multiplier comprises:

a multiplier including means for producing a shifted input by shifting a bit of one input signal to a most significant bit and an adder for adding the shifted input to another input signal, the adder outputting an overflow signal if an overflow occurs;
an OR gate for outputting an ORed value of the result of multiplication and the overflow; and
an EX-OR gate for outputting an EX-ORed value of an output of the OR gate and a maximum value of the if-part membership value, the EX-ORed value being the if-part membership value.

17. The system according to claim 13, in which said membership value producing means further comprises means for changing the shape of the if-part membership function by setting the value corresponding to one of the gradients to zero.

18. The system according claim 13, in which said membership value producing means further comprises means for changing the shape of the if-part membership function by inverting the sign of the value corresponding to the gradients and by setting the value corresponding to one of the gradients to zero.

* * * * *